United States Patent
Inui

(10) Patent No.: US 7,127,715 B2
(45) Date of Patent: Oct. 24, 2006

(54) IMAGE OUTPUTTING APPARATUS, CONTROL METHOD FOR THE IMAGE OUTPUTTING APPARATUS, IMAGE OUTPUTTING SYSTEM, AND STORAGE MEDIUM PRODUCT

(75) Inventor: Masanobu Inui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 886 days.

(21) Appl. No.: 09/949,877

(22) Filed: Sep. 12, 2001

(65) Prior Publication Data

US 2002/0030743 A1    Mar. 14, 2002

(30) Foreign Application Priority Data

Sep. 13, 2000   (JP)   ............................. 2000-278190
Aug. 20, 2001   (JP)   ............................. 2001-249030

(51) Int. Cl.
   *G06F 9/46*    (2006.01)
   *G06F 3/12*    (2006.01)

(52) U.S. Cl. ..................... 718/105; 718/104; 358/1.12; 358/1.13; 358/1.14; 358/1.15

(58) Field of Classification Search ............... 718/100, 718/102, 107, 104, 105; 358/1.12, 1.13, 358/1.14, 1.15, 1.1
See application file for complete search history.

(56) References Cited

U.S. PATENT DOCUMENTS

| | | | | |
|---|---|---|---|---|
| 4,970,554 A | * | 11/1990 | Rourke | 399/84 |
| 5,129,639 A | * | 7/1992 | DeHority | 270/1.01 |
| 5,450,571 A | * | 9/1995 | Rosekrans et al. | 703/24 |
| 5,467,434 A | * | 11/1995 | Hower et al. | 358/1.15 |
| 5,559,933 A | * | 9/1996 | Boswell | 358/1.15 |
| 5,625,757 A | * | 4/1997 | Kageyama et al. | 358/1.14 |
| 5,689,755 A | | 11/1997 | Ataka | 399/8 |
| 5,995,723 A | * | 11/1999 | Sperry et al. | 358/1.15 |
| 6,348,971 B1 | * | 2/2002 | Owa et al. | 358/1.15 |
| 6,373,585 B1 | * | 4/2002 | Mastie et al. | 358/1.15 |
| 6,504,627 B1 | * | 1/2003 | Matsumoto | 358/448 |
| 6,822,754 B1 | * | 11/2004 | Shiohara | 358/1.15 |
| 6,954,288 B1 | * | 10/2005 | Uekusa et al. | 358/1.9 |

OTHER PUBLICATIONS

"Filing and Printing Services on a Local-Area Network", P. Janson, L. Svobodova and E. Maehle, IBM Zurich Research Laboratory, 8830 Ruschlikon, Switzerland, ACM, 1983.*
Lonux Print System Laboratories at Cisco Systems, Inc., Linux Journal Oct. 1998.*

* cited by examiner

*Primary Examiner*—Majid Banankhah
(74) *Attorney, Agent, or Firm*—Fitzpatrick, Cella, Harper & Scinto

(57) ABSTRACT

The invention provides an image outputting apparatus for outputting an image through execution of jobs, a control method for the image outputting apparatus, an image outputting system, and a storage medium product. When a job generated upon an output request is not executable, job information of at least one of other image outputting apparatuses is acquired and the job is transferred to at least one of the other image outputting apparatuses in accordance with the acquired job information.

68 Claims, 38 Drawing Sheets

FIG. 5

ATTRIBUTE TABLE (SUPERVISOR)

| ATTRIBUTE ID | TYPE ID | VALUE |
|---|---|---|
| 10 | 1 | 0 |
| 11 | 1 | 0 |
| 100 | 11 | 10, 11, 100, 101, 102, 103, 104, 105, ... |
| 101 | 11 | 1, 2, 3, 7, 9 |
| 102 | 11 | 1, 3 |
| 103 | 1 | 1 |
| 104 | 11 | 1001, 1002, 1003, 1004 |
| 105 | 11 | 1003 |
| 301 | 3 | "SuperMFP-1" |
| 302 | 13 | "Japanese", "English" |
| 303 | 1 | "English" |
| ... | ... | ... |
| 401 | 11 | 45, 78, 34, 13 |
| 402 | 11 | 565, 537, 545, 523 |
| 403 | 11 | 100, 100, 100, 200 |
| 404 | 13 | 0. 56, 0. 78, 0. 34, 0. 55 |
| 405 | 3 | 135. 45 |
| 406 | 3 | 500. 00 |
| 501 | 11 | 200, 399, 432, 234 |
| 502 | 52 | TABLE DATA |
| 503 | 53 | TABLE DATA |
| ... | ... | ... |
| 1001 | 101 | TABLE DATA |
| 1002 | 102 | TABLE DATA |
| 1003 | 103 | TABLE DATA |
| 1004 | 104 | TABLE DATA |
| 2001 | 11 | 21, 22, 23, 24 |
| 2002 | 12 | 255. 255. 255. 0, 255. 255. 255. 1 |
| 2003 | 1 | 40 |

FIG. 6

- THIS TABLE REPRESENTS ATTRIBUTES OF SUPERVISOR.
- CLIENT ALREADY KNOWS MEANINGS OF ATTRIBUTE IDS.

- ATTRIBUTE ID

| ID | Description |
|---|---|
| 10 | TASK TYPE |
| 11 | SERVICE ID |
| 100 | ATTRIBUTE ID LIST |
| 101 | SUPPORTED OPERATIONS |
| 102 | SUPPORTED SECURITY LEVELS |
| 103 | CURRENT SECURITY LEVEL |
| 104 | ATTRIBUTEE LIST CHANGEABLE BY ONLY MANAGERIAL PERSON |
| 105 | ATTRIBUTE LIST AVAILABLE BY ONLY MANAGERIAL PERSON |
| 301 | MODEL NAME |
| 302 | SUPPORTED LANGUAGES |
| 303 | CURRENT LANGUAGE |
| 401 | CURRENT COUNT DATA |
| 402 | COUNT DATA FORMAT |
| 403 | COUNT LIMITATION DATA |
| 404 | COUNT UNIT PRICE DATA |
| 405 | CURRENT BILLING DATA |
| 406 | BILLING LIMITATION DATA |
| 501 | SUPPORTED EVENT LIST |
| 502 | EVENT SETTING TABLE |
| 503 | EVENT FORMAT TABLE |
| 601 | USER LEVEL |
| 602 | INITIAL WORKING DAY |
| 603 | DISTANCE FROM REFERENCE POINT |
| 1001 | SUBADDRESS VERSUS SID CORRESPONDENCE TABLE |
| 1002 | SID VERSUS TASK TYPE TABLE |
| 1003 | USER IDENTIFICATION TABLE |
| 1004 | ACCESS CONTROL TABLE |
| 2001 | CONTROLLER ID LIST |
| 2002 | CONNECTABLE MFP LIST |
| 2003 | PRINTING SPEED |

- TYPE ID

| ID | Description |
|---|---|
| 0 | BOOLEAN |
| 1 | INTEGER |
| 2 | REAL NUMBER |
| 3 | CHARACTER STRING |
| 11 | INTEGER LIST |
| 12 | REAL NUMBER LIST |
| 13 | CHARACTER STRING LIST |
| 52 | EVENT SETTING TABLE FORM |
| 53 | EVENT FORMAT TABLE FORM |
| 101 | SID VERSUS TASK TYPE TABLE FORM |
| 102 | SID VERSUS TASK TYPE TABLE FORM |
| 103 | USER IDENTIFICATION TABLE FORM |
| 104 | ACCESS CONTROL TABLE FORM |

FIG. 7

SUBADDRESS VERSUS SID CORRESPONDENCE TABLE

| CONNECTION TYPE ID | SUBADDRESS | SERVICE ID | EFFECTIVE | AVAILABLE USER | UNAVAILABLE USER |
|---|---|---|---|---|---|
| 0 | 0 | 0 | YES | | |
| 0 | 1 | 1 | YES | 2355, 5678 | 1234, 2345 |
| 0 | 2 | 2 | YES | | |
| 1 | 9600 | 0 | YES | | |
| 1 | 9601 | 1 | YES | | |
| 1 | 9602 | 2 | YES | 1234, 2345 | |
| 1 | 8001 | 101 | YES | 1234 | |
| 1 | 8002 | 102 | YES | | |
| 2 | 45 | 0 | YES | | |
| 2 | 46 | 1 | YES | | |
| 2 | 47 | 2 | YES | | |
| 2 | 68 | 8 | NO | | |
| 2 | 89 | 10 | YES | | |
| 3 | 23 | 0 | YES | | |
| 3 | 52 | 1 | YES | | |
| 3 | 98 | 17 | YES | | |

- THIS TABLE REPRESENTS IN WHICH SUBADDRESS JOB SHOULD BE LOADED WHEN RECEIVING SERVICE.

- THIS TABLE ALSO MANAGES WHETHER CONNECTION TYPE IS EFFECTIVE (AVAILABLE).

- CONNECTION TYPE ID
  - 0 : INTERNAL
  - 1 : TCP/IP
  - 2 : IEEE1284.4
  - 3 : SBP-2

FIG. 9

SID VERSUS TASK TYPE CORRESPONDENCE TABLE

| SERVICE ID | TASK TYPE |
|---|---|
| 0 | 0 |
| 1 | 1 |
| 2 | 1 |
| 3 | 1 |
| 4 | 1 |
| 5 | 1 |
| 6 | 1 |
| 7 | 1 |
| 8 | 1 |
| 9 | 1 |
| 10 | 2 |
| 11 | 3 |
| 12 | 3 |
| 13 | 3 |
| 14 | 3 |
| 15 | 3 |
| 16 | 3 |
| 17 | 3 |
| 18 | 3 |
| 21 | 201 |
| 24 | 202 |

- THIS TABLE REPRESENTS WHAT KIND OF SERVICE IS PROVIDED BY SERVICE ID.

- THIS TABLE IS REFERRED TO FROM DISPATCHER AS WELL AND ALSO USED TO DELIVER COMMAND TO EACH MANAGER.

- TASK TYPE
  - 0 : SUPERVISOR
  - 1 : PRINT
  - 2 : SCAN
  - 3 : COPY

FIG. 10

PRINT MANAGER ATTRIBUTE TABLE

| ATTRIBUTE ID (1001) | TYPE ID (1002) | VALUE (1003) |
|---|---|---|
| 10 | 1 | 0 |
| 11 | 1 | 0 |
| 100 | 11 | 10, 11, 100, 101, 104, 401, ... |
| 101 | 11 | 11, 14, 15, 17 |
| 104 | 11 | 1104, 1105 |
| ... | ... | ... |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | TABLE DATA |
| 601 | 11 | 1, 2 |
| 801 | 81 | 4354:3254, 2464, 2456, 4356:124, 535, 6 |
| 802 | 82 | 3254:1:4324:43143, 2342, 6543, 3245 |
| 803 | 83 | 5425:2:25432:34324:2:12453, 3424, 2343 |
| 804 | 84 | 5425:2:25432:4:5425:5:655:2435, 563 |
| 805 | 85 | 22414:3:43242331:5:43243:2:32144:455 |
| ... | ... | ... |
| 1101 | 11 | 3, 5 |
| 1102 | 0 | NO |
| 1103 | 11 | 1, 2 |
| 1104 | 1 | 400 |
| 1105 | 1 | 100 |
| 2001 | 11 | 21 |
| 2002 | 0 | NO |
| 2003 | 203 | TABLE DATA |
| 2004 | 204 | TABLE DATA |
| 2005 | 0 | YES |

(1004)
- THIS TABLE REPRESENTS ATTRIBUTES OF PRINT MANAGER.
- CLIENT ALREADY KNOWS MEANINGS OF ATTRIBUTE IDS.
- ATTRIBUTE ID
  - 10 TASK TYPE
  - 11 SERVICE ID
  - 100 ATTRIBUTE ID LIST
  - 101 OPERATION SUPPORTED BY JOB SCRIPT
  - 104 ATTRIBUTE LIST CHANGEABLE BY ONLY MANAGERIAL PERSON
  - 401 CURRENT COUNT DATA
  - 402 COUNT DATA FORMAT
  - 403 COUNT LIMITATION DATA
  - 404 COUNT UNIT PRICE DATA
  - 405 CURRENT BILLING DATA
  - 406 BILLING LIMITATION DATA
  - 501 SUPPORTED EVENT LIST
  - 502 EVENT SETTING TABLE
  - 601 DOWNLOAD METHOD OF SUPPORTED DATA
  - 801 LIST OF ATTRIBUTE COMBINATIONS FOR WHICH SETTING IS PROHIBITED (1-TYPE)
  - 802 LIST OF ATTRIBUTE COMBINATIONS FOR WHICH SETTING IS PROHIBITED (2-TYPE)
  - 803 LIST OF ATTRIBUTE COMBINATIONS FOR WHICH SETTING IS PROHIBITED (3-TYPE)
  - 804 LIST OF ATTRIBUTE COMBINATIONS FOR WHICH SETTING IS PROHIBITED (4-TYPE)
  - 805 LIST OF ATTRIBUTE COMBINATIONS FOR WHICH SETTING IS PROHIBITED (5-TYPE)
  - 1101 SUPPORTED PDL LIST
  - 1102 COLOR PRINTING ENABLED ?
  - 1103 SUPPORTED FINISHING TYPES
  - 1104 SETTING ALLOWABLE MAXIMUM RESOLUTION
  - 1105 SETTING ALLOWABLE MINIMUM RESOLUTION
  - 2001 JOB EXECUTING CONTROLLER ID LIST
  - 2002 CONTROLLER AUTOMATICALLY SELECTABLE ?
  - 2003 JOB TABLE
  - 2004 JOB REQUEST TABLE
  - 2005 JOB PARALLEL OPERATION ENABLED ?

- TYPE ID
  - 0 BOOLEAN
  - 1 INTEGER
  - 2 REAL NUMBER
  - 3 CHARACTER STRING
  - 11 INTEGER LIST
  - 12 REAL NUMBER LIST
  - 13 CHARACTER STRING LIST
  - 52 EVENT SETTING TABLE FORM
  - 81 PROHIBITED ATTRIBUTE COMBINATION LIST 1 FORM
  - 82 PROHIBITED ATTRIBUTE COMBINATION LIST 2 FORM
  - 83 PROHIBITED ATTRIBUTE COMBINATION LIST 3 FORM
  - 203 JOB TABLE FORM
  - 204 JOB REQUEST TABLE FORM

FIG. 11

JOB TABLE

| JOB ID | JOB FILE NAME |
|---|---|
| 1 | P0001 |
| 2 | P1001 |
| 3 | P2001 |

THIS IS CORRESPONDENCE TABLE BETWEEN NAME OF FILE, WHICH HOLDS JOB CONTENTS MANAGED BY PRINT MANAGER, AND JOB ID

FIG. 12

JOB REQUEST TABLE

| JOB ID | CONTROL ID | JOB ID |
|---|---|---|
| 1 | 21 | 100 |
| 1 | 22 | 101 |
| 2 | 21 | 102 |
| 2 | 22 | 403 |
| 3 | ... | ... |
| | | |
| | | |

- THIS TABLE REPRESENTS RELATIONSHIP BETWEEN JOB MANAGED BY PRINT MANAGER AND JOB EXECUTED BY CONTROLLER.

FIG. 13

SCAN MANAGER ATTRIBUTE TABLE

| ATTRIBUTE ID (1301) | TYPE ID (1302) | VALUE (1303) |
|---|---|---|
| 10 | 1 | 2 |
| 11 | 1 | 10 |
| 100 | 11 | 10, 11, 100, 101, 104, 401, ... |
| 101 | 11 | 21, 22, 25, 29 |
| 104 | 11 | 602 |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | TABLE DATA |
| 602 | 11 | 1, 2 |
| 1201 | 11 | 3, 5 |
| 1202 | 0 | YES |
| 1203 | 11 | 100, 200, 300, 400 |
| 2001 | 11 | 24 |
| 2002 | 0 | NO |
| 2003 | 203 | TABLE DATA |

(1304)

- THIS TABLE REPRESENTS ATTRIBUTES OF SCAN MANAGER.
- CLIENT ALREADY KNOWS MEANINGS OF ATTRIBUTE IDS.

· ATTRIBUTE ID
10   TASK TYPE
11   SERVICE ID
100  ATTRIBUTE ID LIST
101  OPERATION SUPPORTED BY JOB SCRIPT
104  ATTRIBUTE LIST CHANGEABLE BY ONLY MANAGERIAL PERSON
401  CURRENT COUNT DATA
402  COUNT DATA FORMAT
403  COUNT LIMITATION DATA
404  COUNT UNIT PRICE DATA
405  CURRENT BILLING DATA
406  BILLING LIMITATION DATA
501  SUPPORTED EVENT LIST
502  EVENT SETTING TABLE
602  UPLOAD METHOD OF SUPPORTED DATA
1201 SUPPORTED IMAGE FORMAT LIST
1202 COLOR SCAN ENABLED ?
1203 SETTING ALLOWED RESOLUTION LIST
2001 JOB EXECUTING CONTROLLER ID LIST
2002 CONTROLLER AUTOMATICALLY SELECTABLE ?
2003 JOB TABLE

· TYPE ID
0    BOOLEAN
1    INTEGER
2    REAL NUMBER
3    CHARACTER STRING
11   INTEGER LIST
12   REAL NUMBER LIST
13   CHARACTER STRING LIST
52   EVENT SETTING TABLE FORM
203  JOB TABLE FORM

FIG. 14

COPY MANAGER ATTRIBUTE TABLE

| ATTRIBUTE ID (1401) | TYPE ID (1402) | VALUE (1403) |
|---|---|---|
| 10 | 1 | 3 |
| 11 | 1 | 18 |
| 100 | 11 | 10, 11, 100, 101, 104, 401, ... |
| 101 | 11 | 31, 32, 35 |
| 104 | 11 | 1304, 1305 |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | TABLE DATA |
| ⋮ | ⋮ | ⋮ |
| 1302 | 0 | NO |
| 1303 | 11 | 1, 2 |
| 1304 | 1 | 400 |
| 1305 | 1 | 100 |
| 2001 | 11 | 21 |
| 2002 | 0 | YES |
| 2003 | 203 | TABLE DATA |
| 2004 | 0 | YES |

1404:

- THIS TABLE REPRESENTS ATTRIBUTES OF COPY MANAGER.
- CLIENT ALREADY KNOWS MEANINGS OF ATTRIBUTE IDS.

· ATTRIBUTE ID
- 10   TASK TYPE
- 11   SERVICE ID
- 100  ATTRIBUTE ID LIST
- 101  OPERATION SUPPORTED BY JOB SCRIPT
- 104  ATTRIBUTEE LIST CHANGEABLE BY ONLY MANAGERIAL PERSON
- 401  CURRENT COUNT DATA
- 402  COUNT DATA FORMAT
- 403  COUNT LIMITATION DATA
- 404  COUNT UNIT PRICE DATA
- 405  CURRENT BILLING DATA
- 406  BILLING LIMITATION DATA
- 501  SUPPORTED EVENT LIST
- 502  EVENT SETTING TABLE
- 1302 COLOR PRINTING ENABLED ?
- 1303 SUPPORTED FINISHING TYPES
- 1304 SETTING ALLOWABLE MAXIMUM RESOLUTION
- 1305 SETTING ALLOWABLE MINIMUM RESOLUTION
- 2001 JOB EXECUTING CONTROLLER ID LIST
- 2002 CONTROLLER AUTOMATICALLY SELECTABLE ?
- 2003 JOB TABLE
- 2004 PARALLEL PROCESSING ENABLED ?

· TYPE ID
- 0    BOOLEAN
- 1    INTEGER
- 2    REAL NUMBER
- 3    CHARACTER STRING
- 11   INTEGER LIST
- 12   REAL NUMBER LIST
- 13   CHARACTER STRING LIST
- 52   EVENT SETTING TABLE FORM
- 203  JOB REQUEST TABLE FORM

FIG. 15

PRINTER CONTROLLER ATTRIBUTE TABLE

| ATTRIBUTE ID (1501) | TYPE ID (1502) | VALUE (1503) |
|---|---|---|
| 12 | 1 | 1 |
| 13 | 1 | 21 |
| 100 | 11 | 12, 13, 104, .... |
| 104 | 11 | |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | TABLE DATA |
| ⋮ | ⋮ | ⋮ |
| 5001 | 0 | NO |
| 5002 | 11 | 1, 2, 3 |
| 5003 | 1 | 1200 |
| 5004 | 1 | 100 |
| 5005 | 500 | TABLE DATA |
| 5006 | 0 | YES |

1504:
- THIS TABLE REPRESENTS ATTRIBUTES OF PRINTER CONTROLLER.
- CLIENT ALREADY KNOWS MEANINGS OF ATTRIBUTE IDS.

- ATTRIBUTE ID
  - 12   CONTROLLER TYPE
  - 13   CONTROLLER ID
  - 100  ATTRIBUTE ID LIST
  - 104  ATTRIBUTE LIST CHANGEABLE BY ONLY MANAGERIAL PERSON
  - 401  CURRENT COUNT DATA
  - 402  COUNT DATA FORMAT
  - 403  COUNT LIMITATION DATA
  - 404  COUNT UNIT PRICE DATA
  - 405  CURRENT BILLING DATA
  - 406  BILLING LIMITATION DATA
  - 501  SUPPORTED EVENT LIST
  - 502  EVENT SETTING TABLE
  - 5001 COLOR PRINTING ENABLED ?
  - 5002 SUPPORTED FINISHING TYPES
  - 5003 SETTING ALLOWABLE MAXIUMU RESOLUTION
  - 5004 SETTING ALLOWABLE MINIMUM RESOLUTION
  - 5005 JOB QUEUE TABLE
  - 5006 PARALLEL PROCESSING ENABLED ?

- TYPE ID
  - 0    BOOLEAN
  - 1    INTEGER
  - 2    REAL NUMBER
  - 3    CHARACTER STRING
  - 11   INTEGER LIST
  - 12   REAL NUMBER LIST
  - 13   CHARACTER STRING LIST
  - 52   EVENT SETTING TABLE FORM
  - 500  JOB QUEUE TABLE FORM

FIG. 16

JOB QUEUE TABLE

| JOB ID | STATUS | FILE NAME |
|--------|--------|-----------|
| 100 | 1 | C100 |
| 101 | 2 | C101 |
| 102 | 3 | C102 |
| 103 | 3 | C103 |
| 104 | 3 | C104 |
| 105 | 3 | C105 |
|  |  |  |

- THIS TABLE IS LIST OF JOB UNDER EXECUTION BY PRINTER CONTROLLER AND JOB IN QUEUE.
- MEANINGS OF STATUS
  - 1 : END OF EXECUTION
  - 2 : UNDER EXECUTION BY ENGINE
  - 3 : WAITING FOR EXECUTION

FIG. 17

SCANNER CONTROLLER ATTRIBUTE TABLE

| ATTRIBUTE ID (1701) | TYPE ID (1702) | VALUE (1703) |
|---|---|---|
| 12 | 1 | 2 |
| 13 | 1 | 24 |
| 100 | 11 | 12, 13, 104, .... |
| 104 | 11 | |
| ⋮ | ⋮ | ⋮ |
| 401 | 11 | 45, 78, 34, 13 |
| 402 | 11 | 565, 537, 545, 523 |
| 403 | 11 | 100, 100, 100, 200 |
| 404 | 13 | 0.56, 0.78, 0.34, 0.55 |
| 405 | 3 | 135.45 |
| 406 | 3 | 500.00 |
| 501 | 11 | 200, 399, 432, 234 |
| 502 | 52 | TABLE DATA |
| ⋮ | ⋮ | ⋮ |
| 6001 | 0 | YES |
| 6002 | 12 | 200.00, 300.00 |
| 6003 | 1 | 1200 |
| 6004 | 1 | 100 |

1704
- THIS TABLE REPRESENTS ATTRIBUTES OF SCANNER CONTROLLER.
- CLIENT ALREADY KNOWS MEANINGS OF ATTRIBUTE IDS.

- ATTRIBUTE ID
- 12   CONTROLLER TYPE
- 13   CONTROLLER ID
- 100  ATTRIBUTE ID LIST
- 104  ATTRIBUTE LIST CHANGEABLE BY ONLY MANAGERIAL PERSON
- 401  CURRENT COUNT DATA
- 402  COUNT DATA FORMAT
- 403  COUNT LIMITATION DATA
- 404  COUNT UNIT PRICE DATA
- 405  CURRENT BILLING DATA
- 406  BILLING LIMITATION DATA
- 501  SUPPORTED EVENT LIST
- 502  EVENT SETTING TABLE
- 6001 COLOR SCAN ENABLED ?
- 6002 MAXIMUM DOCUMENT SIZE
- 6003 SETTING ALLOWABLE MAXIMUM RESOLUTION
- 6004 SETTING ALLOWABLE MINIMUM RESOLUTION

- TYPE ID
- 0   BOOLEAN
- 1   INTEGER
- 2   REAL NUMBER
- 3   CHARACTER STRING
- 11  INTEGER LIST
- 12  REAL NUMBER LIST
- 13  CHARACTER STRING LIST
- 52  EVENT SETTING TABLE FORM

FIG. 26

EVENT SETTING TABLE (SUPERVISOR)

| EVENT ID | CONNECTION TYPE ID | DESTINATION ADDRESS |
|---|---|---|
| 200 | 0 | |
| 399 | 1 | 123. 222. 111. 321 : 9340 |
| 432 | 2 | 35 |
| 234 | 3 | 12 |

S2601　S2602　S2603

EVENT FORMAT TABLE

| EVENT ID | EVENT FORMAT |
|---|---|
| 200 | 676, 756 |
| 399 | 666 |
| 432 | 698 |
| 234 | 600 |

S2604　S2605

IMAGE OUTPUTTING APPARATUS, CONTROL METHOD FOR THE IMAGE OUTPUTTING APPARATUS, IMAGE OUTPUTTING SYSTEM, AND STORAGE MEDIUM PRODUCT

BACKGROUND OF THE INVENTION

1. Field of the Invention

The present invention relates to an image outputting apparatus for outputting an image through execution of jobs, a control method for the image outputting apparatus, an image outputting system, and a storage medium product.

2. Description of the Related Art

There is known a digital composite machine having the functions of a copying machine, a printer, an image scanner, etc. An image outputting system is proposed in which a plurality of such image outputting apparatuses are connected to a network to perform distribution processing of image outputs. That type of image outputting system can operate, for example, in an operating mode of distribution processing called demultiplex copy.

Processing procedures of the demultiplex copy will briefly be described below. First, a user sets a document on a platen of a digital composite machine (local printer) capable of reading an image, and selects the demultiplex mode with key-in operation on a console. Then, among other digital composite machines or printers connected to the network, the user selects one image outputting apparatus (remote printer) capable of executing the intended distribution processing, and sets the number of copies, the sheet size, etc. to be outputted from the selected image outputting apparatus (remote printer). When the user enters a start command for image reading in the digital composite machine (local printer), a distribution processing request is sent to both the digital composite machine (local printer) and the selected image outputting apparatus (remote printer) in response to the start command. In accordance with the received distribution processing request, the digital composite machine (local printer) and the selected image outputting apparatus (remote printer) hold jobs that are loaded therein, and execute the jobs successively for outputting images. With such demultiplex copy, an output result can be obtained in a shorter time than the case of copying the same images by a single unit of digital composite machine, and therefore the productivity in image outputting can be improved.

However, when the image outputting apparatus having received the distribution processing request is holding many jobs, that apparatus cannot execute the generated job within an expected time, thus causing the problem that until an output result is obtained, a longer time is taken than the case of selecting another target of the distribution processing.

Further, when performing the demultiplex copy using a plurality of image outputting apparatuses having different outputting speeds, if those image outputting apparatuses include one having a low outputting speed, that one apparatus cannot execute the generated job at an expected outputting speed. This also causes the problem that until an output result is obtained, a longer time is taken than those required by the other selected targets of the distribution processing.

Such a delay in image outputting due to the fact that the job cannot be executed under the expected output conditions is a problem that is not limited to the distribution processing such as the demultiplex copy, but occurs in common to the case of, e.g., remote copy wherein processing of an output is carried out by one remote apparatus. The problem can be coped with, for example, by changing the target of outputting before sending an output request. Hitherto, it has been difficult to determine from the standpoint of job whether an apparatus selected as the target of outputting can accept the output request and can execute the job under the expected output conditions.

SUMMARY OF THE INVENTION

With the view of overcoming the problems set forth above, it is an object of the present invention to provide an image outputting apparatus, a control method for the image outputting apparatus, an image outputting system, and a storage medium product, which enable a job to be executed by an apparatus in the job status capable of realizing desired output conditions.

A solution for achieving the above object is provided by an image outputting apparatus connected to other image outputting apparatuses via a communication medium, the apparatus comprising a generating unit for generating a job in response to an output request received via the communication medium; an acquiring unit for acquiring job information of at least one of the other image outputting apparatuses when the job generated by the generating unit is not executable; and a transferring unit for transferring the job to at least one of the other image outputting apparatuses based on the job information acquired by the acquiring unit.

Another object of the present invention is to provide an image outputting apparatus, a control method for the image outputting apparatus, an image outputting system, and a storage medium product, which enable a job to be executed by an apparatus having the output functions capable of realizing desired output conditions.

A solution for achieving the above object is provided by an image outputting apparatus connected to other image outputting apparatuses via a communication medium, the apparatus comprising a generating unit for generating a job in response to an output request received via the communication medium; a first acquiring unit for acquiring output function information of at least one of the other image outputting apparatuses when the job generated by the generating unit is not executable; and a transferring unit for transferring the job to at least one of the other image outputting apparatuses based on the output function information acquired by the first acquiring unit.

Still another object of the present invention is to provide an image outputting apparatus, a control method for the image outputting apparatus, an image outputting system, and a storage medium product, which can easily determine from the standpoint of job whether an apparatus selected as a target of outputting can accept an output request, before sending the output request, and which can avoid a delay in distribution processing.

A solution for achieving the above object is provided by an image outputting apparatus connected to other image outputting apparatuses via a communication medium, the apparatus comprising a display unit for displaying the other image outputting apparatuses; a selecting unit for, based on a selection input from an operator, selecting at least one of the other image outputting apparatuses displayed by the display unit, to which an output request is to be sent; a first acquiring unit for acquiring job information of the image outputting apparatus selected by the selecting unit; a first determining unit for, based on the job information acquired by the first acquiring unit, determining whether the selected image outputting apparatus can accept the output request; and a notifying unit for, when the first determining unit determines that the selected image outputting apparatus cannot accept the output request, notifying the determination result.

Still another object of the present invention is to provide a copying apparatus and a control method for the copying apparatus, which can prevent jobs from jamming even when many jobs are concentrated, and which can perform distribution processing without reducing the productivity.

A solution for achieving the above object is provided by a copying apparatus comprising a scanner section for reading an original image and obtaining image data, and a printer section for outputting an image on a sheet in accordance with an output job, the copying apparatus being connected to other copying apparatuses via a network, the copying apparatus further comprising a generating unit for, in response to an output request received from a first one of the other copying apparatuses, generating a copy job based on image data inputted from a scanner section of the first copying apparatus; a first determining unit for, based on job number information held in its own apparatus, determining whether the copy job is executable; an acquiring unit for acquiring job number information of at least one of the other copying apparatuses when the first determining unit determines that the copy job is not executable; a second determining unit for, based on the job number information acquired by the acquiring unit, determining whether the copy job can be transferred to any of the other copying apparatuses; a deciding unit for, when the second determining unit determines that the copy job can be transferred to some of the other copying apparatuses, deciding at least one of those transfer-enable copying apparatuses to which the copy job is to be transferred; and a transferring unit for transferring the copy job to the copying apparatus decided by the deciding unit.

Still another object of the present invention is to provide a copying apparatus and a control method for the copying apparatus, which enable a generated job to be executed by a copying apparatus having a printing speed suitable for a distribution processing request, and which can perform distribution processing without reducing the productivity even when a plurality of copying apparatus have different printing speeds.

A solution for achieving the above object is provided by a copying apparatus comprising a scanner section for reading an original image and obtaining image data, and a printer section for outputting an image on a sheet in accordance with an output job, the copying apparatus being connected to other copying apparatuses via a network, the copying apparatus further comprising a generating unit for, in response to an output request received from a first one of the other copying apparatuses, generating a copy job based on image data inputted from a scanner section of the first copying apparatus; a first acquiring unit for acquiring printing speed information of the first copying apparatus having sent the output request; a first determining unit for, based on the printing speed information of the first copying apparatus acquired by the first acquiring unit, determining whether the copy job is executable at a predetermined printing speed; a second acquiring unit for acquiring printing speed information of at least one of the other copying apparatuses when the first determining unit determines that the copy job is not executable at the predetermined printing speed; a second determining unit for, based on the printing speed information acquired by the second acquiring unit, determining whether the copy job can be transferred to any of the other copying apparatuses; a deciding unit for, when the second determining unit determines that the copy job can be trans-ferred to some of the other copying apparatuses, deciding at least one of those transfer-enable copying apparatuses to which the copy job is to be transferred; and a transferring unit for transferring the copy job to the copying apparatus decided by the deciding unit.

Still another object of the present invention is to provide a copying apparatus and a control method for the copying apparatus, which can easily determine from the standpoint of job whether an apparatus selected as a target of outputting can accept an output request, before sending the output request, and hence which can avoid a reduction of the productivity in distribution processing caused by, for example, a situation that a new job is loaded in a copying apparatus already holding many jobs and an overly long time is taken until a desired output result of images is obtained.

A solution for achieving the above object is provided by a copying apparatus comprising a scanner section for reading an original image and obtaining image data, the copying apparatus being connected to other copying apparatuses via a network, the copying apparatus further comprising a display unit for displaying other copying apparatuses to which a copy request in accordance with the image data inputted from the scanner section can be sent; a selecting unit for, based on a selection input from an operator, selecting at least one of the other copying apparatuses displayed by the display unit, to which the copy request is to be sent; a first acquiring unit for acquiring job number information of the copying apparatus selected by the selecting unit; and a first determining unit for, based on the job number information acquired by the first acquiring unit, determining whether the selected copying apparatus can accept the copy request, wherein when the first determining unit determines that the copying apparatus selected by the selecting unit cannot accept the copy request, the determination result is displayed by the display unit.

Further objects, features and advantages of the present invention will become apparent from the following description of the preferred embodiments with reference to the attached drawings.

BRIEF DESCRIPTION OF THE DRAWINGS

FIG. 5 is a supervisor attribute table representing data that is held in the DISK and managed by the supervisor.

FIG. 6 is a list showing details of an attribute ID and a type ID in the supervisor attribute table shown in FIG. 5.

FIG. 7 is a subaddress versus service ID correspondence table.

FIG. 8 represents the meaning of a connection type ID.

FIG. 9 is a service ID versus task type correspondence table.

FIG. 10 is a print job manager attribute table representing data that is held in the DISK by each print job manager.

FIG. 11 is a job table representing data that is held by the print job manager.

FIG. 12 is a job request table held by the print job manager.

FIG. 13 is a scan job manager attribute table representing data that is held by a scan job manager.

FIG. 14 is a copy job manager attribute table representing data that is held by a copy job manager.

FIG. 15 is a printer controller attribute table representing data that is held in the DISK by a printer controller.

FIG. 16 is a job queue table representing a job queue that is held by the printer controller.

FIG. 17 is a scanner controller attribute table representing data that is held in the DISK by a scanner controller.

FIG. 26 shows an event setting table and an event format table both held by the supervisor.

DESCRIPTION OF THE PREFERRED EMBODIMENTS

Embodiments of the present invention will be described below with reference to the drawings.

(First Embodiment)

Figure 1:
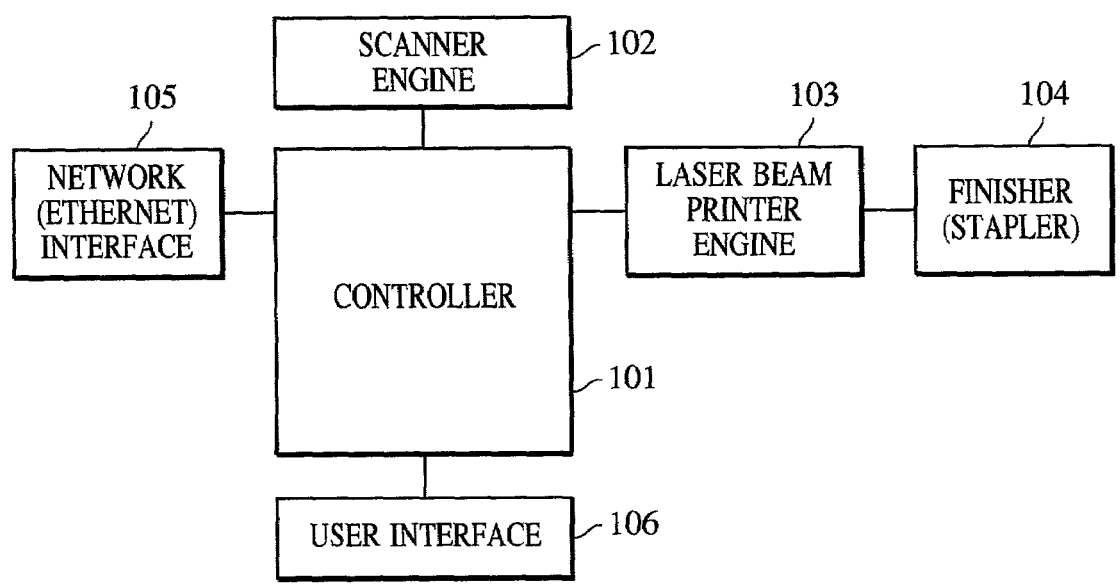
FIG. 1 is a block diagram showing an overall configuration of an MFP according to a first embodiment of the present invention.

FIG. 1 is a block diagram showing an overall configuration of an MFP (Multi-Function Peripheral) to which the present invention can be applied. The MFP in this embodiment has the functions of a copying machine, a printer, and a scanner as described later.

Referring to FIG. 1, numeral 101 denotes a controller for controlling the MFP. The controller 101 controls a scanner engine 102, a laser beam printer (LBP) engine 103, and a finisher 104.

The scanner engine 102 illuminates an image on a sheet of paper set as a document, scans a CCD line sensor over the image for conversion into electrical signals in the form of raster image data, and sends the obtained image data to the controller 101. The scanner engine 102 may be provided with a document feeder capable of reading plural sheets of document in response to an instruction entered just once. The laser beam printer engine 103 forms an image according to the electrophotographic process. The printer engine is not limited to an LBP engine, but may be of any other suitable one, e.g., an ink jet printer engine.

The finisher 104 is connected to the laser beam printer engine 103, and is able to staple (using a stapler or Hotchkiss) a plurality of recording mediums together, such as sheets of paper, outputted from the laser beam printer engine 103. Numeral 105 denotes a network (Ethernet) interface, which enables the controller 101 to perform two-way communication via itself.

Numeral 106 denotes a user interface comprising an LCD display and a keyboard. The user interface 106 displays information sent from the controller 101 and transfers an instruction entered by the user to the controller 101. By inquiring a supervisor (described later) via the user interface 106, the user can acquire an outline of provided functions (e.g., what kind of job can be issued), a subaddress used for issuing a job, and detailed information of each function (such as the maximum number of copies, the type of finisher, the supported PDL, and the number of output BINs that can be designated). An instruction to operate the controller 101 is not limited to one made only via the user interface 106, and all the functions of the controller 101 can also be utilized from external equipment via an interface for a network (Ethernet or TCP/IP).

Figure 2:
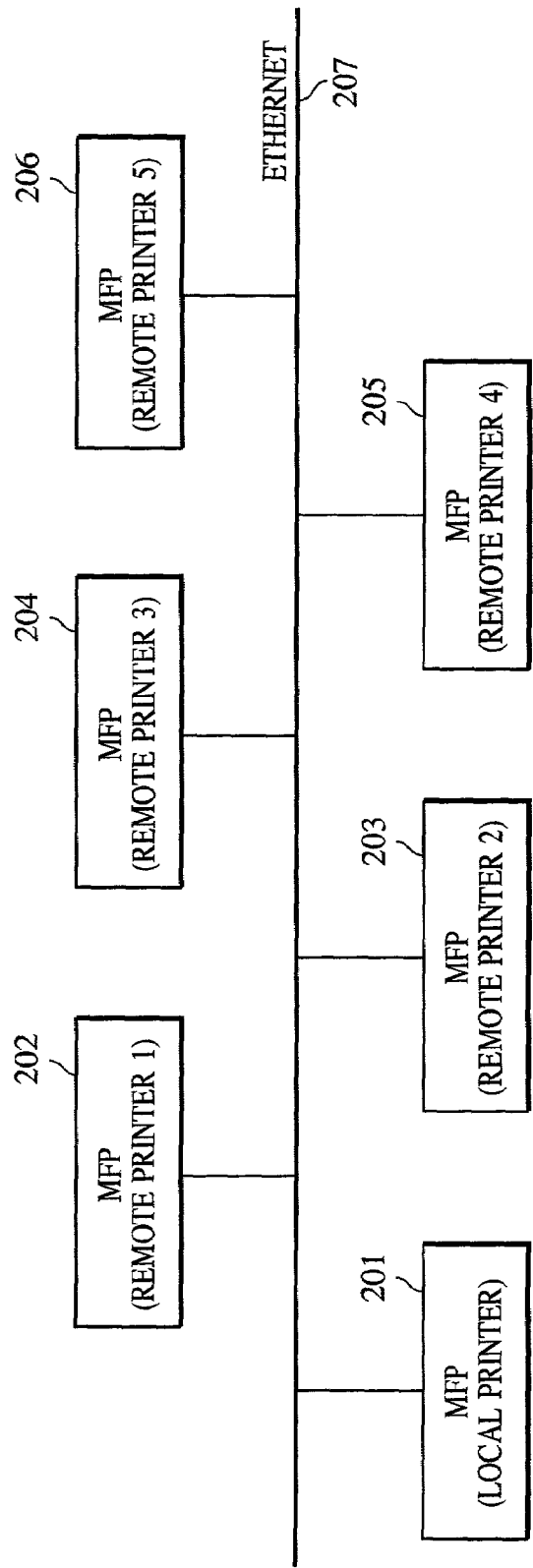
FIG. 2 is a block diagram showing a configuration of an image outputting system according to the first embodiment.

FIG. 2 is a block diagram showing a configuration of an image outputting system including MFPs according to this embodiment. Numerals 201–206 denote MFPs each having the same configuration as shown in FIG. 1. The MFP 201 is connected to the MFPs 202–206 via a network interface cable 207. The MFPs 201–206 can be each connected to a network by designating the IP address and the port number, and can output IP packet data for transfer among them.

As described later in connection with an example of distribution processing, it is assumed in this embodiment that the MFP 201 is a local printer for not only reading images, but also instructing the distribution processing and outputting images via the network. Also, the MFPs 202–206 are assumed to be remote printers 1 to 5, respectively, for outputting images in accordance with a distribution processing request instructed via the network.

Figure 3:
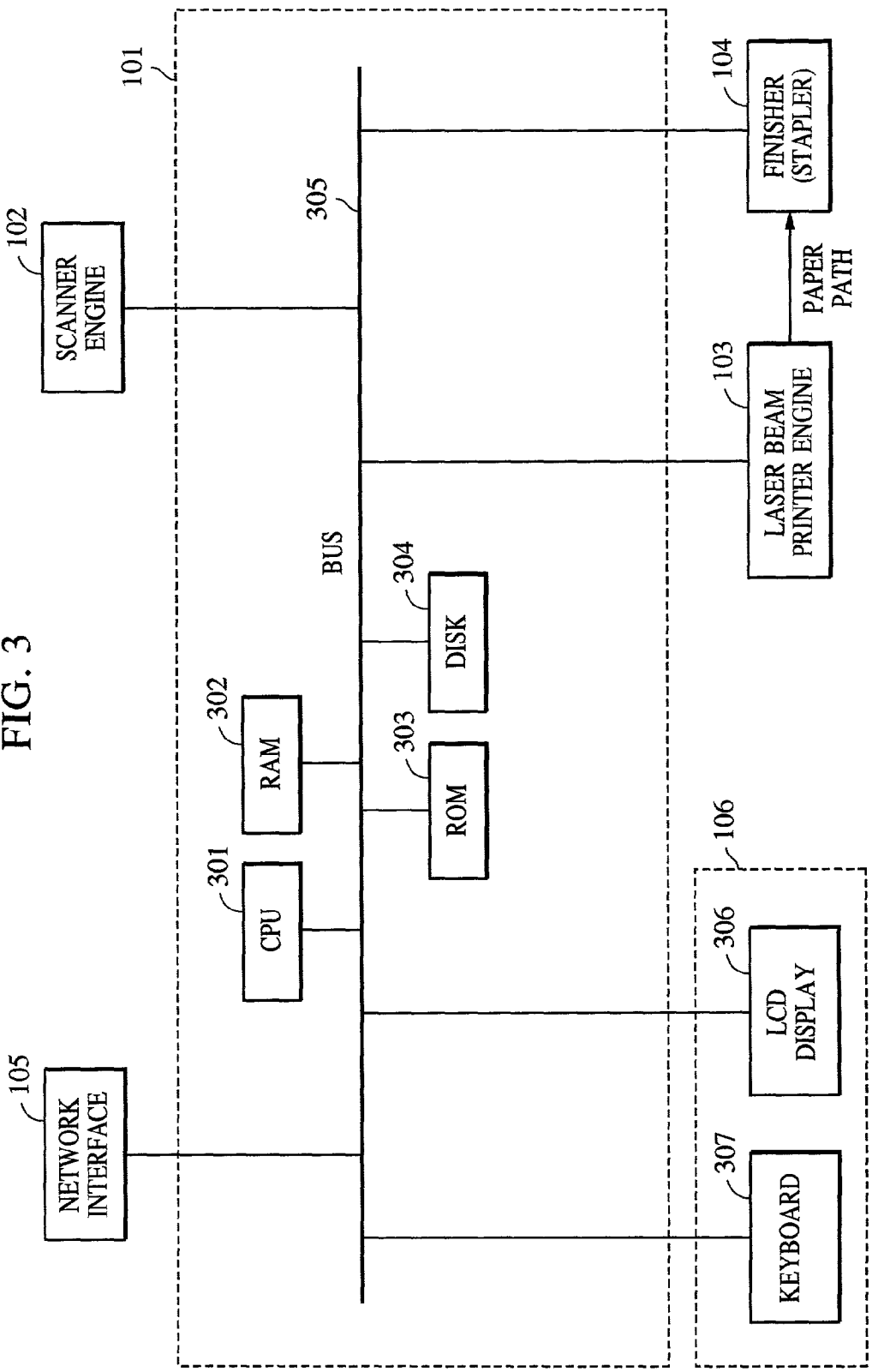
FIG. 3 is a block diagram showing a hardware configuration of a controller.

FIG. 3 is a block diagram showing a hardware configuration of the controller 101. Inside the controller 101, a CPU

301, a RAM 302, a ROM 303, and a DISK 304 are connected to a bus 305. Also, connected to the bus 305 are the scanner engine 102, the laser beam printer engine 103, the finisher 104, the network interface 105, and the user interface 106 comprising an LCD display 306 and a keyboard 307.

The CPU 301 controls the controller 101, the scanner engine 102, the laser beam printer engine 103, and so on. The CPU 301 reads and writes data from and in those engines to perform engine operations, such as print and scan, and to acquire various statuses. The RAM 302 is utilized as a work area for the CPU 301 and stores temporarily job information to be executed by the MFPs, image data, etc. The ROM 303 stores, e.g., operating programs for the MFPs, which are read out for execution as required.

The DISK 304 is an auxiliary storage such as a hard disk or a floppy disk, and stores various programs and data which are successively read into the RAM 302 for execution by the CPU 301 as required. The DISK 304 is built in the controller 101 in this embodiment. However, the DISK 304 is not limited to a built-in one, but may be a detachable one. Also, programs may be downloaded from other MFPs via the network interface 105 and stored in the DISK 304.

The LCD display 306 displays, for example, the MFP status and information of the MFPs capable of taking part in distribution processing when the distribution processing is performed. The LCD display 306 displays data upon the CPU 301 writing the data in the LCD display 306. The keyboard 307 is used to input various commands and parameters when operating the MFP. The keyboard 307 may be provided as a touch panel displayed on the LCD display 306 or a separate unit. The CPU 301 reads data from the keyboard 307 and inputs a user instruction to the controller 101.

Each of the scanner engine 102, the laser beam printer engine 103, and the finisher 104 may be provided not in the MFP, but on the network as a single peripheral unit that is controlled by the MFP controller 101.

Figure 4:
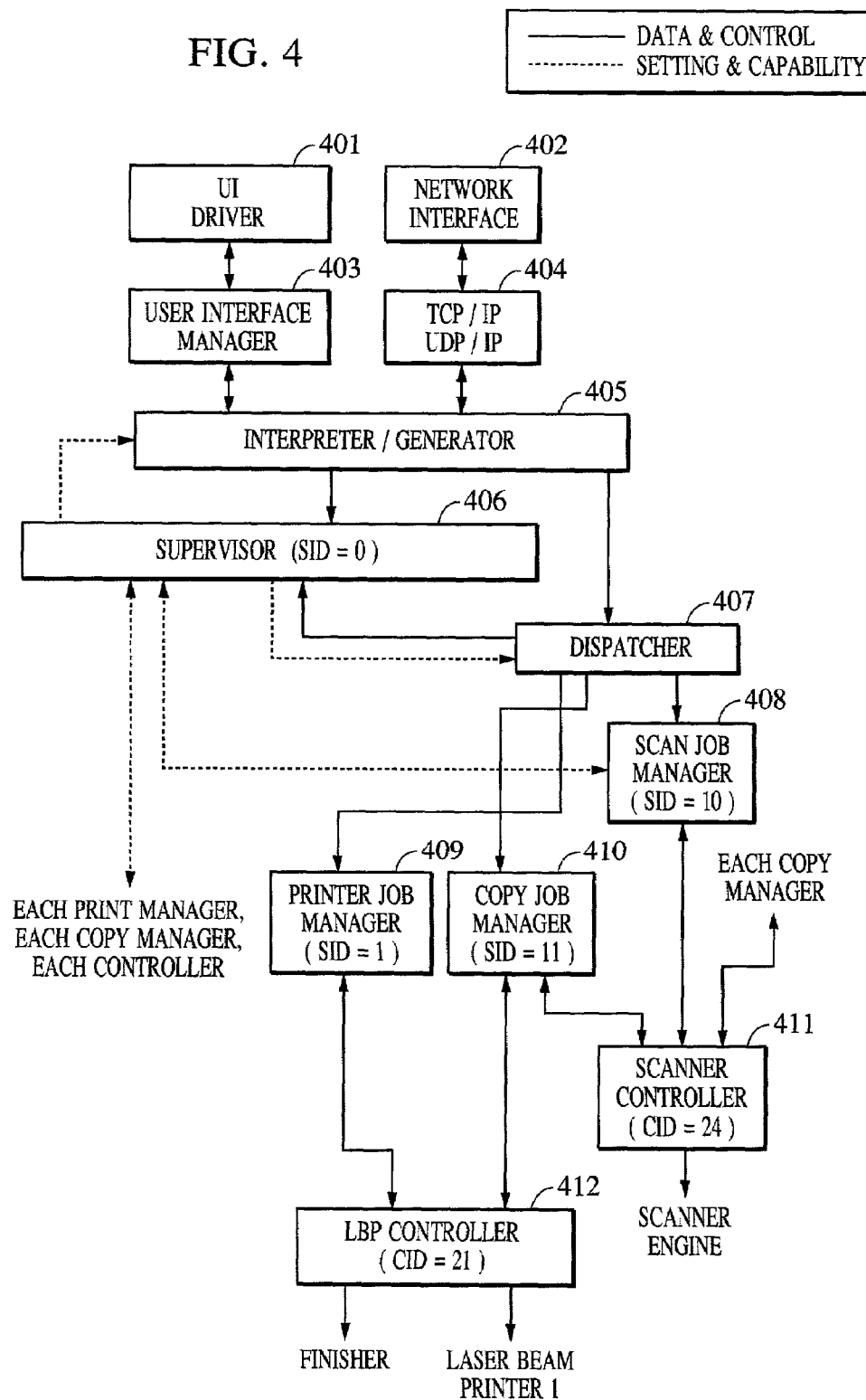
FIG. 4 is a block diagram showing a software configuration of a DISK in the controller.

FIG. 4 is a block diagram showing a software (control program) configuration of the DISK 304 in the controller 101. The software is executed by the CPU 301. In FIG. 4, a solid line represents data and control, and a dotted line represents setting and acquirement of capability.

Numeral 401 denotes a user interface (UI) driver, which controls the LCD display 306 and the keyboard 307. Numeral 403 denotes a user interface manager (control program), which interprets input information entered from the user through the UI driver 401, generates a command packet, and outputs the command packet to an interpreter (control program) 405. Details of the command packet structure will be described later with reference to FIG. 18.

Numeral 402 denotes a network interface driver (control program), which controls the network interface 105 and performs processing of a network packet in a physical layer, i.e., extraction of a transport packet from a physical packet and generation of a physical packet from a transport packet. Numeral 404 denotes a TCP/IP & UDP/IP processing module, which executes processing of a transport packet outputted from the network interface driver 402 to extract a command packet and outputs the command packet to the interpreter 405. Also, the module 404 generates a transport packet from a command packet outputted from the interpreter 405 and outputs the transport packet to the network interface driver 402.

Numeral 405 denotes an interpreter, which sends and receives a command packet, and controls job services provided in various connection types. Numeral 406 denotes a supervisor (supervising manager), which holds various data, such as represented by a supervisor attribute table of FIG. 5 and a service ID (SID) versus task type correspondence table of FIG. 9 described later, in the DISK 304, and which supervises the operation of the controller 101. The supervisor 406 refers to and changes, in accordance with an instruction of an inputted command, various data held in itself, various data held in each manager (print job manager 409, scan job manager 408, and copy job manager 410), and various data held in each controller (printer controller 412 and scanner controller 411).

Numeral 407 denotes a dispatcher, which delivers a command packet to the print job manager (control program) 409, the copy job manager (control program) 410, and the scan job manager (control program) 408.

Numeral 408 denotes a scan job manager, which controls management of scanner resources and execution of a job. Numeral 409 denotes a print job manager, which controls management of printer resources and execution of a job. A printer controller 412 and a print engine connected to the printer controller 412 are decided with respect to the print job manager 409. Which printer controller (control program) is used is described in data denoted by an attribute ID 2001 in FIG. 10 (print manager attribute table). This embodiment uses only one controller. The print job manager 409 holds, in the DISK 304, data such as shown in FIG. 11 (job table) and FIG. 12 (job request table) representing respectively inputted print jobs and what jobs are executed by the printer controller 412 in accordance with the inputted print jobs. The printer controller 412 holds, in the DISK 304, data such as shown in FIG. 15 (attribute table) representing the functions, status and capability of a corresponding printer engine. Also, the printer controller 412 holds, in the DISK 304, data such as shown in FIG. 16 (job queue table) representing the status of the inputted print jobs.

Numeral 410 denotes a copy job manager, which manages copy resources and a copy job. The copy job manager 410 holds, in the DISK 304, data such as shown in FIG. 14 (copy manager attribute table). A printer controller and a scanner controller used to process a copy job, and a print engine and a scanner engine connected to those controllers, respectively, are decided with respect to the copy job manager 410. Which printer controller and scanner controller are used is described in data (attribute ID 2001) shown in FIG. 14 (copy manager attribute table). This embodiment uses only one printer and scanner controller. The copy job manager 410 holds, in the DISK 304, data such as shown in FIG. 11 (job table) and FIG. 12 (job request table) representing respectively inputted copy jobs and what jobs are executed by the printer controller and the scanner controller in accordance with the inputted print jobs.

Numeral 411 denotes a scanner controller, which operates a scanner unit in response to a request from the scan job manager 408. Numeral 412 denotes a printer controller, which operates a printer unit in response to a request from the print job manager 409.

FIG. 5 is a supervisor attribute table representing data that is held in the DISK 304 and managed by the supervisor 406. The supervisor attribute table represents, for example, an outline of the functions, connection information and security information of the MFP 201. In the supervisor attribute table, each row indicates one information unit (record), and data is constituted as a set of plural records. Each record is made up of an attribute ID 501, a type ID 502 and a value 503, and represents one attribute of the supervisor. The attribute ID 501 represents the type of information and indicates the meaning denoted by the value 503. The attribute ID 501 is unique in the MFP, and the same attribute ID 501 indicates the same type of information. The type ID 502 represents what data type the value 503 has, and is employed to interpret the value 503. The type ID is uniquely decided depending on the attribute ID, and therefore it is uniquely defined in the MFP. While in this embodiment both the attribute ID 501 and the type ID 502 are listed in the supervisor attribute table, it is also possible to hold a correspondence table between the attribute ID and the type ID as data separate from the supervisor attribute table, and to put only the attribute ID and the value in the supervisor attribute table. The value 503 represents an attribute value depending on the attribute ID 501.

FIG. 6 is a list showing details of the attribute ID 501 and the type ID 502 in the supervisor attribute table shown in FIG. 5.

FIG. 7 is a subaddress versus service ID correspondence table. This table is held in the DISK 304 as an attribute value of the attribute ID "1001" (subaddress versus service ID correspondence table) in the supervisor attribute table shown in FIG. 5. The subaddress versus service ID correspondence table represents what kind of service (e.g., print) is obtained by loading a command packet in which subaddress. Also, in accordance with, e.g., an effective flag set in the subaddress versus service ID correspondence table, the interpreter 405 controls for each connection type whether the job service is to be provided. In the table, each row indicates one information unit (record), and data is constituted as a set of plural records. Each record is made up of a connection type ID 701, a subaddress 702, a service ID 703, an effective flag 704, an available user list 705, and an unavailable user list 706. The connection type ID 701 denotes an identifier indicating the connection type.

FIG. 8 represents the meaning of the connection type ID. Specifically, "0" represents "INTERNAL" (user interface, "1" represents TCP/IP (network), "2" represents IEEE1284.4 (IEEE1284), "3" represents SBP-2 (IEEE1394), and so on.

FIG. 9 is a service ID versus task type correspondence table. This table is held in the DISK 304 as an attribute value of the attribute ID "1002" (SID versus task type correspondence table) in the supervisor attribute table shown in FIG. 5. The service ID versus task type correspondence table represents what kind of service is provided by a service ID. In the table, each row indicates one information unit (record), and data is constituted as a set of plural records.

Each record is made up of a service ID "901" and a task type "902". The task type "902" represents what kind of service is provided. Numeral "903" indicates the meaning of each value of the task type "902". Specifically, "0" represents service provided by the supervisor, "1" represents print, "2" represents scan, and "3" represents copy. The service IDs correspond to the service providing managers in a one-to-one relation. Therefore, the service ID is also used when making an access to a function table held in each manager.

The printer controller and the scanner controller also have functions tables. A controller ID (CID) corresponding to the service ID is assigned to each of the printer controller and the scanner controller for making an access to those controllers. Therefore, the service ID versus task type correspondence table also represents what kind of controller is meant by the controller ID. The task type "201" represents the printer controller and "202" represents the scanner controller. The controller IDs correspond to the controllers shown in FIG. 4 (software block diagram) in a one-to-one relation.

FIG. 10 is a print job manager attribute table representing data (attribute table) that is held in the DISK 304 by each print job manager (control program) 409. This print job manager attribute table indicates the capabilities and functions of print jobs capable of being handled by the print job manager. In the table, each row indicates one information unit (record), and data is constituted as a set of plural records.

Figure 20:
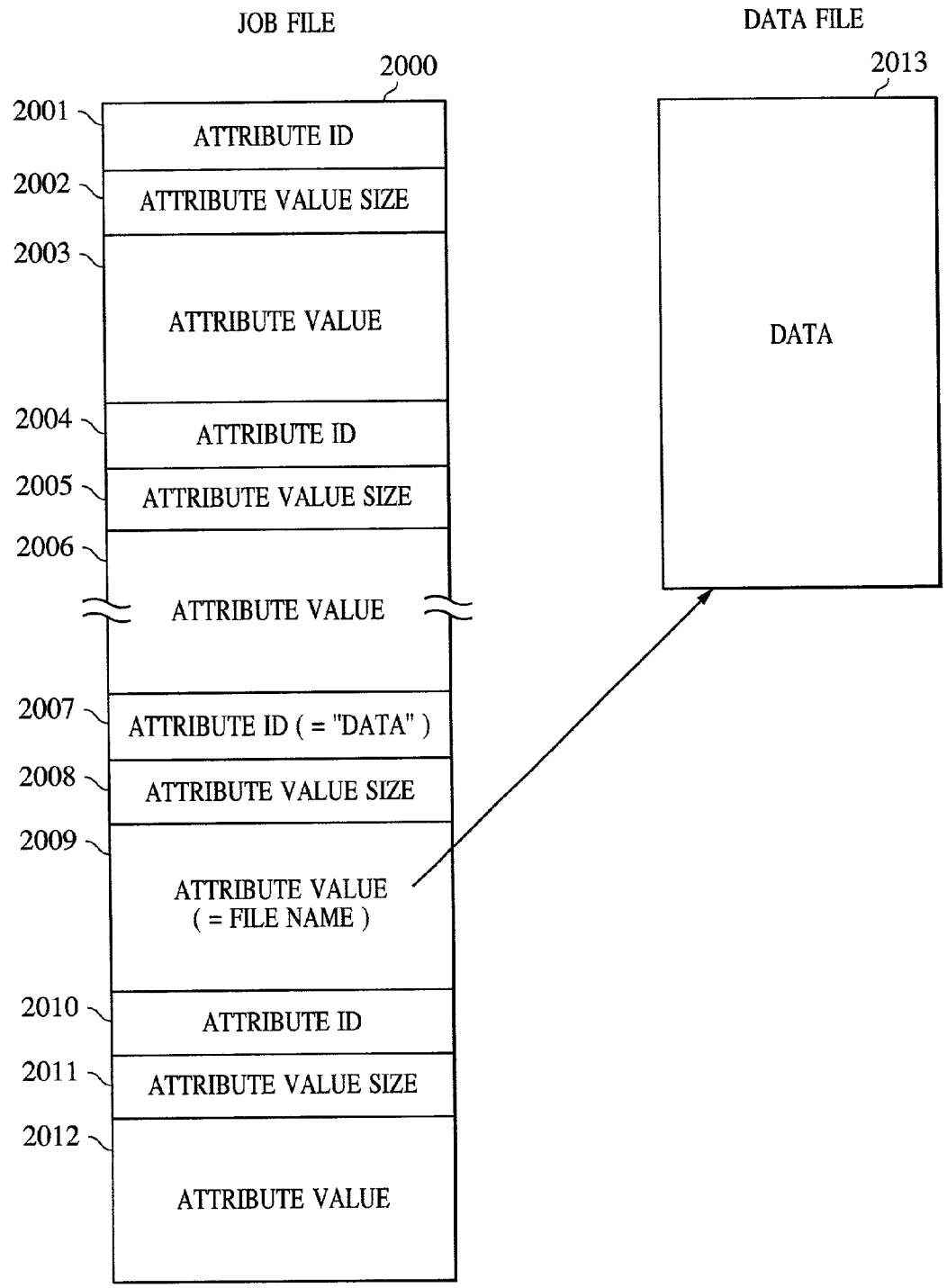
FIG. 20 represents a structure of a file (job data) holding job contents managed by each manager.

FIG. 11 is a job table representing data that is held by the print job manager. This job table indicates correspondence between the name of a file, which holds job contents managed by the print job manager, and a job ID. This table is held in the RAM 302 as an attribute value of the attribute ID "2003" (job table) in the print manager attribute table shown in FIG. 10. The print job manager dynamically changes the job table on the RAM 302 and stores table data in the DISK 304 as required. In the table, each row indicates one information unit (record), and data is constituted as a set of plural records. Each record is made up of a job ID 1101 and a job file name 1102 holding job contents. The job ID 1101 is an identifier that is assigned to a job by the print job manager when the job is loaded in the print job manager. The job file name 1102 is the name of a job file in which job contents are held. As shown in FIG. 20 (job data structure), the job contents are made up of plural sets of attribute ID, attribute value size, and attribute value.

FIG. 12 is a job request table held by the print job manager. This job request table represents the relationship between jobs managed by the print job manager and jobs executed by the controllers. This table is held in the DISK 304 as an attribute value of the attribute ID "2004" (job request table) in the print manager attribute table shown in FIG. 10. The job request table indicates which controller executes the job managed by the print job manager as what kind of job. In the table, each row indicates one information unit (record), and data is constituted as a set of plural records. Each record is made up of a job ID 1201, a controller ID 1202, and a job ID 1203 assigned in the controller. The job ID 1201 is an identifier that is assigned to a job by the print job manager when the job is loaded in the print job manager, and it corresponds to the job ID 1101 in the job table (FIG. 11). The controller ID 1202 represents the ID of the controller in which the job is executed. The job ID 1203 is a job identifier assigned by the controller executing the job.

FIG. 13 is a scan job manager attribute table representing data that is held by the scan job manager 408. This attribute table indicates the capabilities and functions of scan jobs capable of being handled by the scan job manager. In the table, each row indicates one information unit (record), and data is constituted as a set of plural records.

FIG. 14 is a copy job manager attribute table representing data that is held by the copy job manager. This attribute table indicates the capabilities and functions of copy jobs capable of being handled by the copy job manager. In the table, each row indicates one information unit (record), and data is constituted as a set of plural records. FIG. 15 is a printer controller attribute table representing data (attribute table) that is held in the DISK 304 by the printer controller 412. This attribute table indicates the capabilities and functions of the print engine and the finisher controlled by the printer controller. Values regarding the capabilities and functions are not rewritable. In the table, each row indicates one information unit (record), and data is constituted as a set of plural records.

FIG. 16 is a job queue table representing a job queue that is held by the printer controller 412. This table is held in the DISK 304 as an attribute value of the attribute ID "5005" (job queue table) in the printer controller attribute table shown in FIG. 15. The job queue table indicates in which status is the job that is managed and executed by the printer controller. In the table, each row indicates one information unit (record), and data is constituted as a set of plural records. Each record is made up of a job ID 1601, a job status 1602, and a job file name 1603 holding job contents. The job ID 1601 is an identifier that is assigned to a job by the printer controller when the job is loaded in the printer controller.

Numeral 1604 indicates the meaning of the job status 1602 in FIG. 16 (job queue table). Specifically, "1" represents the status under job end processing, "2" represents the status under execution of the job by the engine, and "3" represents the status waiting for execution. The job file name 1603 is the name of a job file in which job contents are held. AS shown in FIG. 20 (job data structure), the job contents are made up of plural sets of attribute ID, attribute value size, and attribute value.

FIG. 17 is a scanner controller attribute table representing data that is held in the DISK 304 by the scanner controller 411. This attribute table indicates the capabilities and functions of the scanner engine controlled by the scanner controller. Values regarding the capabilities and functions are not rewritable. In the table, each row indicates one information unit (record), and data is constituted as a set of plural records.

Figure 18:
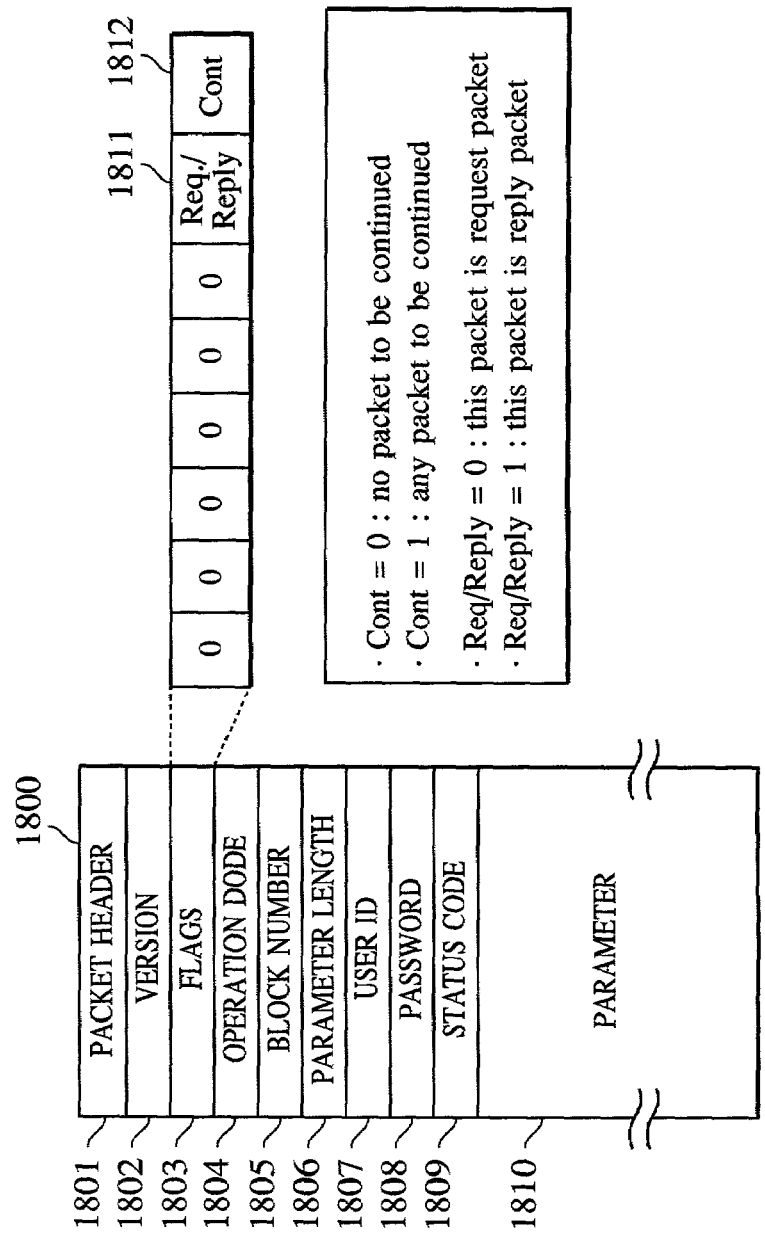
FIG. 18 represents a structure of a command packet outputted to an interpreter.

FIG. 18 represents a structure of a command packet outputted to the interpreter 405 from the user interface manager 403 and the TCP/IP & UDP/IP processing module 404. Also, FIG. 18 represents a structure of a reply packet and an event packet both outputted from the interpreter 405 to the user interface manager 403 and the TCP/IP & UDP/IP processing module 404. The packet is made up of a packet header 1801 representing the packet head; a packet version 1802 representing a packet structure version; a flag 1803 representing a packet character; an operation code 1804 representing what kind of operation is to be performed; a block number 1805 used by a client (PC) for recognizing the reply packet; a parameter length 1806 representing the length of a parameter 1810; a user ID 1807 and a password 1808 used for user identification; a status code 1809 representing a general status of a reply used only in the reply packet; and a parameter 1810 having a format decided for each operation code 1805.

The parameter 1810 includes an access target service ID, an access target attribute ID, etc. The flag 1803 includes a Req/Reply 1811 indicating whether the packet is a request (command/event) packet or a reply packet, and a continuance (Cont) flag 1812 indicating that the data to be sent overflows from the parameter 1810 and continued data is put in a packet sent subsequently.

Figure 19:
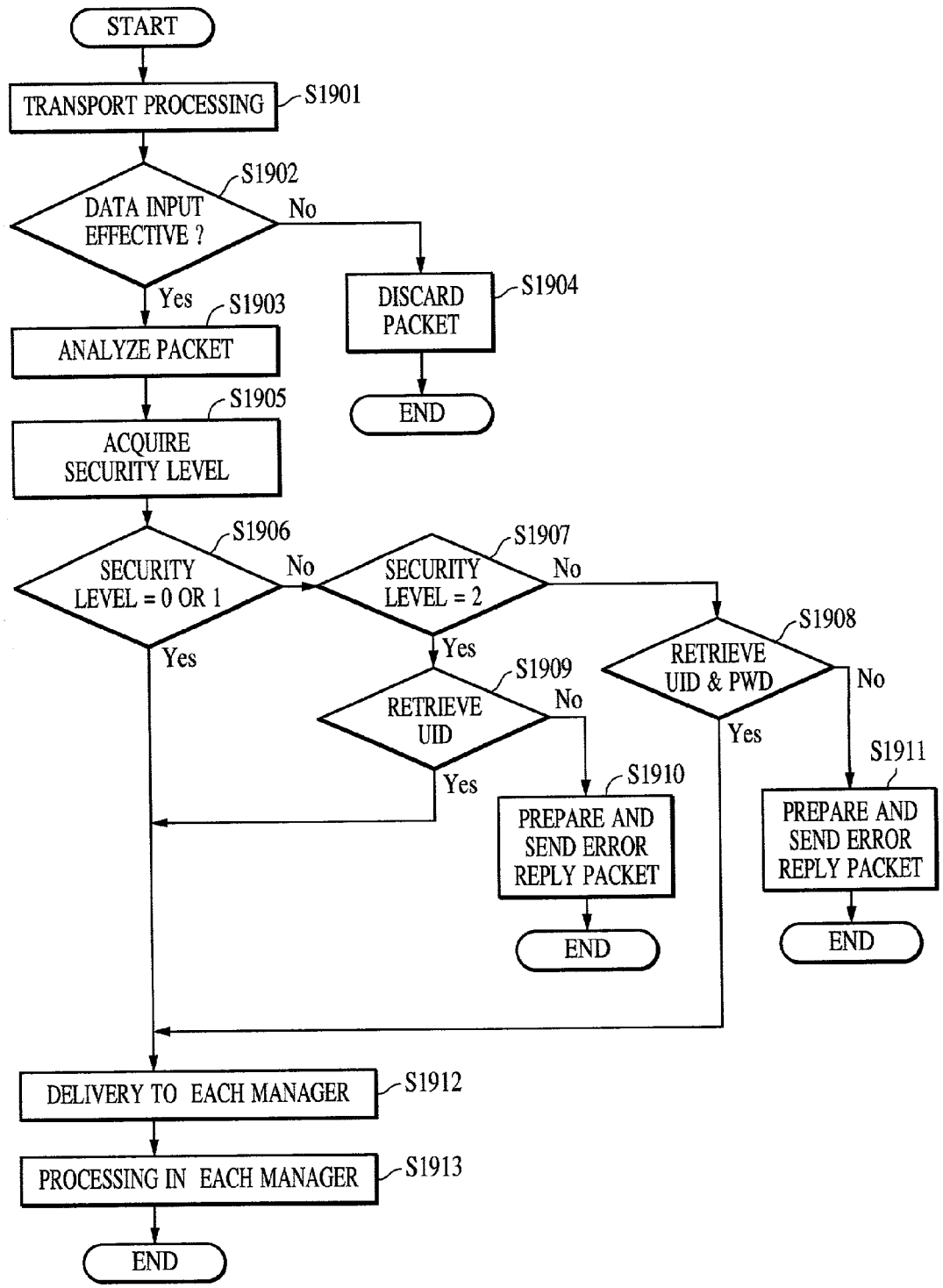
FIG. 19 is a flowchart showing a process flow of the command packet in the MFP.

FIG. 19 shows a process flow of the command packet in the MFP 201. First, the TCP/IP & UDP/IP processing module 404 processes data inputted from the network interface driver 402 and extracts a command packet shown in FIG. 18 (command packet structure). The extracted command packet is inputted (S1901) to the interpreter 405 from the TCP/IP & UDP/IP processing module 404 along with information of the connection type (connection type ID) and a subaddress, which have been used to input the data. The interpreter 405 refers to FIG. 9 (service ID versus task type correspondence table) held in the supervisor 410 and compares the inputted connection type ID with the inputted subaddress, thereby obtaining a service ID and checking whether the data input is effective (S1902).

If the check result in step S1902 shows that the data input is not effective (No), the command packet is discarded and the process flow is ended (S1904). If the check result in step S1902 shows that the data input is effective (Yes), the command packet is analyzed in accordance with the command packet structure shown in FIG. 18. As a result of analyzing the packet, the items shown in FIG. 18 (command packet structure) are outputted as separate independent information (S1903), and a security level is acquired based on the service ID (S1905).

Then, it is determined whether the security level acquired in step S1905 is any of "0" and "1" or otherwise (S1906). If the determination result in step S1906 shows that the security level is "0" or "1" (Yes), the data is inputted to the dispatcher 407 without further checking the security level, and a process subsequent to step S1912 is executed. If the determination result in step S1906 shows that the security level is other than "0" or "1" (No), it is determined whether the security level is "2" (S1907).

If the determination result in step S1907 shows that the security level is "2" (Yes), it is checked whether a user ID is included in the command packet (S1909). If the check result in step S1909 shows that any user ID is not included (No), this is regarded as being a not privileged access and error reply information is generated. Then, the interpreter 405 generates a packet (in which the error information is embedded in the status code "1909") and sends the packet back to the command packet sending source (S1910), thereby ending the process flow. If the check result in step S1909 shows that a user ID is included (Yes), data is inputted to the dispatcher 407 and the process subsequent to step S1912 is executed. A sending source address is extracted from a transport packet (Header).

If the determination result in step S1907 shows that the security level is other than "2" (No), it is checked whether a pair of user ID and password is included in the command packet (S1908).

If the check result in step S1908 shows that any pair of user ID and password is not included (No), this is regarded as being a not privileged access and error reply information is generated. Then, the interpreter 405 generates a packet and sends the packet back to the command packet sending source (S1911), thereby ending the process flow. If the check result in step S1908 shows that a pair of user ID and password is included (Yes), data is inputted to the dispatcher 407 and the process subsequent to step S1912 is executed. After the data has been inputted to the dispatcher 407, the dispatcher 407 decides in step S1912 a manager, to which the data is to be delivered, based on the service ID. Then, the dispatcher 407 delivers, to the decided manager, the connection type and the subaddress, in which the data has been inputted, the sending source address, the operation code, the block number, the flag information, the user ID, the password, the parameter length, and the parameter. Thereafter, each manager processes the delivered information (S1913), thereby ending the packet processing.

FIG. 20 represents an internal structure of a file (job file) holding job contents, i.e., a structure of job data, managed by each manager. The file name of the job file is held by the file name 1102 in FIG. 11 (job table). That file structure also represents an internal structure of a file holding the contents of a job that is managed by each controller. The name of this file is held by the file name 1603 in FIG. 16 (job queue table). The job contents are represented by successively combining plural sets of attribute ID 2001, attribute value size 2002, and attribute value 2003. In FIG. 20, numerals 2004 to 2006, numerals 2007 to 2009, and numerals 2010 to 2012 each correspond to one set. When the job contains data, as denoted by 2007, 2008 and 2009, a value representing the data is held as the attribute ID, a file name size is held as the attribute value size, and the name of a file (data file 2013) holding document data is held as the attribute value, respectively. The attributes include a data sending method, a data format (e.g., PDL in use), information regarding the type of event and the destination to which an event notice is sent when an event occurs, and information depending on the job type (e.g., the number of copies/prints, the number of copy/print pages, and designation of the finishing process in the case of a print job)

Figure 21:
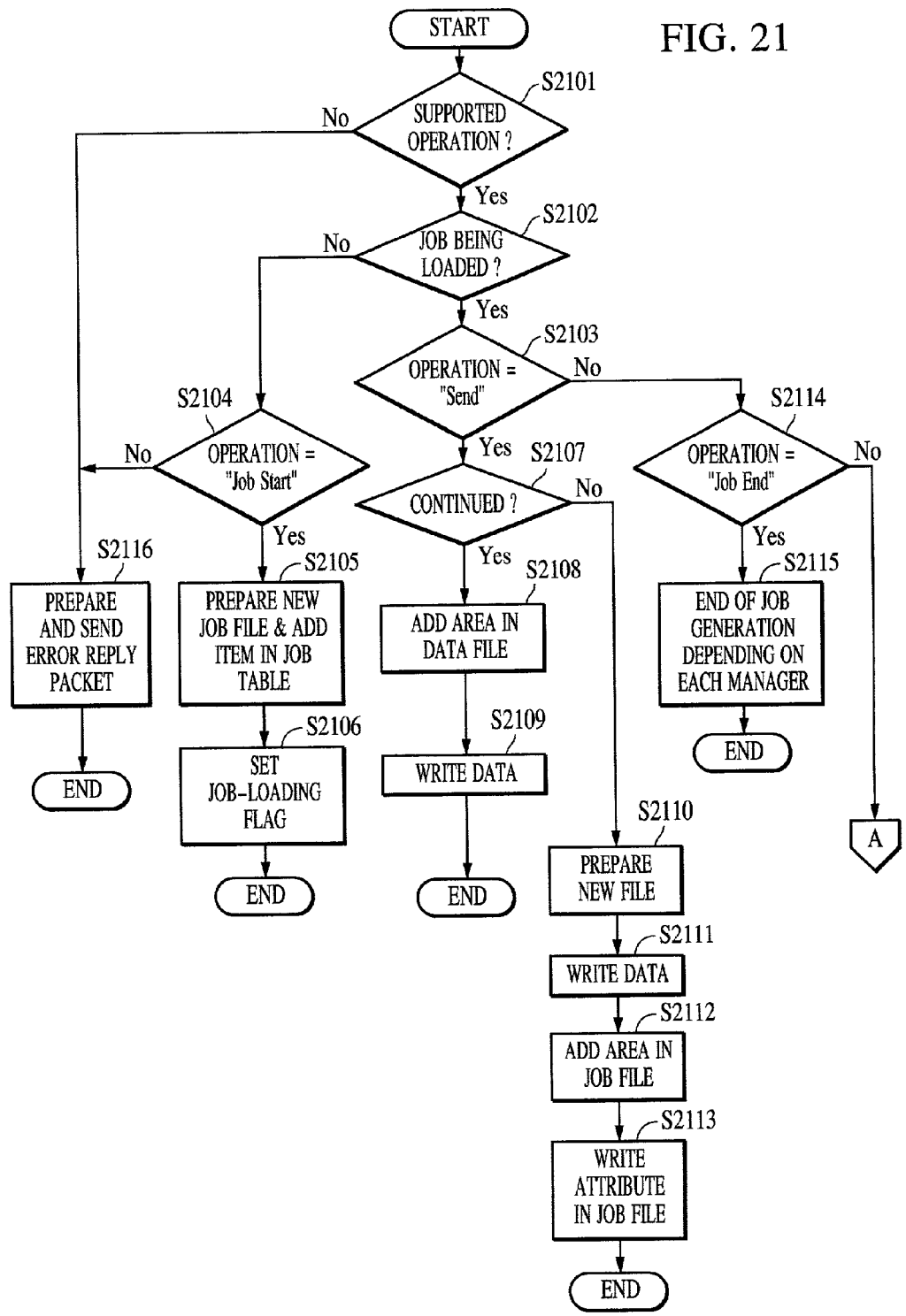
FIG. 21 is a flowchart showing a job loading process 1 in each manager.
Figure 22:
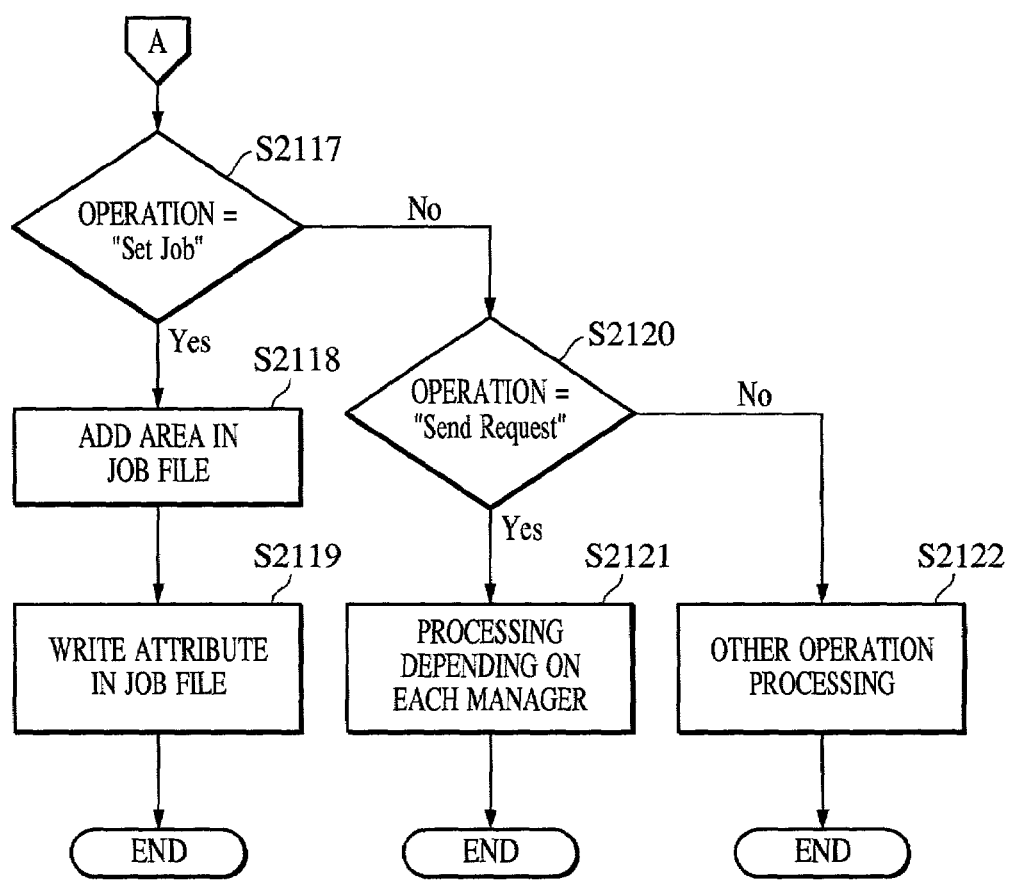
FIG. 22 is a flowchart showing a job loading process 2 in each manager.

FIG. 21 (job loading process 1) and FIG. 22 (job loading process 2) each show a job script process flow executed in each manager. A job script is constituted by a series of command packets each shown in FIG. 18 (command packet structure), and is defined as starting from an operation code "Job Start" and ending at an operation code "Job End". Each of the packets constituting the job script is loaded in a subaddress indicated in the subaddress versus service ID correspondence table shown in FIG. 7, and is delivered to each manager through the command packet process flow shown in FIG. 19 (packet processing).

The process flows shown in FIGS. 21 and 22 each represent the case of processing the command packet delivered to each manager and preparing a job file and a data file shown in FIGS. 20 (job data structure).

First, it is checked whether the operation delivered to each manager has a supported operation code. This check is performed by comparing an operation code with a value of the "supported operation" attribute (attribute ID "101" that is held in the attribute table by the manager (S2101). If the check result in step S2101 shows that the delivered operation is one other than supported (No), an error reply packet is prepared and sent back (S2116), thereby ending the process flow. If the check result in step S2101 shows that the delivered operation code is a supported one (Yes), it is checked whether a job is now being loaded. This check is performed by looking up whether a job-loading flag (flag set in step S2106) is true (S2102). If the look-up result in step S2102 shows that the job-loading flag is false and the job is not being loaded (No), it is checked whether the operation code is "Job Start" (S2104). If the check result in step S2104 shows that the operation code is not "Job Start" (No), an error reply packet is prepared and sent back (S2116), thereby ending the process flow. If the operation code is "Job Start" (Yes) in step S2104, a job ID is assigned, an item is added in FIG. 11 (job table), and a new job file is prepared (S2105). Then, the job-loading flag is set true and the command packet process flow is ended (S2106).

If the check result in step S2102 shows that the job-loading flag is true (Yes), it is checked whether the operation code is "Send" (S2103). The operation code "Send" indicates to the manager the fact that the parameter contains data constituting a job.

If the operation code is "Send" (Yes) in step S2103, a continuance flag inputted together with the command is checked (S2107). If the continuance flag is true (Yes), a new area is added to the data file 2013 that has already been prepared (S2108) and the parameter is written in the added area (S2109), thereby ending the process flow.

If the continuance flag is false (No) in step S2107, a new data file 2103 is prepared (S2110) and the parameter is written in the data file (S2111). Then, a new area is added to the job file (S2112), and the attribute ID 2007 representing the data, the file name size 2008 and the name 2009 of the newly prepared job file are written in the added area (S2113), thereby ending the process flow.

If the operation code is not "Send" (No) in step S2103, it is checked whether the operation code is "Job End" (S2114). If the operation code is "Job End" (Yes) in step S2114, a job generation ending process is executed (S2115), thereby ending the process flow. The job generation ending process includes, e.g., a process of closing the job file, and differs depending on the type of manager (i.e., print job, scan job or copy job).

If the operation code is not "Job End" (No) in step S2114, it is checked whether the operation code is "Set Job" (S2117). The operation code "Set Job" indicates to the manager the fact that the parameter contains an attribute (attribute ID and attribute value) constituting a job. If the operation code is "Set Job" (Yes) in step S2117, a new area is added to the job file (S2118), and the attribute ID, the attribute value size and the attribute value are written in the added area (S2119), thereby ending the process flow.

If the operation code is not "Set Job" (No) in step S2117, it is checked whether the operation code is "Send Request" (S2120). The operation code "Send Request" instructs the manager to send data, and the parameter contains the data sending method.

If the operation code is "Send Request" (Yes) in step S2120, a process depending on each manager is executed (S2121), thereby ending the process flow. When the manager is the scan job manager, the process to be executed in step S2121 includes the steps of instructing the scan controller to scan a document in accordance with the attribute value held in the job file, and sending the scanned data by the designated method. If the operation code is not "Send Request" (No) in step S2120, processing of other operation codes is executed (S2122), thereby ending the process flow.

Figure 23:
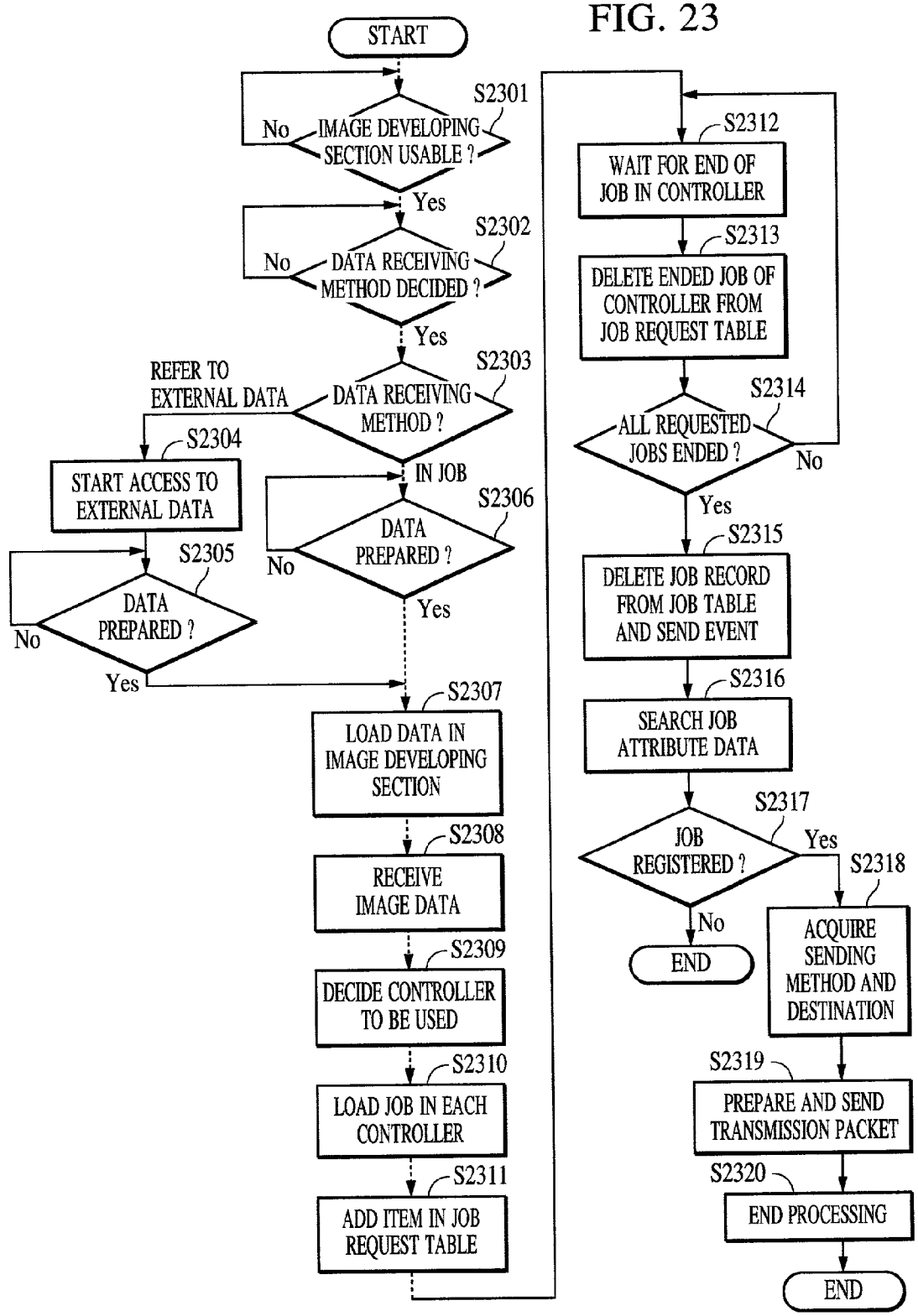
FIG. 23 is a flowchart showing a job process flow in the print job manager.

FIG. 23 shows a job process flow in the print job manager 409 shown in FIG. 4 (software block diagram). The print job manager 409 always operates a task for monitoring the job file at all times. When the print job manager 409 executes the job script process flow shown in FIG. 21 (job loading process 1) and FIG. 22 (job loading process 2) and detects that a new item has been added in the job table upon inputting of the operation code "Job Start", the monitoring task operates a task having the process flow shown in FIG. 23 (job processing by the print job manager) so that the inputted job is processed.

First, the print job manager waits until an attribute indicating the type of an image (PDL or bit map) used in expression of data (document data) is added in the job file, and after the image type has been determined, it further waits until image development is enabled (S2301). If image development is enabled (Yes) in step S2301, it waits until an attribute indicating the data receiving method is added in the job file (S2302).

If the attribute indicating the data receiving method is added in the job file and the data receiving method is decided (Yes) in step S2302, the data receiving method is checked (S2303). If the check result in step S2303 shows that the data receiving method is one accessing the exterior (e.g., a client PC on the network) of the MFP 201, a task for reading the designated data is generated and an access to the exterior is made (S2304). Then, the print job manager waits for the start of reading of the data (S2305). If the check result in step S2303 shows that the data is contained in the job (i.e., the data is received in accordance with the operation code "Send" in FIGS. 21 and 22), it waits for the start of receiving of the data (S2306). If reading or receiving of the data is started (Yes) in step S2305 or S2306, the print job manager starts loading the data into an image developing section (S2307). Thereafter, it receives image data from the image developing section (S2308). Subsequently, the print job manager decides a printer controller to be used (S2309), loads the image data into the printer controller, and receives a job ID from the printer controller (S2310). A relevant job ID, the printer controller ID, and the job ID received from the printer controller are recorded in the job request table, shown in FIG. 12, as a record separate for each printer controller (S2311).

The print job manager waits for the end of job in the printer controller (S2312). When the end of job is notified from the printer controller, it deletes the corresponding job record from the job request table (S2313).

It is then checked whether all jobs requested for the printer controller have been ended (S2314). If any job still remains in the printer controller (No) in step S2314, the print job manager returns to step S2312 and waits for the end of job in the printer controller.

If the requested jobs are all ended in the printer controller (Yes) in step S2314, it deletes the corresponding job record from the job table shown in FIG. 11 (S2315). At this time, an event sending process, described later in connection with FIG. 27 (event sending), is executed. Then, the job file is searched (S2316) to check whether there is an attribute value indicating transmission of an event with regard to the end of job (S2317).

If there is no attribute value (No) in step S2317, the process flow is ended, but if there is any attribute value (Yes), the attribute value is read to acquire the sending method and destination (S2318). Subsequently, the print job manager prepares an event sending packet and sends the packet to the designated sending destination by the designated sending method (S2319). Thereafter, an ending process such as deleting the job file and the data file is executed (S2320), thereby ending the job process flow.

Figure 24:
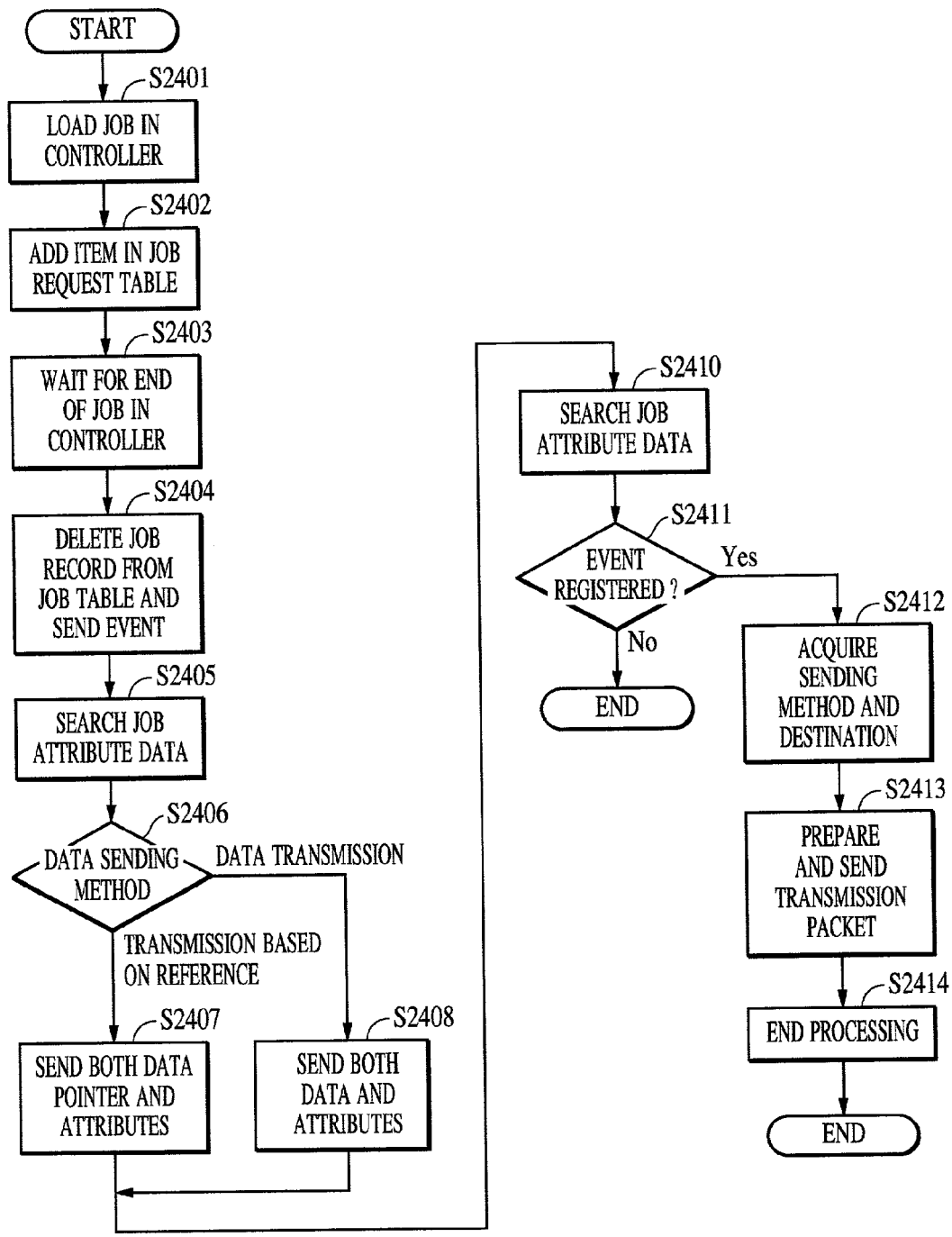
FIG. 24 is a flowchart showing a job process flow in the scan job manager.

FIG. 24 shows a job process flow in the scan job manager 408. The scan job manager 408 starts processing of a job after the job has been loaded therein. Thus, the scan job manager 408 starts the job process flow of FIG. 24 (job processing by the scan job manager) from the job ending process in step S2115 of FIG. 21 (job loading process 1) and FIG. 22 (job loading process 2).

First, the scan job manager 408 loads a job into the scanner controller 411, and receives a job ID from the scanner controller (S2401). A relevant job ID, the scanner controller ID, and the job ID received from the scanner controller 411 are recorded in the job request table shown in FIG. 12 (S2402). Then, the scan job manager waits for the end of job in the scanner controller 411 (S2403). When the end of job is notified from the scanner controller 411, it receives the scanned image data from the scanner controller 411 and deletes the corresponding job record from the job table shown in FIG. 11. At this time, an event sending process, described later in connection with FIG. 27 (event sending), is executed (S2404). Then, the job file is searched to check whether there is any of job attributes indicating the data sending method (S2405). The scan job manager determines the data sending method (S2406). If it is determined in step S2406 that the data sending method instructs transmission of data as a script, the data is sent as a script along with other attribute information (S2408). Details of the data sending process in the MFP will be described later with reference to FIG. 28 (access to the attribute table).

If it is determined in step S2406 that the data sending method instructs transmission of data based on reference, the scan job manager preserves the data therein and sends reference information for the data, as a script, along with other attribute information (S2407). Then, the job file is searched (S2410) to check whether there is an attribute value indicating transmission of an event with regard to the end of job (S2411).

If there is no attribute value (No) in step S2411, the process flow is ended, but if there is any attribute value (Yes), the attribute value is read to acquire the sending method and destination (S2412). Subsequently, the scan job manager prepares an event sending packet and sends the packet to the designated sending destination by the designated sending method (S2413). Thereafter, an ending process such as deleting the job file and the data file is executed (S2414), thereby ending the job process flow.

Figure 25:
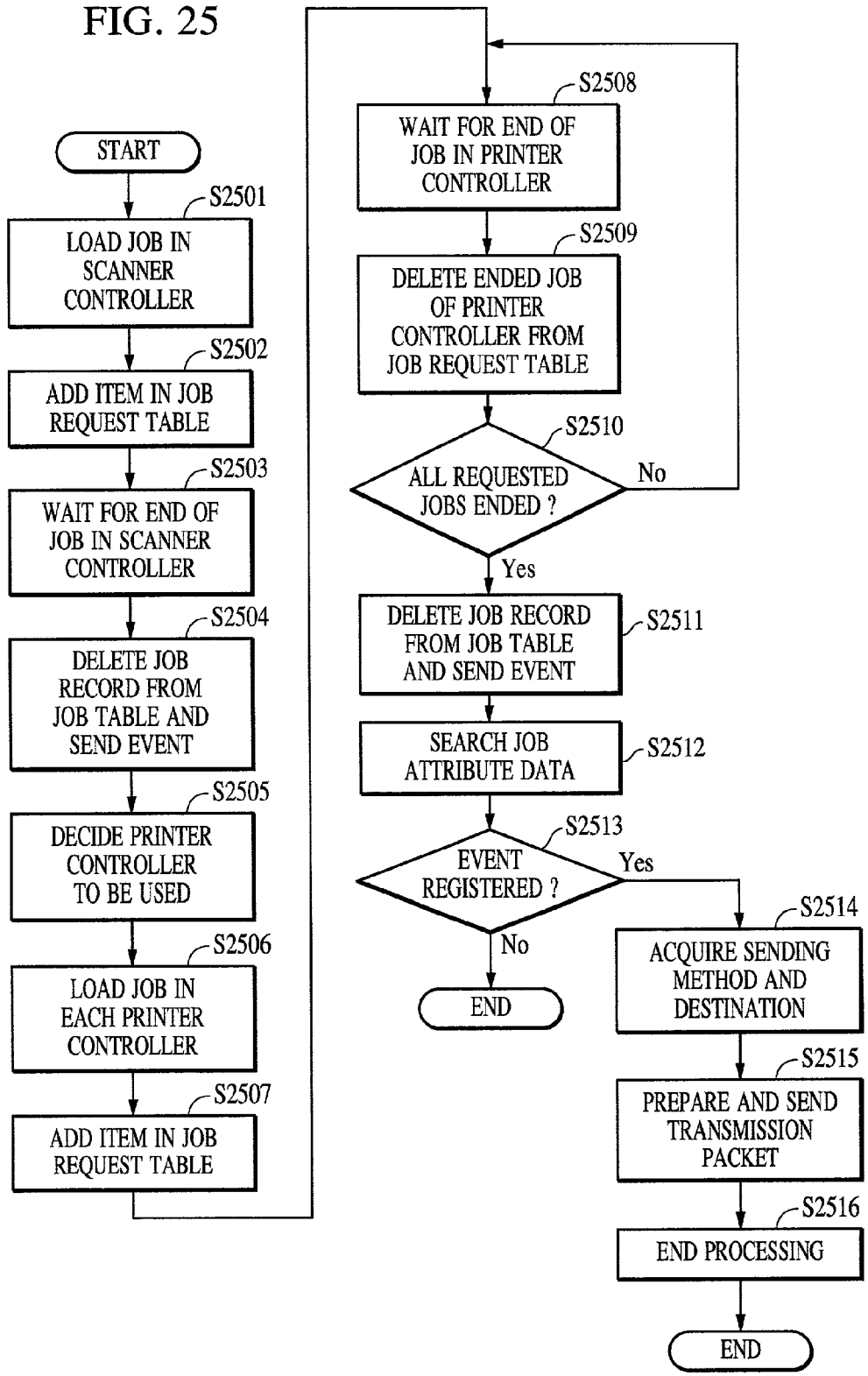
FIG. 25 is a flowchart showing a job process flow in the copy job manager.

FIG. 25 shows a job process flow in the copy job manager 410. The copy job manager 410 starts processing of a job after the job has been loaded therein. Thus, the copy job manager 410 starts the job process flow of FIG. 25 (job processing by the copy job manager) from the job ending process in step S2115 of FIG. 21 (job loading process 1).

First, the copy job manager 410 loads a job into the scanner controller 411, and receives a job ID from the scanner controller (S2501). A relevant job ID, the scanner controller ID, and the job ID received from the scanner controller 411 are recorded in the job request table shown in FIG. 12 (S2502).

Then, the copy job manager waits for the end of job in the scanner controller 411 (S2503). When the end of job is notified from the scanner controller 411, it receives the scanned image data from the scanner controller 411 and deletes the corresponding job record from the job table shown in FIG. 11 (S2504). Subsequently, the copy job manager decides a printer controller to be used (S2505). When the printer controller to be used is decided, the copy job manager loads the image data, received from the scanner controller 411, into each printer controller, and receives a job ID from the printer controller (S2506). A relevant job ID, the printer controller ID, and the job ID received from the printer controller are recorded in the job request table, shown in FIG. 12, as a record separate for each printer controller (S2507).

Thereafter, the copy job manager waits for the end of job in the printer controller (S2508). When the end of job is notified from the printer controller, it deletes the corresponding job record from the job request table (S2509).

It is then checked whether all jobs requested for the printer controller have been ended (S2510). If any job still remains in the printer controller (No) in step S2510, the copy job manager returns to step S2508 and waits for the end of job in the printer controller. If the requested jobs are all ended in the printer controller (Yes) in step S2510, it deletes the corresponding job record from the job table shown in FIG. 11. At this time, an event sending process, described later in connection with FIG. 27 (event sending), is executed (S2511). Then, the job file is searched (S2512) to check whether there is an attribute value indicating transmission of an event with regard to the end of job (S2513).

If there is no attribute value (No) in step S2513, the process flow is ended, but if there is any attribute value (Yes), the attribute value is read to acquire the sending method and destination (S2514). Subsequently, the copy job manager prepares an event sending packet and sends the packet to the designated sending destination by the designated sending method (S2515). Thereafter, an ending process such as deleting the job file and the data file is executed (S2516), thereby ending the job process flow.

FIG. 26 shows an event setting table and an event format table both held by the supervisor. The event setting table is held in the DISK 304 as attribute values of the attribute ID "502" (event setting table) in the attribute table shown in FIG. 5 (supervisor attribute table). The event setting table holds, for each type of event, both the method of sending an event notice and the sending destination when any designated event occurs in the MFP. In the table, each row indicates one information unit (record), and data is constituted as a set of plural records.

The event format table in FIG. 26 is held in the DISK 304 as attribute values of the attribute ID "503" (event format table) in the attribute table shown in FIG. 5 (supervisor attribute table). The event format table holds the format of addition data, which is sent as an event notice, for each event ID uniquely defined in the MFP.

In the table, each row indicates one information unit (record), and data is constituted as a set of plural records. Each record is made up of an event ID 2604 and an event format 2605. The event format 2605 indicates the format of addition data that is sent as an event notice, and is represented as a list of attribute IDs. Each attribute ID is uniquely defined in the MFP, and its type is uniquely decided depending on the attribute ID. By designating the attribute ID, therefore, the format of addition data can also be indicated. For example, the attribute ID "676" of the event format 2605 represents the sheet size, and ID "756" represents the type of paper. Further, ID "666" represents the type of toner, ID "698" represents the type of ink, and ID "600" represents the cover position. The event sending method and destination are set in data (attribute table) held in each manager and controller so that when any event occurs in the manager and controller, the event is notified. Thus, when the designated event occurs, the contents defined by the event format are notified along with data preset for each event ID.

Figure 27:
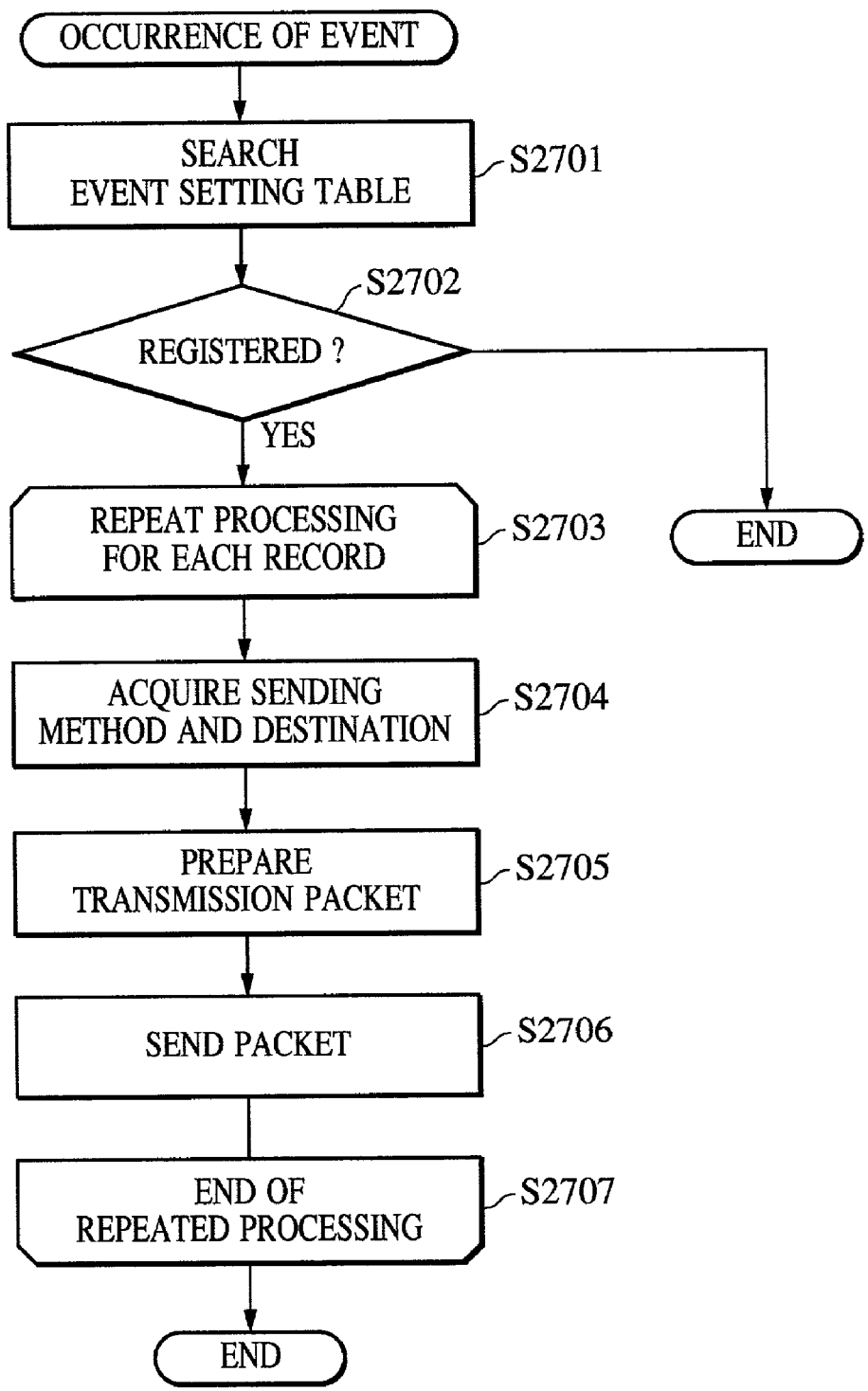
FIG. 27 is a flowchart showing a process flow of event sending in each manager.

FIG. 27 shows a process flow of event sending in each manager. The manager holds, as values of an attribute table held therein, the event setting table shown in FIG. 26 (event). As described above with reference to FIG. 26 (event), the event setting table contains the connection type and the destination by and to which an event is sent upon the occurrence of the event. More specifically, when a certain event occurs, each manager recognizes an event ID corresponding to the event.

Then, the manager refers to the event setting table and searches for the event ID registered therein (S2701). Subsequently, it determines whether the event ID is registered (S2702). If no event IDs are registered (No), the process flow is ended. If one or more event IDs are registered (Yes) in step S2702, the manager advances to repeat a subsequent process for each record (S2703). In the repeated process subsequent to step S2703, the manager first acquires, from the first record, the connection type which is used to send the event and the destination to which the event is sent (S2704). Then, it prepares an event sending packet (S2705). The manager puts in that packet both the parameter defined for each event ID and the parameter in accordance with the format for each event ID registered in the event setting table, shown in FIG. 26 (event), which is held in the supervisor 406. Subsequently, the manager sends the event sending packet to the sending destination in accordance with the connection type both obtained in step S2704 (S2706).

After executing the process from step S2704 to S2706, it is determined in step S2707 whether all records having event IDs have been processed. If not, the manager returns to step S2703 to repeat the above-described process, and if so, the process flow is ended.

Figure 28:
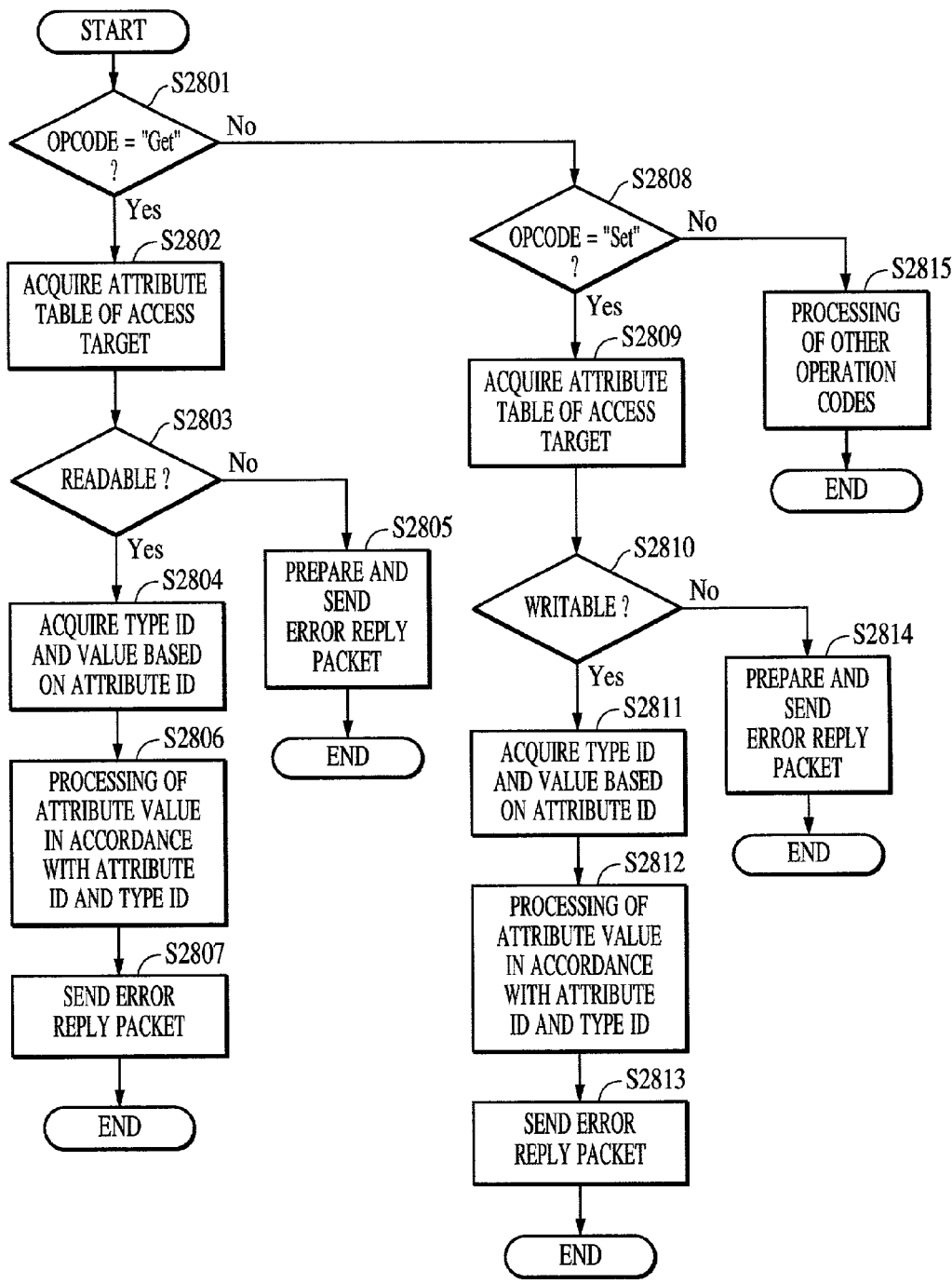
FIG. 28 is a flowchart showing a process flow of reading from and writing in the attribute table of each manager and each controller.

FIG. 28 shows a process flow of reading from and writing in the attribute table, held in the MFP 201, of each manager and each controller. Reading from and writing in the attribute table of each manager and each controller are performed by sending a proper command packet to a sub-address of the supervisor 406. An attribute-table reading command packet includes, as parameters, an access target service ID and an access target attribute ID. Also, an attribute-table writing command packet includes, as parameters, an access target service ID, an access target attribute ID, and an attribute value corresponding to the attribute ID. Packet data sent to the MFP 201 from a client is processed according to the flow shown in FIG. 19 (packet processing) and is delivered to the supervisor.

First, it is checked whether the operation code 1804 is an attribute-value reading code ("Get") (S2801). If the operation code is "Get", the whole of the attribute table of the access target is acquired based on the service ID (S2802). Specifically, the CPU acquires the attribute table of the supervisor 406 shown in FIG. 5 (supervisor attribute table) when the service ID is "0"; the attribute table of the print job manager 409 shown in FIG. 10 (print job manager attribute table) when the service ID is "1"; the attribute table of the scan job manager 408 shown in FIG. 13 (scan job manager attribute table) when the service ID is "10"; the attribute table of the copy job manager 410 shown in FIG. 14 when the service ID is "11"; and the attribute table of the printer controller 412 shown in FIG. 15 when the service ID is "21".

Then, it is checked whether the designated attribute value is readable (S2803). The check is performed by acquiring the values of "list of attribute IDs which can be read only by the managerial person" (attribute ID=105) in the target attribute table, and examining whether the designated attribute ID is contained in the acquired values. If the designated attribute ID is contained in the unreadable ones (No) in step S2803, the attribute value cannot be read. Therefore, an error sending packet is prepared (S2805) and sent back, thereby ending the process flow.

If the designated attribute ID is not contained in the unreadable ones (Yes) in step S2803, the attribute table is searched based on the designated attribute ID to acquire the type ID and the attribute value each having the relevant attribute ID (S2804). Then, a reply packet is generated in accordance with the type ID (S2806) and then sent back (S2807), thereby ending the process flow.

If the operation code is not "Get" (No) in step S2801, it is checked whether the operation code is an attribute-value writing code "Set" (S2808). If the operation code is "Set" (Yes) in step S2808, the whole of the attribute table of the access target is acquired based on the service ID (S2809). Then, it is checked whether the designated attribute value is writable (S2810). The check is performed by acquiring the values of "list of attribute IDS which can be set only by the managerial person" (attribute ID=104) in the target attribute table, and examining whether the designated attribute ID is contained in the acquired values.

If the designated attribute ID is contained in the unwritable ones (No) in step S2810, the attribute value cannot be written. Therefore, an error sending packet is prepared and sent back in step S2814, thereby ending the process flow. If the designated attribute ID is not contained in the unwritable ones (Yes) in step S2810, the attribute table is searched based on the designated attribute ID to acquire the type ID and the attribute value each having the relevant attribute ID (S2811). Then, the designated attribute value is set in accordance with the type ID, and a reply packet notifying the success of setting is generated (S2812) and then sent back (S2813), thereby ending the process flow. If the operation code is not "Set" (No) in step S2808, other processes are executed according to the operation codes (S2815), thereby ending the process flow.

Figure 29:
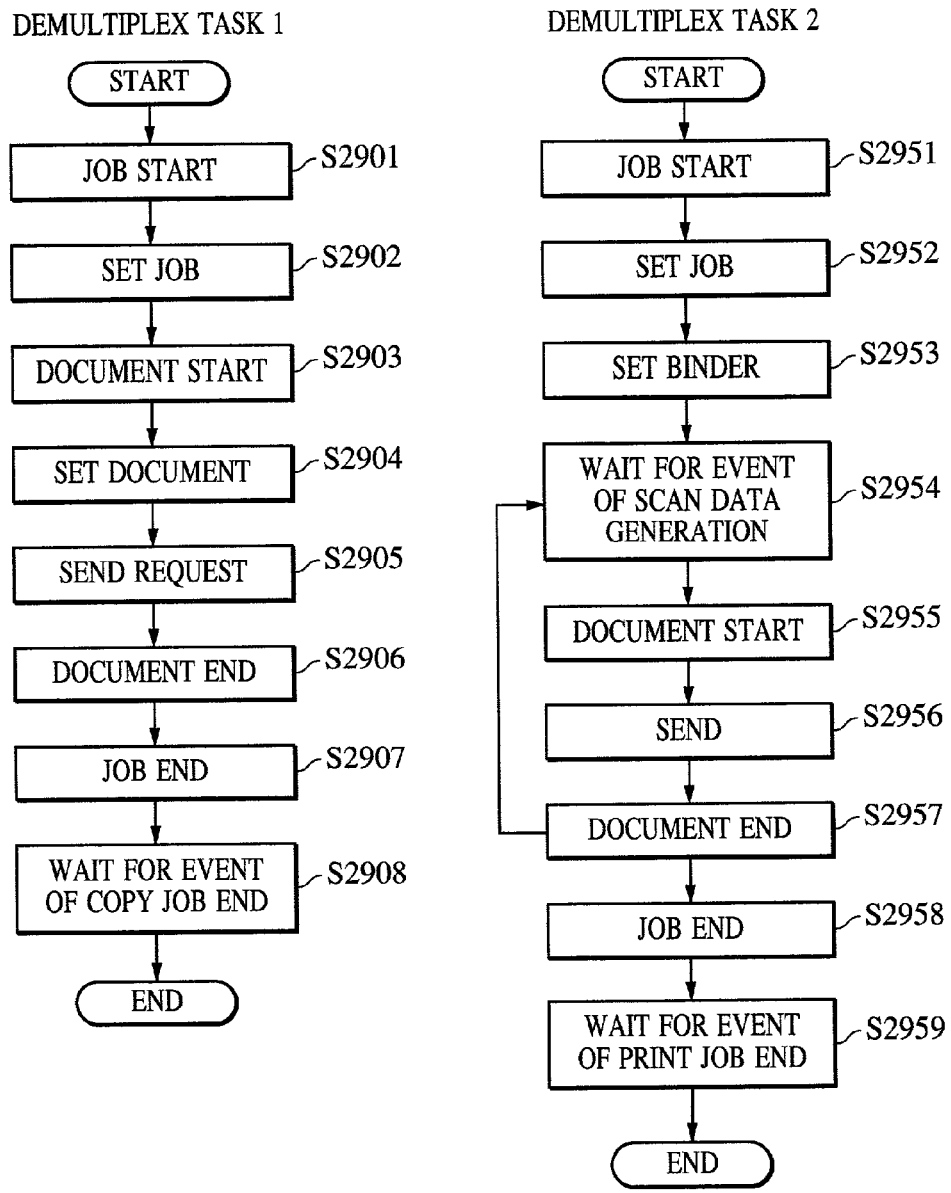
FIG. 29 is a flowchart showing a demultiplex copy process flow.

FIG. 29 shows a process flow of demultiplex copy as one example of distribution processing.

The demultiplex copy in this embodiment means the operation of printing an image read by one MFP (MFP 201) by using a plurality of MFPs (MFP 201 and MFP 202) including the MFP itself that reads the image. The MFP instructed to perform the demultiplex copy executes two flows shown in FIG. 29 (distribution copy sequence) concurrently.

A demultiplex task 1 represents a flow for making copy by the one MFP with the scanner function and the printer function. A demultiplex task 2 represents a flow for sending scanned data to another MFP connected to the one MFP via a communicating means, and causing another MFP to make print. When execution of the demultiplex copy is decided, the demultiplex tasks 1 and 2 are executed. The flow of the demultiplex task 1 will first be described.

First, a command "Jog Start" for starting the copy process is notified to the copy job manager. The notified command is processed in accordance with the flows shown in FIG. 21 (job loading process 1) and FIG. 22 (job loading process 2) (S2901).

Then, a command "Set Job" for notifying information necessary to execute the job is notified. Along with this command, the number of copies, the number of pages, and information indicating whether the demultiplex copying is to be executed, are stored in the job file shown in FIG. 20 (job data structure) and notified to the copy job manager (S2902).

Steps S2903 and S2904 represent commands for setting document information contained in the job. When different levels of resolution and different sizes of sheets are employed in one job, such information is notified to the copy job manager using those commands. If only one type of image information is generated by the job, the information is notified to the controller once. If the job contains different types of image information, the information is notified plural times. In this example of the demultiplex task 1, those commands are issued once (S2903, S2904).

Subsequently, a command "Send Request" is notified to the copy job manager. Upon receiving this command, the copy job manager starts the copy process while storing the scanned image. Whenever one image is stored, a scan data generation event is notified to the demultiplex task 2 (S2905).

Further, the ends of document and job setting are notified to the demultiplex task 2 (S2906, S2907). Then, the CPU waits for an event of the copy job end (S2908) and brings the process flow to the end upon confirming that event.

In the demultiplex task 2, the destination, to which the command is notified, is the print job manager of another MFP connected to the one MFP via the communicating means. Processing in steps S2951 to S2953 is the same as that in the demultiplex task 1. After the end of processing in step S2953, the CPU waits for the event of scan data generation sent from the manager now executing the copy job (S2904).

Upon receiving the event, a command "Send" is notified to the print job manager. This command contains the generated image information, which is registered in the data file shown in FIG. 20 (job data structure). Then, the print job manager instructs a printer to output an image in accordance with the registered information (S2955, S2956).

Subsequently, the end of one document is notified to the print job manager (S2957). A command notified in step S2957 contains information indicating whether the image information still remains or not. If the image information is still generated, the process flow returns to step S2954 to repeat the above-described processing. If no more image information is generated, the end of print job is notified to the print job manager (S2958).

Then, the CPU waits for an event of the print job end (S2959) and brings the process flow to the end upon confirming that event. With the process according to those flows, the demultiplex copy can be realized using two MFPs.

The demultiplex copy in the image outputting system, shown in FIG. 2, will be described below as one example of distribution processing that is a feature of the present invention. In this embodiment, it is scheduled before starting the demultiplex copy to read an original image by the scanner engine 102 of the MFP 201 and to output the read image data by the MFP 201 itself (local printer) and the MFP 202 (remote printer) in a distributed manner.

Figure 30:
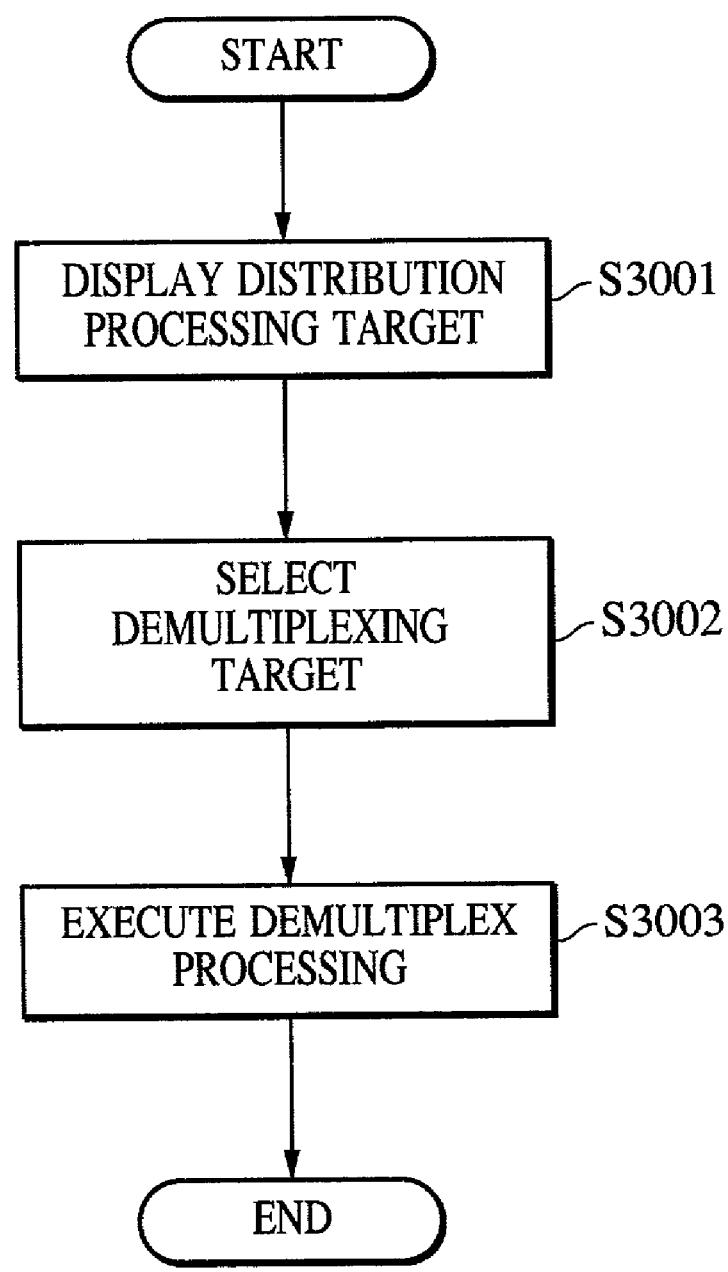
FIG. 30 is a flowchart showing procedures for selecting a target of distribution processing in demultiplex copy according to the first embodiment.
Figure 31:
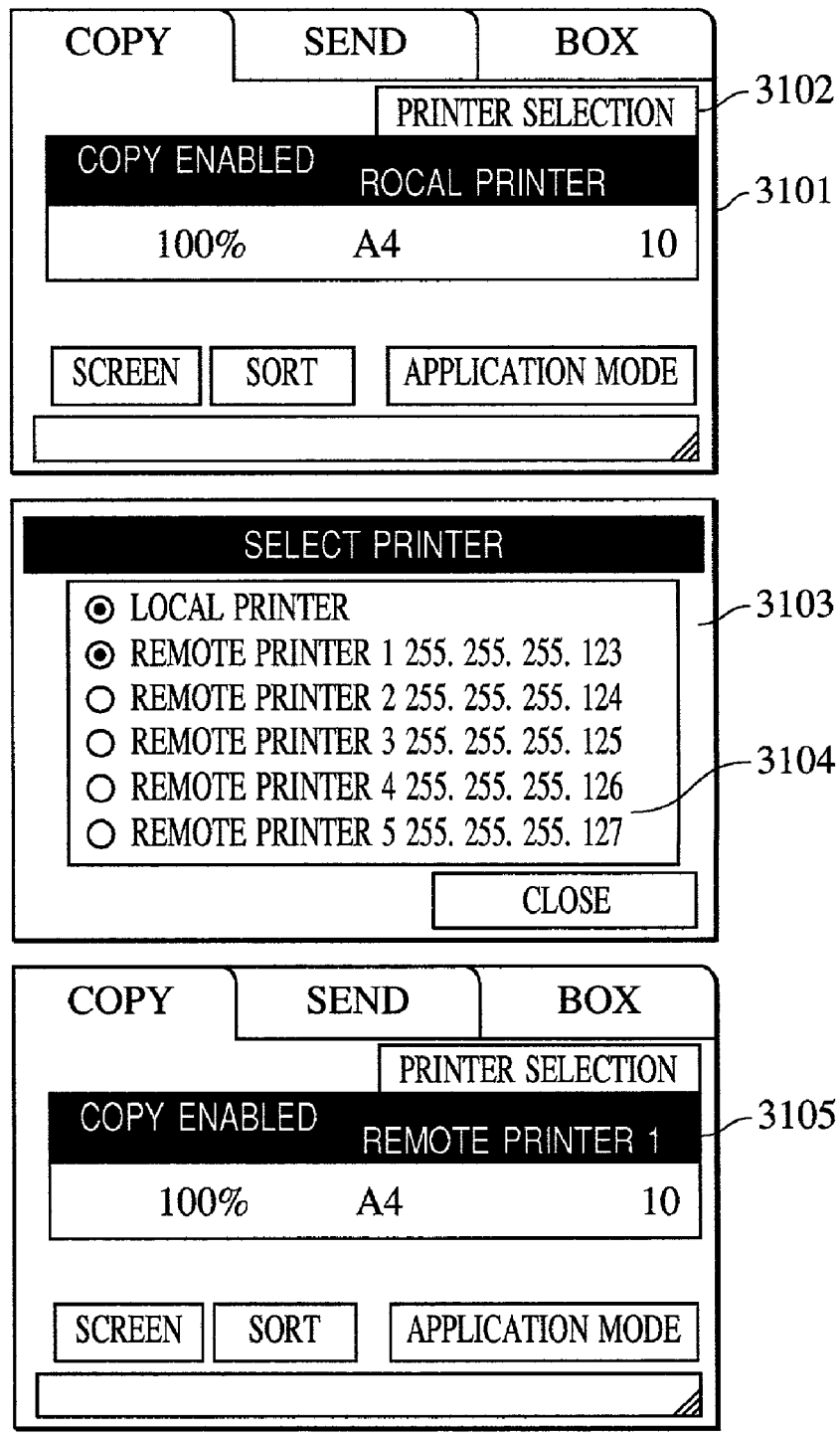
FIG. 31 shows an operation screen for selecting the target of distribution processing according to the first embodiment.

FIG. 30 is a flowchart showing procedures for selecting a target of the distribution processing (target of the demultiplex copy). First, for selecting a target of the distribution processing, a list of distribution targets is displayed on the LCD display 306 of the MFP 201 (S3001) based on the information of the attribute ID 2002 (connectable MFP list) shown in FIG. 5 (supervisor attribute table). FIG. 31 shows an operation screen for selecting a target of the distribution processing. In this first embodiment, by depressing a printer selection button 3102 on an operation panel initial screen 3101, a distribution target selection screen 3103 is displayed on the LCD display 306.

Then, a target of the demultiplex copy is selected from among a group of radio buttons 3104 on the distribution target selection screen 3103 (S3002). By selecting the "remote printer 1" (MFP 202) from among the group of radio buttons 3104 and depressing a button "Close", selected data is displayed on the operation panel as indicated by 3105.

When the operator depresses a start button (not shown) after setting the number of output copies, etc., the demultiplex process starts to execute the job (S3003) in accordance with the flows shown in FIG. 29 (distribution copy sequence).

Figure 32:
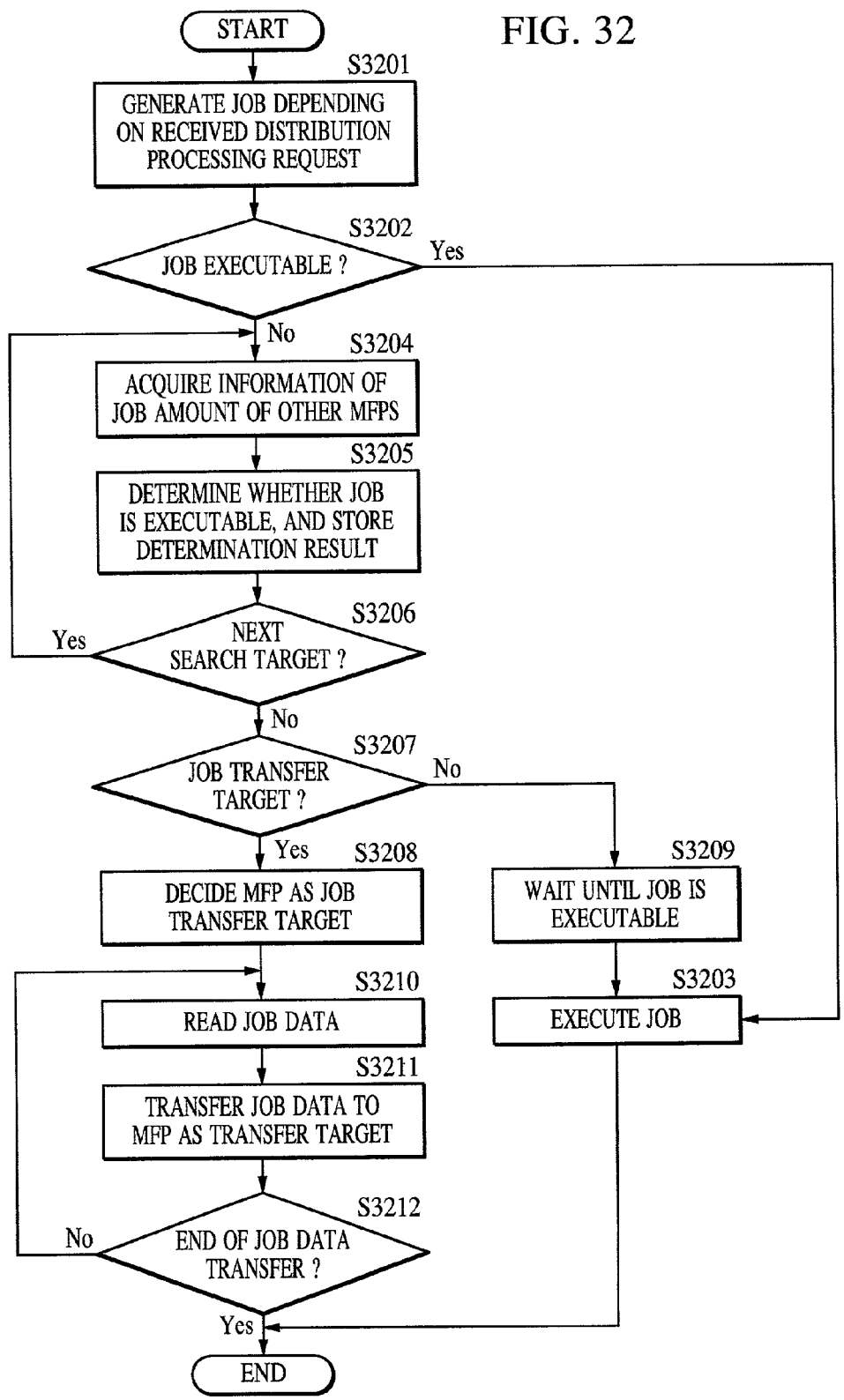
FIG. 32 is a flowchart showing a job accepting flow in the MFP having accepted a distribution processing request according to the first embodiment.

FIG. 32 shows a job accepting flow in the MFP 202 (remote printer) having accepted a distribution processing request issued through the above procedures. As mentioned before, the MFP 202 is of the same construction as the MFP 201.

First, upon receiving the distribution processing request from the MFP 201, the MFP 202 executes the job loading process 1 (FIG. 21) and the job loading process 2 (FIG. 22), thereby preparing a job file having a structure shown in FIG. 20 (job data structure) (S3201).

Then, it is determined whether the job generated in step S3201 is executable (S3202). A method for making determination in step S3202 will now be described.

In this first embodiment, jobs are stored in the DISK 304 as shown in the job queue table of FIG. 16 and then executed in sequence. Therefore, a time until a job becomes executable varies depending on the number of loaded jobs and the amount of each job, including the total number of pages in each job and the number of copies in each job.

As the amount of jobs stored in the DISK 304 increases, a time until the generated job becomes executable is prolonged, and hence the generated job approaches a state not executable as desired. In this embodiment, a threshold is set in the amount of jobs stored in the DISK 304, taking into account an allowable wait time for the operator until the start of job execution. When the amount of jobs exceeds the threshold, it is determined that the generated job is not executable.

Specifically, whether the generated job is executable within the allowable wait time is determined based on the number of jobs held in the MFP 202. Assuming, for example, that the threshold number of jobs is set to "5", when a fifth job is generated with the processing of step S3201, this job is determined to be executable, but when a sixth job is generated, that job is determined to be not executable.

The threshold for the amount of jobs is not limited to the above example, but may be set to any desired value that is convenient for the operator or the system operation. For example, when the operator wants to output copies by the selected remote printer with priority even if a relatively long time is taken until the start of job execution, the threshold for the number of jobs may be set to "10". When the operator wants to output copies at once, the threshold for the number of jobs may be set to "1".

If the job is executable (Yes) in step S3202 through the above-mentioned determining process, the job is executed in the MFP 202 by using a proper print job manager (S3203).

If the job is determined to be not executable (No) in step S3202, job amount information of another MFP is obtained based on the information of the attribute ID 2002 (connectable MFP list) shown in FIG. 5 (supervisor attribute table) (S3204). Herein, the job amount information of another MFP is obtained by acquiring the job queue table shown in FIG. 16 with the "Get" operation.

For another MFP, similarly to step S3203, it is determined based on the number of jobs held in that MFP whether the job is executable when transferred to it. The determination result is stored along with the obtained job amount information (S3205).

When a search of one MFP is completed, it is determined whether there is a next search target. If there is a next search target (Yes), the process flows returns to step S3204 to repeat the subsequent operation. In this way, the search is made for all of the other MFPs connected to the network (S3206). Then, based on the stored search results regarding all of the other MFPS, it is determined whether there is any MFP to which the job can be transferred (S3207). This determination is made based on both the determination results and the job amount information held in each MFP, which have been stored in step S3205.

If there is a transfer target (Yes) in step S3207, one of the stored transfer-enable MFPs is decided as an MFP executing the job instead of the MFP 202 (S3208). By deciding the MFP, which holds the minimum number of jobs, as a transfer target based on the stored job amount information of each MFP, an output result can be obtained more quickly after the job transfer.

The attribute ID 2001, the attribute size 2002, and the attribute value 2003 of the job file prepared in step S3201 are read (S3210). Based on this read information, the job data is transferred to the transfer target selected in step S3208 (S3211). In this embodiment, the MFP 203 (remote printer 2) is decided as the transfer target, and the job data is transferred to the MFP 203.

The transfer of the job data to the MFP 203 as the transfer target is repeated until the job data is all sent. If no more job data remains and the transfer is completed, the processing in the MFP 202 is ended (S3212). The MFP 203 receives the job file transferred from the MFP 202, and executes the job processing similarly to the MFP 202. If the job file is excutable, the MFP 203 executes the job according to the job file.

If there is no transfer target (No) in step S3207, it waits until the MFP 202 comes to a job executable state (S3209). When the MFP 202 comes to a job executable state, the job is executed (S3203), thereby ending the process flow.

In this embodiment, the number of jobs is used as the job amount information for determining whether the generated job is executable by the relevant (local) image outputting apparatus and the others (remote) ones. However, the present invention is not limited to such information, and the job amount information may be provided by the total data amount of held jobs, the data amount of only the loaded job, and the number of copies and pages of the loaded job.

With this embodiment, as described above, in the case of performing the distribution processing such as the demultiplex copy, when it is determined that an MFP as a distribution target cannot execute a job, the job is transferred to another MFP connected to the network. Therefore, even when many jobs are concentrated in the MFP as the distribution target, the jobs are avoided from jamming, and hence the distribution processing can be performed without reducing the productivity.

Further, when transferring the job, the job amount information of other MFPs connected to the network is acquired, and based on the acquired job amount information, the job is transferred to the MFP capable of executing the job reliably. It is therefore possible to avoid a retransfer process, i.e., the necessity of searching for another distribution target and transferring the job to it again because one distribution target also holds many jobs. As a result, an increase in distribution processing time required for the transfer process can be suppressed, and a burden imposed on the network can be lessened.

(Second Embodiment)

One purpose of the distribution processing such as the demultiplex copy is to increase the printing speed as a whole in comparison with the case of making print by one MFP. For example, by reading a document of 50 pages by the MFP 201 and outputting 25 pages by each of the MFP 201 and the MFP 202, the printing speed is doubled as a whole in comparison with the case of outputting 50 pages by one MFP.

However, as the amount of jobs stored in the DISK 304 of the MFP 202 increases, a time until the generated job becomes executable is prolonged, and hence a time until the end of printing in the MFP 202 is also prolonged. In such a case, the printing speed as a whole may be lower than the case of making print by one MFP 201.

This embodiment is intended to overcome the above problem by executing the job transfer process in consideration of the printing speed of the remote printer. Note that the apparatus and system configuration and the distribution-processing target selecting procedures in the MFP 201, as a local printer, in this embodiment are the same as in the first embodiment.

Figure 33:
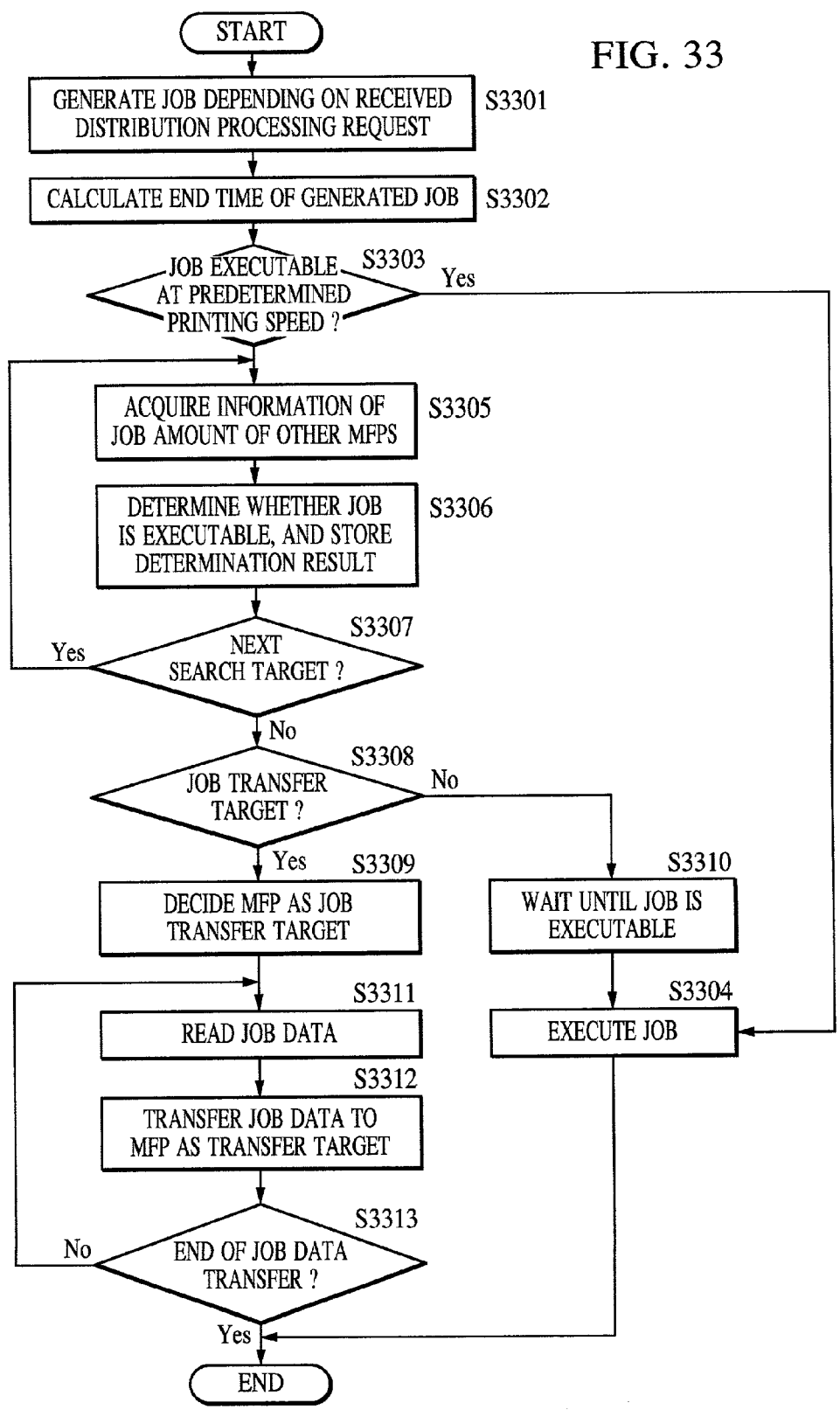
FIG. 33 is a flowchart showing a job accepting flow in the MFP having accepted a distribution processing request according to a second embodiment.

FIG. 33 shows a job accepting flow in the MFP 202 (remote printer) having accepted a distribution processing request according to the second embodiment.

First, upon receiving the distribution processing request from the MFP 201, the MFP 202 prepares a job file as with the first embodiment (S3301).

Then, the end time of the job generated in step S3301 is calculated based on the job amount information stored in the DISK 304 (S3302). A method for calculating the end time of the job in step S3301 will now be described in detail. In this embodiment, information regarding the numbers of pages and copies of each job, held in the DISK 304, is employed as the job amount information for calculating the end time of the job.

First, in response to the job generation in step S3301, the job data structure, such as shown in FIG. 20, is referred to for each job to acquire information regarding the numbers of pages and copies that are contained in the attribute values.

Then, the end time of the generated job is calculated based on the information regarding the numbers of pages and copies thus acquired, as well as information regarding the printing speed of the MFP 202. In this embodiment, the end time of the job is calculated with a reference set to the time at which the generated job has been stored in the DISK 304. In this case, the end time T of the generated job can be determined by:

$$T = \text{total page number of jobs held to wait for execution/printing speed of MFP 202} \quad (1)$$

The following is supposed here as Example 1. The printing speed of the MFP 202 is 40 sheets/minute. In the job queue table of FIG. 16, the job ID 102 has 7 copies of 2 pages; the job ID 103 has 5 copies of 1 page; the job ID 104 has 2 copies of 8 pages; and the job ID 105 has 5 copies of 5 pages. The generated job has 20 copies of 5 pages. Assuming the end time to be T1 in this Example 1, T1 is calculated as:

$$T1 = (2 \times 7 + 1 \times 5 + 8 \times 2 + 5 \times 5 + 5 \times 20)/40 = 4 \text{ (minutes)}$$

Also, the following is supposed as Example 2. The printing speed of the MFP 202 is 40 sheets/minute. The job ID 102 has 8 copies of 8 pages; the job ID 103 has 4 copies of 5 pages; the job ID 104 has 6 copies of 6 pages; and the job ID 105 has 5 copies of 6 pages. The generated job has 20 copies of 5 pages. Assuming the end time to be T2 in this Example 2, T2 is calculated as:

$$T2 = (8 \times 8 + 5 \times 4 + 6 \times 6 + 6 \times 5 + 5 \times 20)/40 = 6.25 \text{ (minutes)}$$

Then, it is determined whether the MFP 202 can execute the generated job at a predetermined printing speed until the end time calculated in step S3302 (S3303).

In step S3303, it is required to determine a essential printing speed S of the generated job before making determination. Using the end time T of the generated job which has been calculated in the above formula (1), the essential printing speed S is calculated as:

$$S = \text{total page number of generated job}/T \quad (2)$$

Using the formula (2), essential printing speeds S1, S2 in Examples 1 and 2 are calculated as:

$$S1 = 100/4 = 25 \text{ (sheets/minute)}$$

$$S2 = 100/6.25 = 16 \text{ (sheets/minute)}$$

It is here assumed that the "predetermined printing speed" used as a determining condition is set to 20 (sheets/minute). Based on such a condition, it is determined that the generated job can be executed at the predetermined printing speed, because of S1>20 (sheets/minute) in the case of Example 1. Therefore, the process flow will not shift to the job transfer process. In the case of Example 2, however, it is determined that the generated job can not be executed at the predetermined printing speed, because of S2<20 (sheets/minute). Accordingly, the process flow shifts to the job transfer process.

If the generated job is determined to be executable at the predetermined printing speed (Yes) in step S3303 through the above-described determining process, the job is executed in the MFP 202 using a proper print job manager (S3304).

If the generated job is determined to be not executable at the predetermined printing speed (No) in step S3303, the job amount information of another MFP is obtained based on the information of the attribute ID 2002 (connectable MFP list) shown in FIG. 5 (supervisor attribute table) (S3305). Herein, the job amount information of another MFP is obtained by acquiring the job queue table shown in FIG. 16 with the "Get" operation.

For another MFP, similarly to step S3303, it is determined based on the numbers of copies and pages of each job held in that MFP whether the job can be executed at the predetermined printing speed when transferred to it. The determination result is stored along with the obtained job amount information (S3306).

When a search of one MFP is completed, it is determined whether there is a next search target. If there is a next search target (Yes), the process flows returns to step S3305 to repeat the subsequent operation. In this way, the search is made for all of the other MFPs connected to the network (S3307). Then, based on the stored search results regarding all of the other MFPS, it is determined whether there is any MFP to which the job can be transferred (S3308). This determination is made based on the numbers of copies and pages of each job held in the MFPS, which are contained in the search results.

If there is a transfer target (Yes) in step S3308, one of the stored transfer-enable MFPs is decided as an MFP executing the job instead of the MFP 202 (S3309). By deciding the MFP, which holds the minimum number of jobs, as a transfer target based on the stored job amount information of each MFP, an output result can be obtained more quickly after the job transfer.

The attribute ID 2001, the attribute size 2002, and the attribute value 2003 of the job file prepared in step S3301 are read (S3311). Based on this read information, the job data is transferred to the transfer target selected in step S3309 (S3312). In this embodiment, the MFP 203 (remote printer 2) is decided as the transfer target, and the job data is transferred to the MFP 203.

The transfer of the job data to the MFP 203 as the transfer target is repeated until the job data is all sent. If no more job data remains and the transfer is completed, the processing in the MFP 202 is ended (S3313). The MFP 203 receives the job file transferred from the MFP 202, and executes the job processing similarly to the MFP 202. If the job file is excutable, the MFP 203 executes the job according to the job file.

If there is no transfer target (No) in step S3308, it waits until the MFP 202 comes to a job executable state (S3310). When the MFP 202 comes to a job executable state, the job is executed (S3304), thereby ending the process flow.

While, in this embodiment, the job end time T and the essential printing speed S are defined as parameters used for making determination in step S3303, the parameters are not limited to those ones defined as described above. For example, the job end time T and the essential printing speed S may be values defined in consideration of time information regarding the job under execution and various printing mode information as well.

With this embodiment, as described above, the end time of a job to be outputted is calculated based on information regarding the numbers of copies and pages of each job held in the MFP 202, and based on the calculated result, it is determined whether the generated job can be executed at the predetermined printing speed. If it is determined that the generated job cannot be executed at the predetermined printing speed, the process flow shifts to the job transfer process.

Therefore, even when many jobs are concentrated in the MFP as the distribution target, the jobs are avoided from jamming, and hence the distribution processing can be performed without reducing the productivity.

Further, when transferring the job, the job amount information of other MFPs connected to the network is acquired, and based on the acquired job amount information, the job is transferred to the MFP capable of executing the job reliably. It is therefore possible to avoid a retransfer process, i.e., the necessity of searching for another distribution target and transferring the job to it again because the printing speed in one distribution target is also low. As a result, an increase in distribution processing time required for the transfer process can be suppressed, and a burden imposed on the network can be lessened.

(Third Embodiment)

When the present invention is applied to the image outputting system shown in FIG. 2, all the MFPs are not necessarily required to have the same functions and configuration unlike the first and second embodiments described above. The present invention is also applicable to, e.g., the case where an MFP is used as a local printer and a single unit of printer is used as a remote printer.

However, for example, when MFPs having different output functions (capabilities) are used in the system of FIG. 2, the following problem occurs in the distribution processing.

It is assumed to perform the demultiplex copy, by way of example, on condition that, using the MFP 201 as a local printer and the MFP 202 as a remote printer, the numbers of copies and pages to be outputted are distributed evenly between the two MFPs. In this case, if the outputting speed of the MFP 202 is lower than that of the MFP 201, the total outputting speed is close to the outputting speed of the MFP 202. Accordingly, as a difference in printing speed between the MFP 201 and the MFP 202 increases, it is more difficult to achieve the purpose of the demultiplex copy, i.e., the intent to obtain an output result at a higher speed than the case of using the MFP 201 alone.

This embodiment is intended to overcome the abovementioned problem by executing the job transfer process in consideration of the printing speed of a local printer. Note that the apparatus and system configuration and the distribution-processing target selecting procedures in the MFP 201, as a local printer, in this embodiment are the same as in the first embodiment. However, the MFPs 201 and 202 have different printing speeds.

Figure 34:
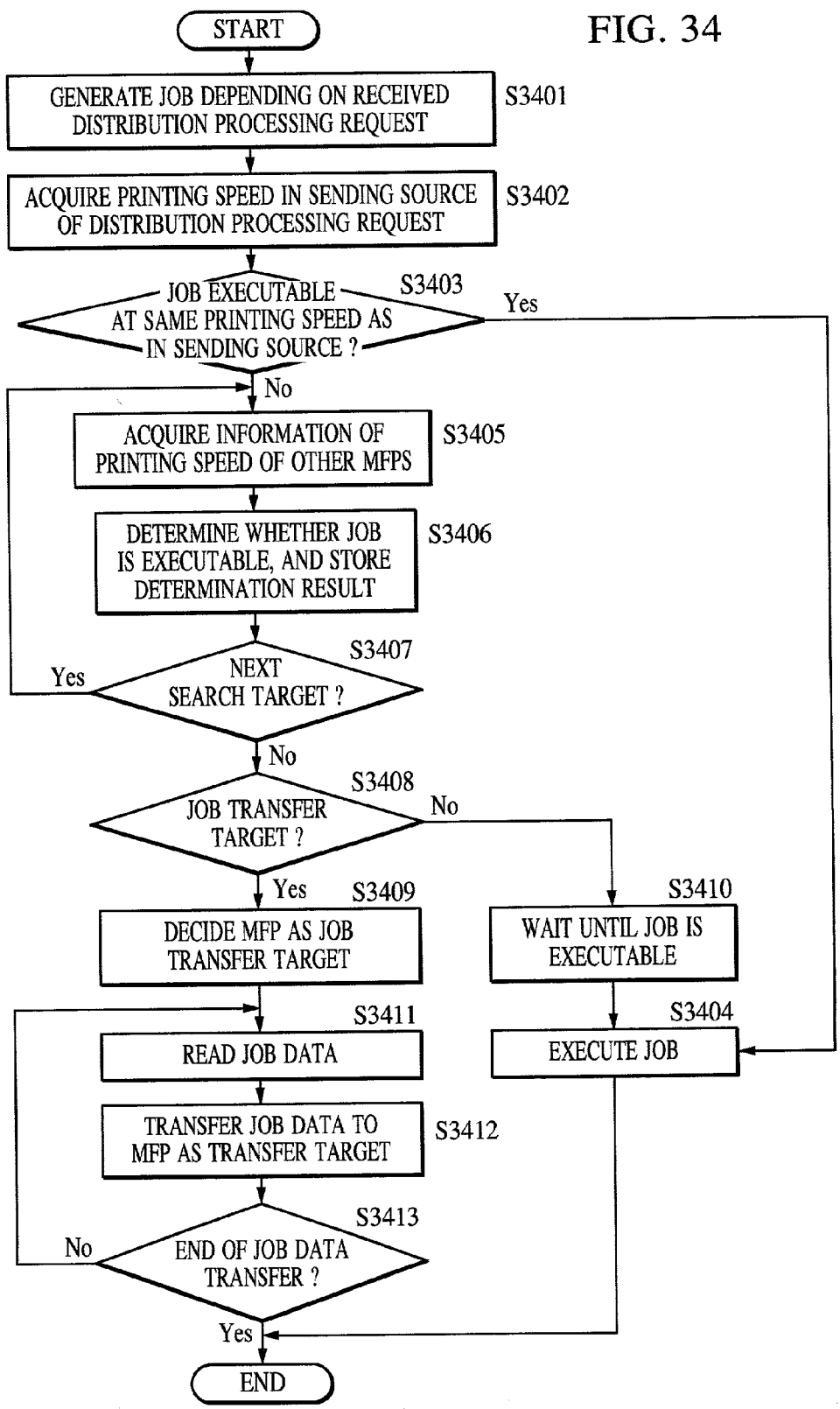
FIG. 34 is a flowchart showing a job accepting flow in the MFP having accepted a distribution processing request according to a third embodiment.

FIG. 34 shows a job accepting flow in the MFP 202 (remote printer) having accepted a distribution processing request according to a third embodiment. It is assumed that no jobs other than that generated in the flowchart of FIG. 34, described below, are held in the MFPs 201 and 202.

First, upon receiving the distribution processing request from the MFP 201, the MFP 202 prepares a job file (S3401).

Then, the printing speed information of the MFP 201, as a sending source of the received distribution processing request, is acquired (S3402). Herein, the printing speed information is obtained by acquiring the supervisor attribute table shown in FIG. 5 with the "Get" operation.

Then, it is determined whether the job generated in step S3401 is executable (S3403). A method for making determination in step S3403 will now be described in detail.

In this embodiment, when the MFP 202 has the printing speed equal to or higher than that of the MFP 201, it is determined that the generated job can be executed at the printing speed comparable to that of the local printer.

Assuming, for example, that the printing speed of the MFP 201 is 30 sheets/minute and the printing speed of the MFP 202 is 40 sheets/minute, the generated job is determined to be executable, because the MFP 202 has the higher printing speed than the MFP 201. On the other hand, when the printing speed of the MFP 201 is 50 sheets/minute and the printing speed of the MFP 202 is 40 sheets/minute, the generated job is determined to be not executable, because the MFP 202 has the lower printing speed than the MFP 201.

A condition used in making the above determination is not limited to the described one, but may be optionally set so long as the condition is selected to perform the demultiplex copy at a desired printing speed. For example, the determining condition may be modified such that the job is determined to be executable when the printing speed of the MFP 202 is half or higher than that of the MFP 201. Also, the determination may be made by calculating the essential printing speed of each MFP based on the amount of jobs held in each MFP and taking into account the calculated essential printing speed, as with the second embodiment.

If the generated job is determined to be executable (Yes) in step S3403 through the above-described determining process, the job is executed in the MFP 202 using a proper print job manager (S3404).

If the generated job is determined to be not executable (No) in step S3403, the printing speed information of another MFP is obtained based on the information of the attribute ID 2002 (connectable MFP list) shown in FIG. 5 (supervisor attribute table) (S3405).

For another MFP, it is determined based on the printing speed information of that MFP whether the job can be executed at the printing speed comparable to that of the MFP 201. The determination result is stored along with the obtained printing speed information (S3406).

When a search of one MFP is completed, it is determined whether there is a next search target. If there is a next search target (Yes), the process flows returns to step S3405 to repeat the subsequent operation. In this way, the search is made for all of the other MFPs connected to the network (S3407). Then, based on the stored search results regarding all of the other MFPs, it is determined whether there is any MFP to which the job can be transferred (S3408). This determination is made based on both the determination results and the printing speed information held in each MFP, which have been stored in step S3406.

If there is a transfer target (Yes) in step S3408, one of the stored transfer-enable MFPs is decided as an MFP executing the job instead of the MFP 202 (S3409). By deciding the MFP, which has the highest printing speed, as a transfer target based on the stored printing speed information of each MFP, an output result can be obtained more quickly after the job transfer.

The attribute ID 2001, the attribute size 2002, and the attribute value 2003 of the job file prepared in step S3401 are read (S3411). Based on this read information, the job data is transferred to the transfer target decided in step S3409 (S3412). In this embodiment, the MFP 203 (remote printer 2) is decided as the transfer target, and the job data is transferred to the MFP 203.

The transfer of the job data to the MFP 203 as the transfer target is repeated until the job data is all sent. If no more job data remains and the transfer is completed, the processing in the MFP 202 is ended (S3413). The MFP 203 receives the job file transferred from the MFP 202, and executes the job processing similarly to the MFP 202. If the job file is excutable, the MFP 203 executes the job according to the job file.

If there is no transfer target (No) in step S3408, it waits until the MFP 202 comes to a job executable state (S3410). When the MFP 202 comes to a job executable state, the job is executed (S3404), thereby ending the process flow.

While, in this embodiment, the printing speed information is acquired as output function information used for determining whether the job is to be transferred, the present invention is not limited to the use of the printing speed information. Any other output function information may be used so long as the information relates to a parameter affecting the outputting speed.

With this embodiment, as described above, the outputting speed information of the MFP 201 having sent an output request is acquired, and based on the acquired outputting speed information of the MFP 201, it is determined whether the copy job can be executed at the predetermined printing speed. If it is determined that the copy job cannot be executed at the predetermined printing speed, the process flow shifts to the job transfer process. Thus, since the generated job can be executed by the MFP having the printing speed suitable for the distribution processing request, the distribution processing can be performed without reducing the productivity even when the various MFPS have different printing speeds.

Further, when transferring the job, the printing speed information of other MFPs connected to the network is acquired, and based on the acquired printing speed information, the job is transferred to the MFP capable of executing the job reliably at a higher speed. It is therefore possible to avoid a retransfer process, i.e., the necessity of searching for another distribution target and transferring the job to it again because the printing speed in one distribution target is also low. As a result, an increase in distribution processing time required for the transfer process can be suppressed, and a burden imposed on the network can be lessened.

(Fourth Embodiment)

In the first to third embodiments, a delay in image outputting is avoided by transferring the job from the MFP that has received the distribution processing request. As an alternative, a delay in image outputting can be avoided, similarly to the above embodiments, by controlling the MFP sending the distribution processing request not to send the distribution processing request to the MFP that is holding many jobs.

This fourth embodiment will be described below on an assumption that the MFP 201 is a local printer in the image outputting system shown in FIG. 2, as with the first embodiment.

Figure 35:
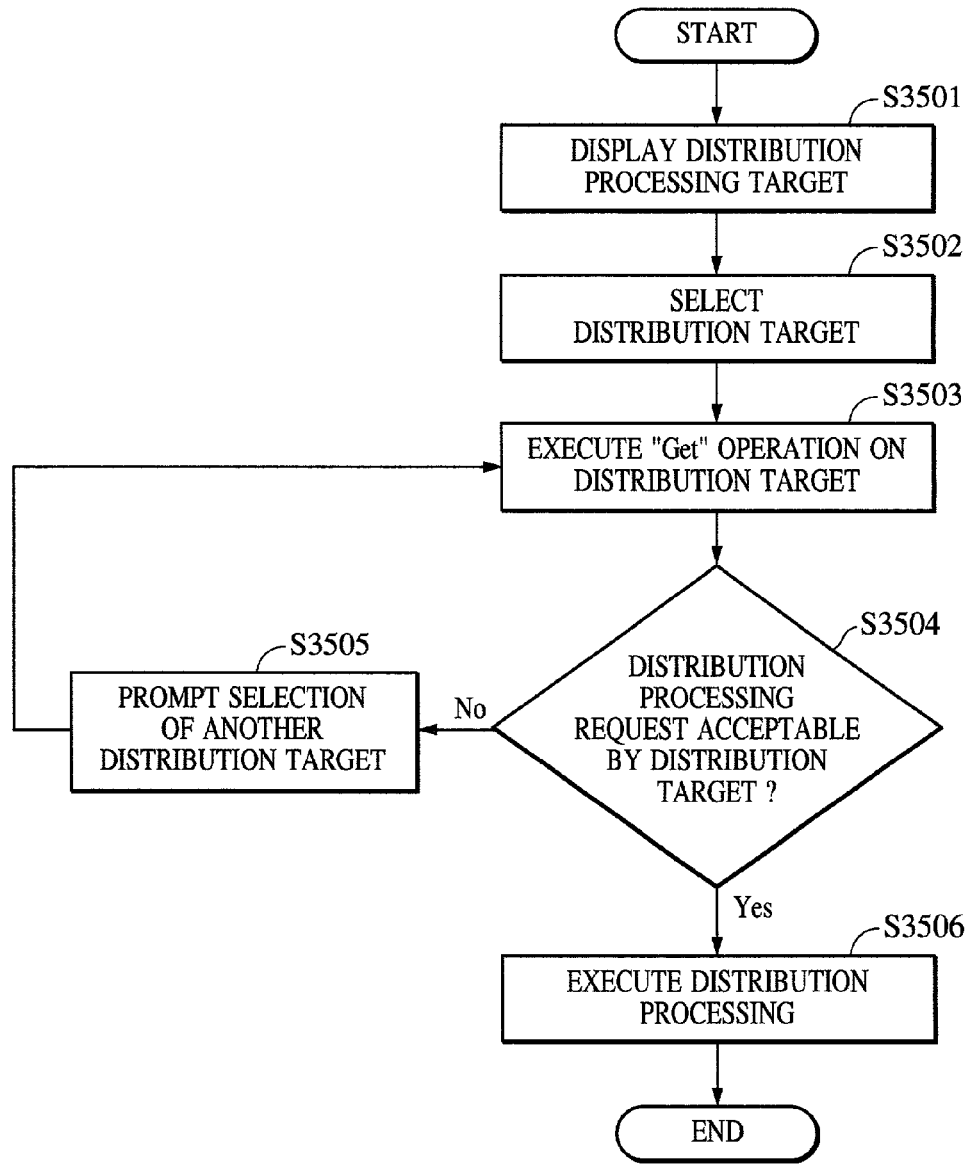
FIG. 35 is a flowchart showing procedures for selecting a target of distribution processing according to a fourth embodiment.
Figure 36:
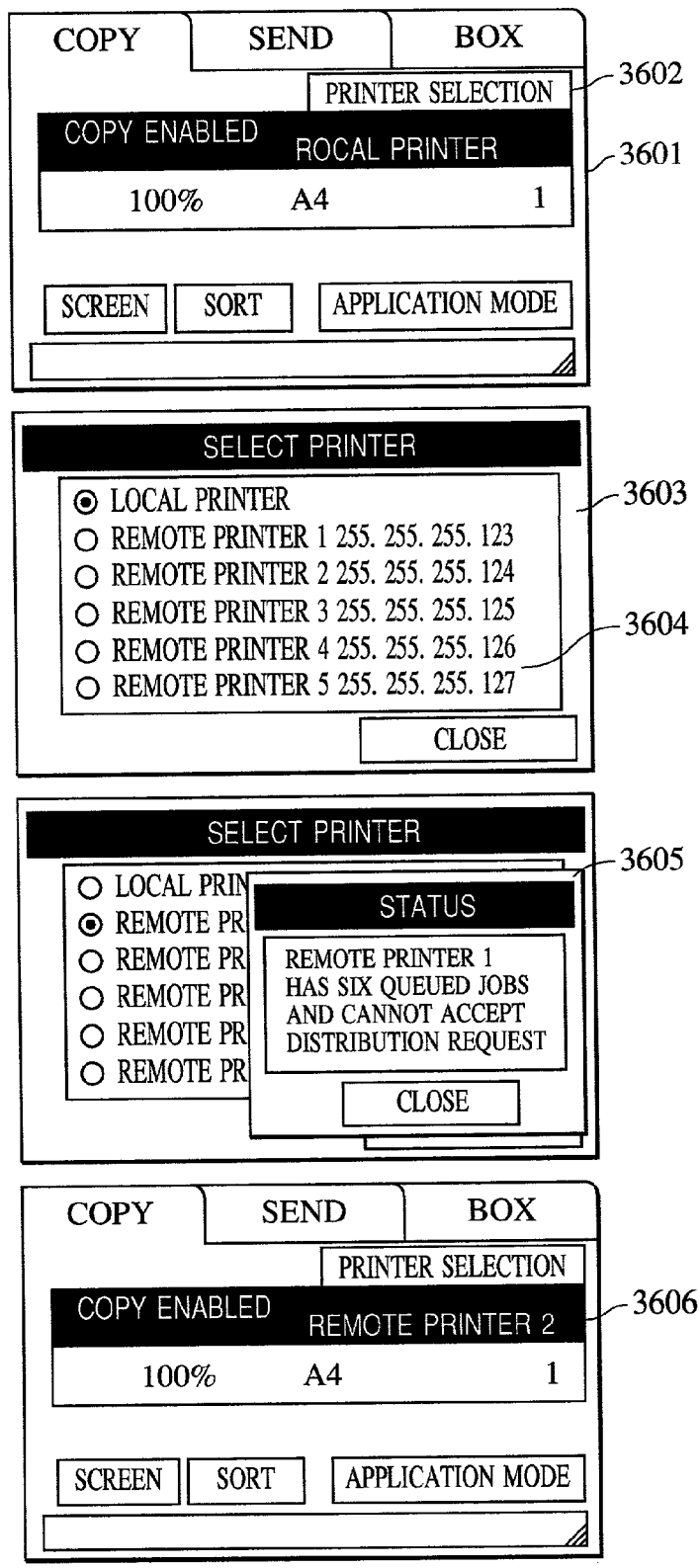
FIG. 36 shows an operation screen for selecting the target of distribution processing according to the fourth embodiment.

FIG. 35 is a flowchart showing procedures for selecting a target of distribution processing according to the fourth embodiment. First, for selecting a target of the distribution processing, a list of distribution targets is displayed on the LCD display 306 of the MFP 201 (S3501) based on the information of the attribute ID 2002 (connectable MFP list) shown in FIG. 5 (supervisor attribute table). FIG. 36 shows an operation screen for selecting a target of the distribution processing in this embodiment. By depressing a printer selection button 3602 on an operation panel initial screen 3601, a distribution target selection screen 3603 is displayed on the LCD display 306. At that time, the operability is improved by executing the "Get" operation with respect to each MFP, to which a distribution processing request can be sent, so that the name of the MFP as a distribution target is acquired and displayed.

Then, a distribution target is selected from among a group of radio buttons 3604 on the distribution target selection screen 3603 (S3502). By selecting the "remote printer 1" (MFP 202) from among the group of radio buttons 3604 and depressing a button "Close", the distribution processing is executed and the information of the remote printer 1 (MFP 202), such as the job queue table shown in FIG. 16, is acquired with the "Get" operation.

Subsequently, it is determined whether the remote printer 1 (MFP 202) can accept the distribution processing request (S3504). In this embodiment, the determination as to whether the MFP 202 can accept the distribution processing request is made based on the amount of jobs held in the MFP 202. It is assumed, for example, that an upper value of the number of jobs, which can be held in the MFP 202, is set to "5" as shown in the job queue table of FIG. 16. In this case, if the information indicating that the MFP 202 is holding jobs less than 5 is obtained through the processing of step S3503, the MFP 202 is determined to be able to accept the distribution processing request. If the information indicating that the MFP 202 is holding jobs not less than 5 is obtained, the MFP 202 is determined to be not able to accept the distribution processing request.

If the remote printer 1 (MFP 202) already holds six jobs and is determined to be not able to accept the distribution processing request (No) in step S3504, a status notice window 3605 is displayed on the LCD display 306 to notify the job status and the fact that the MFP 202 cannot accept the distribution processing. At the same time, the distribution target selection screen 3603 is displayed again for prompting the operator to reselect another distribution target from among the group of radio buttons 3604 (S3505). When the distribution target is selected again, the process flow returns to step S3503 to confirm whether that another distribution target can accept the distribution processing request.

If the remote printer 2 (MFP 203), for example, holds loaded jobs not less than 5 and is determined to be able to accept the distribution processing request (Yes) in step S3504, the fact that the remote printer 2 has been selected as a print job target is displayed on the LCD display 306 as indicated by 3606. Subsequently, when the operator depresses a start button (not shown), the distribution processing request is sent to the remote printer, and the job is executed in accordance with the flows shown in FIG. 29 (distribution copy sequence) (S3506), thereby ending the process flow.

With this embodiment, as described above, the MFP 201 as a local printer acquires the job amount information of a selected MFP (MFP 202), and based on the acquired job amount information, determines whether the MFP 202 can accept the distribution processing request. When it is determined that the MFP 202 cannot accept the distribution processing request, that fact is displayed.

Accordingly, whether an apparatus as an outputting target can accept an output request can be easily confirmed from the standpoint of the job amount before sending the output request. It is hence possible to suppress a reduction of productivity in the distribution processing due to a situation, for example, that a new job is loaded in an MFP already holding many jobs and an overly long time is taken until an image output result is obtained.

(Modifications of Fourth Embodiment)

The above fourth embodiment is arranged so as to display, in step S3505, the job status and the fact that the MFP 202 cannot accept the distribution processing, and to display the same screen as the distribution target selection screen 3603 again for prompting the operator to select another distribution target.

The distribution target selection screen 3603 displayed again on that occasion includes the printer that cannot accept the distribution processing request, i.e., the remote printer 1 (MFP 202). Such redisplay is made in consideration of such a situation that a new job cannot be loaded into the remote printer 1 at the time of presenting the redisplay screen, but the remote printer 1 may accept the distribution processing request after the lapse of a certain time.

Figure 37:
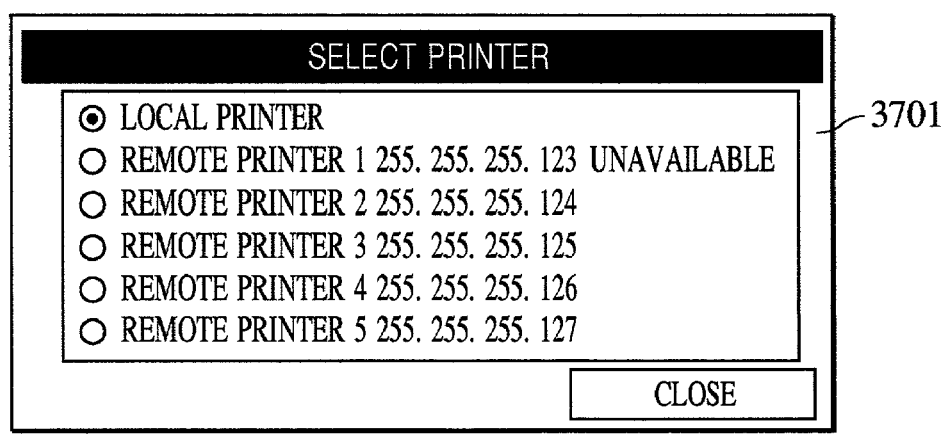
FIG. 37 shows a distribution target selection screen according to a modification of the fourth embodiment.

However, there is a possibility that the user may select the remote printer 1 by a mistake in spite of wanting to start the distribution processing at once. An indication, e.g., "unavailable", may be added to the column corresponding to the remote printer 1 so that the user cannot select the remote printer 1. FIG. 37 shows a display example of the distribution target selection screen in that case. In a distribution target selection screen 3701 of FIG. 37, "unavailable" is displayed on the right side of the remote printer 1 and its address. As an alternative, the display of the remote printer 1 may be deleted from the distribution target selection screen. These modifications contribute to improving the operability in printer selection.

Also, in the above fourth embodiment, after the distribution target selection screen 3603 is displayed again in step S3505 and the user selects the distribution target, the process flow returns to step S3503 where the "Get" operation is performed with respect to the selected distribution target.

However, it is not always guaranteed that another selected printer other than the remote printer 1 an accept the distribution processing request. In such a case, the processing of steps S3503 to S3505 must be repeated until a distribution target capable of accepting the distribution processing request is found. This results in a difficulty in selecting the distribution target promptly.

Preferably, when selecting the distribution target again in step S3505 in the first processing cycle, the "Get" operation is performed with respect to other printers than the remote printer 1 to acquire the job amount information of the other MFPs. Then, it is determined for each MFP whether it can accept the distribution processing request. only the printers capable of accepting the distribution processing request are displayed for prompting the user to select the distribution target from among them. With this modification, it is just enough to reselect the distribution target once.

Figure 38:
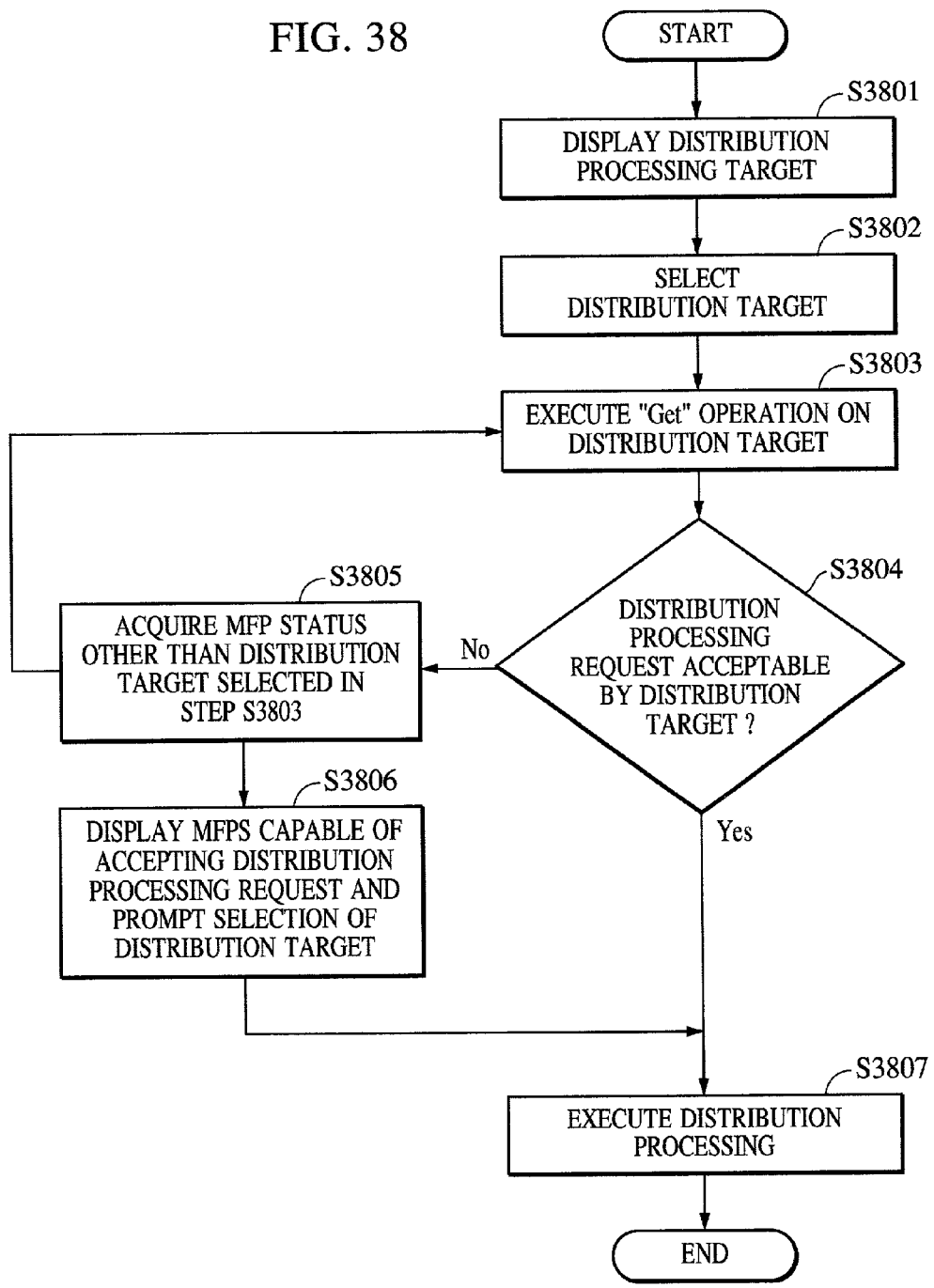
FIG. 38 is a flowchart showing procedures for selecting a target of distribution processing according to another modification of the fourth embodiment.

FIG. 38 is a flowchart showing procedures for selecting the distribution target again according to the above modification. The processing in steps S3801 to S3804 is the same as that in steps S3501 to S3504 shown in FIG. 35.

Figure 39:
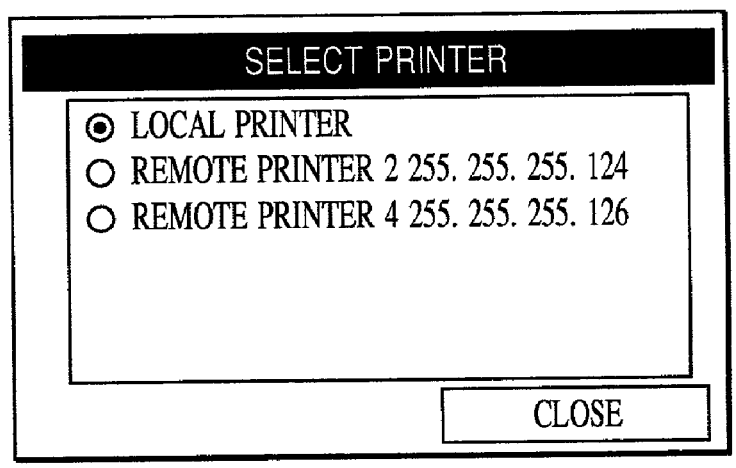
FIG. 39 shows a distribution target reselection screen according to the modification of the fourth embodiment.

If it is determined in step S3804 that the remote printer 1 selected as a distribution target cannot accept the distribution processing request, the "Get" operation is performed with respect to other printers (S3605). Then, only the printers, which have been determined to be able to accept the distribution processing request, are displayed for prompting the user to select the distribution target from among them (S3606). FIG. 39 shows a display example of the distribution target selection screen in that case. A distribution target selection screen of FIG. 39 represents a screen displayed when the remote printers 3 and 5 also cannot accept the distribution processing request as a result of determination based on the acquired job amount information of the other MFPs. The demultiplex copy is performed using the selected printer (S3607), thereby ending the process flow.

With those modifications of the fourth embodiment, if the job cannot be loaded into the distribution target selected for the first time, the reselection screen is displayed in such a manner as adding an indication to inform the user of the fact that the distribution target selected for the first time cannot be employed, or as making the relevant distribution target no longer selectable. It is therefore possible to prevent the user from selecting the distribution target falsely in the reselection step, and to realize prompt selection of the desired apparatus.

Further, the job status of other MFPs than the distribution target selected for the first time is acquired and only the distribution targets capable of accepting the job are displayed on the reselection screen. As a result, the necessity of selecting the distribution target many times is avoided, and prompter selection of the desired apparatus can be realized.

In the fourth embodiment, the number of jobs held in the image outputting apparatus as a distribution target is used as the job status information for determining whether the job can be loaded into the distribution target. However, the present invention is not limited to that kind of job status information. Any other kind of job status information is also usable so long as it is effective as job load information, e.g., the total data amount of jobs held in the image outputting apparatus as a distribution target.

(Other Embodiments)

The foregoing embodiments have been described in connection with an application case in which the present invention is applied to the demultiplex copy mode using a plurality of MFPS. However, the present invention is not limited to that application case, but is also applicable to the remote copy mode in which image data is outputted to one remote printer.

Also, in a printer system comprising a plurality of printers and a host computer, the plurality of printers accepting a printing request from the host computer may be constructed to have the same functions as those of the MFPs in the foregoing embodiments.

Further, in the foregoing embodiments, whether the job is executable is determined based on, e.g., the job amount information or the output function information. However, whether the job is executable may be determined just based on information indicating whether there occurs an error status such as running-out of sheets, running-out of toner, or jamming. For example, by changing the condition used for making determination in step S3202 in the first embodiment to "whether there occurs an error status", a digital composite machine can be realized in which when there occurs an error in the distribution processing, the process flow is rendered to shift to the job transfer process. As a result, even when the distribution target is in an error status such as running-out of sheets, running-out of toner, or jamming, a delay in image outputting due to interruption of the processing in the outputting target can be avoided.

In the foregoing embodiments, the processing in the MFP, to which the job is transferred, has not been described, but will briefly be described below in connection with the first embodiment. The MFP (e.g., MFP 203) as a transfer target first receives the job from the transfer source (MFP 202), and then refers to its own job queue table. Subsequently, as with the first embodiment, it is determined based on its own job amount information (e.g., the number of jobs) whether the job is executable. If the job is executable, the process flow advances to similar processing as in step S3304, and if the job is not executable, it advances to a similar job transfer process as in step S3305. The subsequent process flow is the same as in the first embodiment. The above description is likewise applied to the second and third embodiments. By thus constructing each MFP to have the job transfer function, the job can always be executed by the MFP on the network, which is optimum for responding an output request.

The present invention is not limited to the apparatuses of the embodiments described above, but may be applied to not only a system comprising plural pieces of equipment, but also an apparatus constituted by a single piece of equipment.

Further, the scope of the present invention can also be implemented by supplying, to a system or apparatus, a storage medium storing program codes of software for realizing the functions of the above-described embodiments, and by causing a computer (CPU and/or MPU) in the system or apparatus to read and execute the program codes stored in the storage medium.

In such a case, the program codes read out of the storage medium serve in themselves to realize the functions of the above-described embodiments. Hence, the storage medium storing the program codes constitutes the present invention. Storage mediums for supplying the program codes may be, e.g., floppy disks, hard disks, optical disks, magneto-optical disks, CD-ROMs, CD-Rs, magnetic tapes, nonvolatile memory cards, and ROMs. Also, it is needless to say that the functions of the above-described embodiments are realized not only by a computer reading and executing the program codes supplied to it, but also by an OS (Operating System) or the like which is working on the computer and execute a part or the whole of actual processing in accordance with instructions from the program codes. That case is also involved within the scope of the present invention.

Furthermore, as a matter of course, the present invention involves the case in which the program codes read out of the storage medium are stored in a memory provided in a function add-on board built in the computer or a function add-on unit connected to the computer, and a CPU or the like incorporated in the function add-on board or unit executes a part or the whole of the actual processing in accordance with instructions from the program codes, thereby realizing the functions of the above-described embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image outputting apparatus connected to other image outputting apparatuses via a communication medium, comprising:
    a generating unit adapted to generate a job in response to an output request received via said communication medium;
    an acquiring unit adapted to acquire job information of at least one of said other image outputting apparatuses when the job generated by said generating unit is not executable by said image outputting apparatus;
    a transferring unit adapted to transfer the job to at least one of said other image outputting apparatuses based on the job information acquired by said acquiring unit, wherein said transferring unit transfers the job to said at least one of the other image outputting apparatuses when the job can be transferred to at least one of said other image outputting apparatuses; and
    a controlling unit adapted to store the job in a storing unit in said image outputting apparatus when there are no other image outputting apparatuses to which the job can be transferred and to execute the job stored in said storing unit by said image outputting apparatus when said image outputting apparatus comes into an executable state.

2. An image outputting apparatus according to claim 1, further comprising a first determining unit adapted to determine, based on job amount information held in the image outputting apparatus, whether the job is executable,
    wherein said acquiring unit acquires job amount information of at least one of said other image outputting apparatuses when said first determining unit determines that the job is not executable.

3. An image outputting apparatus according to claim 2, further comprising a second determining unit adapted to determine, based on the job amount information acquired by said acquiring unit, whether the job can be transferred to any of said other image outputting apparatuses; and
    a deciding unit adapted to decide, when said second determining unit determines that the job can be transferred to at least one of said other image outputting apparatuses, at least one of those transfer-enabled image outputting apparatuses to which the job is to be transferred,
    and said transferring unit transfers the job to the image outputting apparatus decided by said deciding unit.

4. An image outputting apparatus according to claim 3, wherein when said second determining unit determines that there are no other image outputting apparatuses to which the job can be transferred, said image outputting apparatus holds the job until the image outputting apparatus comes into an executable state.

5. An image outputting apparatus according to claim 4, wherein the job amount information is information regarding the number of jobs.

6. An image outputting apparatus according to claim 1, further comprising a third determining unit adapted to determine, based on job amount information held in the image outputting apparatus, whether the job is executable at a predetermined printing speed,
    wherein said acquiring unit acquires the job amount information of at least one of said other image outputting apparatuses when said third determining unit determines that the job is not executable at the predetermined printing speed.

7. An image outputting apparatus according to claim 6, further comprising a calculating unit adapted to calculate the end time of the job based on the job amount information held in the image outputting apparatus,
    wherein said determining unit determines, based on the end time of the job calculated by said calculating unit, whether the job is executable at the predetermined printing speed,
    and said acquiring unit acquires the job amount information of the at least one of said other image outputting apparatuses when said determining unit determines that the job is not executable at the predetermined printing speed.

8. An image outputting apparatus according to claim 1, further comprising a printer section for outputting an image on a sheet in accordance with the job.

9. An image outputting apparatus according to claim 8, wherein at least one of said other image outputting apparatuses includes a scanner section for reading an original image and obtaining image data, and the job is a copy job based on the image data input from said scanner section.

10. An image outputting apparatus according to claim 1, wherein the job is a dispersed output job.

11. An image outputting apparatus connected to other image outputting apparatuses via a communication medium, comprising:

a generating unit adapted to generate a job in response to an output request received via said communication medium;

a first acquiring unit adapted to acquire output function information of at least one of said other image outputting apparatuses when the job generated by said generating unit is not executable by said image outputting apparatus;

a transferring unit adapted to transfer the job to at least one of said other image outputting apparatuses based on the output function information acquired by said first acquiring unit, wherein said transferring unit transfers the job to at least one of said other image outputting apparatuses when the job can be transferred to at least one of said other image outputting apparatuses; and a controlling unit adapted to store the job in a storing unit in said image outputting apparatus when there are no other image outputting apparatuses to which the job can be transferred and to execute the job stored in said storing unit by said image outputting apparatus when said image outputting apparatus comes into an executable state.

12. An image outputting apparatus according to claim 11, further comprising a second acquiring unit that acquires output function information of a first image outputting apparatus having sent the output request; and a first determining unit that determines, based on the output function information of said first image outputting apparatus acquired by said second acquiring unit, whether the job is executable at a predetermined outputting speed, wherein said first acquiring unit acquires the output function information of the at least one of said other image outputting apparatuses when said first determining unit determines that the job is not executable at the predetermined outputting speed.

13. An image outputting apparatus according to claim 12, further comprising a second determining unit that determines, based on the output function information acquired by said first acquiring unit, whether the job can be transferred to any of said other image outputting apparatuses; and a deciding unit that decides, when said second determining unit determines that the job can be transferred to at least one of said other image outputting apparatuses, at least one of those transfer-enabled image outputting apparatuses to which the job is to be transferred, and said transferring unit transfers the job to the image outputting apparatus decided by said deciding unit.

14. An image outputting apparatus according to claim 13, wherein the job is held when said second determining unit determines that there are no other image outputting apparatuses to which the job can be transferred.

15. An image outputting apparatus according to claim 11, wherein at least one of said other image outputting apparatuses includes a scanner section for reading an original image and obtaining image data, and the job is a copy job based on the image data input from said scanner section.

16. An image outputting apparatus connected to other image outputting apparatuses via a communication medium, comprising:

a display unit that displays said other image outputting apparatuses;

a selecting unit that selects, based on a selection input from an operator, at least one of said other image outputting apparatuses displayed by said display unit, to which an output request is to be sent;

a first acquiring unit that acquires job information of the image outputting apparatus selected by said selecting unit;

a first determining unit that determines, based on the job information acquired by said first acquiring unit, whether the selected image outputting apparatus can accept the output request; and a notifying unit that notifies the determination result when said first determining unit determines that the selected image outputting apparatus cannot accept the output request.

17. An image outputting apparatus according to claim 16, further comprising a second acquiring unit that acquires job information of at least one of said other image outputting apparatuses when said first determining unit determines that the selected image outputting apparatus cannot accept the output request; and a second determining unit that determines, based on the job information acquired by said second acquiring unit, whether at least one of said other image outputting apparatuses can accept the output request, wherein said display unit displays a determination result made by said second determining unit.

18. An image outputting apparatus according to claim 17, wherein said first acquiring unit acquires job amount information of the image outputting apparatus selected by said selecting unit, and said first determining unit determines, based on the job amount information acquired by said first acquiring unit, whether the selected image outputting apparatus can accept the job.

19. An image outputting apparatus according to claim 18, wherein the job amount information is information regarding the number of jobs.

20. An image outputting apparatus according to claim 16, further comprising an image inputting unit that reads an original image and obtains image data, wherein the output request is a copy request in accordance with the image data obtained from said image inputting unit.

21. A copying apparatus comprising a scanner section for reading an original image and obtaining image data, and a printer section for outputting an image on a sheet in accordance with an output job, said copying apparatus being connected to other copying apparatuses via a network, said copying apparatus further comprising:

a generating unit adapted to generate, in response to an output request received from a first one of said other copying apparatuses, a copy job based on image data input from a scanner section of the first copying apparatus;

a first determining unit adapted to determine, based on job number information held in said copying apparatus, whether the copy job is executable in said copying apparatus;

an acquiring unit adapted to acquire job number information of at least one of said other copying apparatuses when said first determining unit determines that the copy job is not executable in said copying apparatus;

a second determining unit adapted to determine, based on the job number information acquired by said acquiring unit, whether the copy job can be transferred to any of said other copying apparatuses;

a deciding unit adapted to decide, when said second determining unit determines that the copy job can be transferred to at least one of said other copying apparatuses, at least one of those transfer-enabled copying apparatuses to which the copy job is to be transferred;

a transferring unit adapted to transfer the copy job to the copying apparatus decided by said deciding unit; and a controlling unit adapted to store the copy job in a storing unit in said copying apparatus when the second determining unit determines that there are no other copying apparatuses to which the copy job can be transferred and to execute the copy job stored in said storing unit by said copying apparatus when said copying apparatus comes into an executable state.

22. A copying apparatus comprising a scanner section for reading an original image and obtaining image data, and a printer section for outputting an image on a sheet in accordance with an output job, said copying apparatus being connected to other copying apparatuses via a network, said copying apparatus further comprising:

a generating unit adapted to generate, in response to an output request received from a first one of said other copying apparatuses, a copy job based on image data input from a scanner section of the first copying apparatus;

a first acquiring unit adapted to acquire printing speed information of the first copying apparatus having sent the output request;

a first determining unit adapted to determine, based on the printing speed information of the first copying apparatus acquired by said first acquiring unit, whether the copy job is executable at a predetermined printing speed in said copying apparatus;

a second acquiring unit adapted to acquire printing speed information of at least one of said other copying apparatuses when said first determining unit determines that the copy job is not executable at the predetermined printing speed in said copying apparatus;

a second determining unit adapted to determine, based on the printing speed information acquired by said second acquiring unit, whether the copy job can be transferred to any of said other copying apparatuses;

a deciding unit adapted to decide, when said second determining unit determines that the copy job can be transferred to at least one of said other copying apparatuses, at least one of those transfer-enabled copying apparatuses to which the copy job is to be transferred;

a transferring unit adapted to transfer the copy job to the copying apparatus decided by said deciding unit; and a controlling unit adapted to store the copy job in a storing unit in said copying apparatus when the second determining unit determines that there are no other copying apparatuses to which the copy job can be transferred and to execute the copy job stored in said storing unit by said copying apparatus when said copying apparatus comes into an executable state.

23. A copying apparatus comprising a scanner section for reading an original image and obtaining image data, said copying apparatus being connected to other copying apparatuses via a network, said copying apparatus further comprising:

a display unit that displays other copying apparatuses to which a copy request in accordance with the image data input from said scanner section can be sent;

a selecting unit that selects, based on a selection input from an operator, at least one of the other copying apparatuses displayed by said display unit to which the copy request is to be sent;

a first acquiring unit that acquires job number information of the copying apparatus selected by said selecting unit; and a first determining unit that determines, based on the job number information acquired by said first acquiring unit, whether the selected copying apparatus can accept the copy request, wherein when said first determining unit determines that the copying apparatus selected by said selecting unit cannot accept the copy request, the determination result is displayed by said display unit.

24. An image outputting apparatus connected to other image outputting apparatuses via a communication medium, comprising:

a receiving unit adapted to receive a job;

an acquiring unit adapted to acquire job information of at least one of said other image outputting apparatuses when the job received by said receiving unit is not executable in said image outputting apparatus;

a transferring unit adapted to transfer the job to at least one of said other image outputting apparatuses based on the job information acquired by said acquiring unit, wherein said transferring unit transfers the job to at least one of said other image outputting apparatuses when the job can be transferred to at least one of said other image outputting apparatuses; and a controlling unit adapted to store the job in a storing unit in said image outputting apparatus when there are no other image outputting apparatuses to which the job can be transferred and to execute the job stored in said storing unit by said image outputting apparatus when said image outputting apparatus comes into an executable state.

25. An image outputting apparatus connected to other image outputting apparatuses via a communication medium, comprising:

a transferring unit adapted to transfer, when a predetermined input image is output in cooperation with at least one of said other image outputting apparatuses, a job held in said image outputting apparatus in accordance with a preset condition;

an acquiring unit adapted to acquire apparatus information of at least one of said other image outputting apparatuses, wherein said transferring unit transfers the job, when the job can be transferred to at least one of said other image outputting apparatuses, to at least one of said other image outputting apparatuses based on the apparatus information acquired by said acquiring unit; and a controlling unit adapted to store the job in a storing unit in said image outputting apparatus when there are no image outputting apparatuses to which the job can be transferred and to execute the job stored in said storing unit by said image outputting apparatus when said image outputting apparatus comes into an executable state.

26. A control method for an image outputting apparatus connected to other image outputting apparatuses via a communication medium, comprising:
   a generating step of generating a job in response to an output request received via said communication medium;
   an acquiring step of acquiring job information of at least one of said other image outputting apparatuses when the job generated by said generating step is not executable by said image outputting apparatus;
   a transferring step of transferring the job to at least one of said other image outputting apparatuses based on the job information acquired by said acquiring step, wherein the transferring step transfers the job to said at least one of the other image outputting apparatuses when the job can be transferred to at least one of said other image outputting apparatuses; and
   a controlling step of storing the job in a storing unit in said image outputting apparatus when there are no other image outputting apparatuses to which the job can be transferred and to execute the job stored in said storing unit by said image outputting apparatus when said image outputting apparatus comes into an executable state.

27. A control method for an image outputting apparatus according to claim 26, further comprising a first determining step of, based on job amount information held in the image outputting apparatus, determining whether the job is executable,
   wherein said acquiring step acquiring job amount information of at least one of said other image outputting apparatuses when said first determining step determines that the job is not executable.

28. A control method for an image outputting apparatus according to claim 27, further comprising a second determining step of, based on the job amount information acquired by said acquiring step, determining whether the job can be transferred to any of said other image outputting apparatuses; and
   a deciding step of, when said second determining step determines that the job can be transferred to at least one of said other image outputting apparatuses, deciding at least one of those transfer-enabled image outputting apparatuses to which the job is to be transferred,
   wherein said transferring step transfers the job to the image outputting apparatus decided by said deciding step.

29. A control method for an image outputting apparatus according to claim 28, wherein when said second determining step determines that there are no other image outputting apparatuses to which the job can be transferred, said image outputting apparatus holds the job until the image outputting apparatus comes into an executable state.

30. A control method for an image outputting apparatus according to claim 29, wherein the job amount information is information regarding the number of jobs.

31. A control method for an image outputting apparatus according to claim 26, further comprising a third determining step of, based on job amount information held in the image outputting apparatus, determining whether the job is executable at a predetermined printing speed,
   wherein said acquiring step acquires job amount information of at least one of said other image outputting apparatuses when said determining step determines that the job is not executable at the predetermined printing speed.

32. A control method for an image outputting apparatus according to claim 31, further comprising a calculating step for calculating the end time of the job based on the job amount information held in the image outputting apparatus,
   wherein said determining step determines, based on the end time of the job calculated by said calculating step, whether the job is executable at the predetermined printing speed,
   and said acquiring step acquires the job amount information of the at least one of said other image outputting apparatuses when said determining step determines that the job is not executable at the predetermined printing speed.

33. A control method for an image outputting apparatus according to claim 26, wherein said image outputting apparatus further comprises a printer section for outputting an image on a sheet in accordance with the job.

34. A control method for an image outputting apparatus according to claim 33, wherein at least one of said other image outputting apparatuses includes a scanner section for reading an original image and obtaining image data, and
   the job is a copy job based on the image data input from said scanner section.

35. A control method for an image outputting apparatus according to claim 26, wherein the job is a dispersed output job.

36. A control method for an image outputting apparatus connected to other image outputting apparatuses via a communication medium, comprising:
   a generating step of generating a job in response to an output request received via said communication medium;
   a first acquiring step of acquiring output function information of at least one of said other image outputting apparatuses when the job generated by said generating step is not executable by the image outputting apparatus;
   a transferring step of transferring the job to at least one of said other image outputting apparatuses based on the output function information acquired by said first acquiring step, wherein the transferring step transfers the job to at least one of said other image outputting apparatuses when the job can be transferred to at least one of said other image outputting apparatuses; and
   a controlling step of storing the job in a storing unit in said image outputting apparatus when there are no other image outputting apparatuses to which the job can be transferred and to execute the job stored in said storing unit by said image outputting apparatus when said image outputting apparatus comes into an executable state.

37. A control method for an image outputting apparatus according to claim 36, further comprising a second acquiring step of acquiring output function information of a first image outputting apparatus having sent the output request; and
   a first determining step of, based on the output function information of said first image outputting apparatus acquired by said second acquiring step, determining whether the job is executable at a predetermined outputting speed,
   wherein said first acquiring step acquiring output function information of at least one of said other image outputting apparatuses when said first determining step determines that the job is not executable at the predetermined outputting speed.

38. A control method for an image outputting apparatus according to claim 37, further comprising a second determining step of, based on the output function information acquired by said first acquiring step, determining whether the job can be transferred to any of said other image outputting apparatuses; and
 a deciding step of, when said second determining step determines that the job can be transferred to at least one of said other image outputting apparatuses, deciding at least one of those transfer-enabled image outputting apparatuses to which the job is to be transferred,
 wherein said transferring step transferring the job to the image outputting apparatus decided by said deciding step.

39. A control method for an image outputting apparatus according to claim 38, wherein the job is held when said second determining step determines that there are no other image outputting apparatuses to which the job can be transferred.

40. A control method for an image outputting apparatus according to claim 36, wherein at least one of said other image outputting apparatuses includes a scanner section for reading an original image and obtaining image data, and
 the job is a copy job based on the image data input from said scanner section.

41. A control method for an image outputting apparatus connected to other image outputting apparatuses via a communication medium, comprising:
 a displaying step of displaying said other image outputting apparatuses on a display unit;
 a selecting step of, based on a selection input from an operator, selecting at least one of said other image outputting apparatuses displayed by said displaying step, to which an output request is to be sent;
 a first acquiring step of acquiring job information of the image outputting apparatus selected by said selecting step;
 a first determining step for, based on the job information acquired by said first acquiring step, determining whether the selected image outputting apparatus can accept the output request; and
 a notifying step of, when said first determining step determines that the selected image outputting apparatus cannot accept the output request, notifying the determination result.

42. A control method for an image outputting apparatus according to claim 41, further comprising a second acquiring step of acquiring job information of at least one of said other image outputting apparatuses when said first determining step determines that the selected image outputting apparatus cannot accept the output request; and
 a second determining step of, based on the job information acquired by said second acquiring step, determining whether at least one of said other image outputting apparatuses job can accept the output request,
 wherein said displaying step displays a determination result made by said second determining step.

43. A control method for an image outputting apparatus according to claim 42, wherein said first acquiring step acquires job amount information of the image outputting apparatus selected by said selecting step, and said first determining step determines, based on the job amount information acquired by said first acquiring step, whether the selected image outputting apparatus can accept the job.

44. A control method for an image outputting apparatus according to claim 43, wherein the job amount information is information regarding the number of jobs.

45. A control method for an image outputting apparatus according to claim 41, further comprising an image inputting step of reading an original image by a scanner and obtaining image data,
 wherein the output request is a copy request in accordance with the image data obtained from said image inputting step.

46. A control method for a copying apparatus comprising a scanner section for reading an original image and obtaining image data, and a printer section for outputting an image on a sheet in accordance with an output job, said copying apparatus being connected to other copying apparatuses via a network, said control method comprising:
 a generating step of, in response to an output request received from a first one of said other copying apparatuses, generating a copy job based on image data input from a scanner section of the first copying apparatus;
 a first determining step of, based on job number information held in the copying apparatus, determining whether the copy job is executable in the copying apparatus;
 an acquiring step of acquiring job number information of at least one of said other copying apparatuses when said first determining step determines that the copy job is not executable in the copying apparatus;
 a second determining step of, based on the job number information acquired by said acquiring step, determining whether the copy job can be transferred to any of said other copying apparatuses;
 a deciding step of, when said second determining step determines that the copy job can be transferred to at least one of said other copying apparatuses, deciding at least one of those transfer-enabled copying apparatuses to which the copy job is to be transferred;
 a transferring step of transferring the copy job to the copying apparatus decided by said deciding step; and
 a controlling step of storing the copy job in a storing unit in said copying apparatus when the second determining step determines that there are no other copying apparatuses to which the copy job can be transferred and to execute the copy job stored in the storing unit by said copying apparatus when said copying apparatus comes into an executable state.

47. A control method for a copying apparatus comprising a scanner section for reading an original image and obtaining image data, and a printer section for outputting an image on a sheet in accordance with an output job, said copying apparatus being connected to other copying apparatuses via a network, said control method comprising:
 a generating step of, in response to an output request received from a first one of said other copying apparatuses, generating a copy job based on image data input from a scanner section of the first copying apparatus;
 a first acquiring step of acquiring printing speed information of the first copying apparatus having sent the output request;
 a first determining step of, based on the printing speed information of the first copying apparatus acquired by said first acquiring step, determining whether the copy job is executable at a predetermined printing speed in said copying apparatus;

a second acquiring step of acquiring printing speed information of at least one of said other copying apparatuses when said first determining step determines that the copy job is not executable at the predetermined printing speed in said copying apparatus;

a second determining step of, based on the printing speed information acquired by said second acquiring step, determining whether the copy job can be transferred to any of said other copying apparatuses;

a deciding step of, when said second determining step determines that the copy job can be transferred to at least one of said other copying apparatuses, deciding at least one of those transfer-enable copying apparatuses to which the copy job is to be transferred;

a transferring step of transferring the copy job to the copying apparatus decided by said deciding step, and a controlling step of storing the copy job in a storing unit in said copying apparatus when the second determining step determines that there are no other copying apparatuses to which the copy job can be transferred and to execute the copy job stored in said storing unit by said copying apparatus when said copying apparatus comes into an executable state.

48. A control method for a copying apparatus comprising a scanner section for reading an original image and obtaining image data, said copying apparatus being connected to other copying apparatuses via a network, said control method comprising:

a displaying step of displaying, on a display, other copying apparatuses to which a copy request in accordance with the image data input from said scanner section can be sent;

a selecting step of, based on a selection input from an operator, selecting at least one of the other copying apparatuses displayed by said displaying step, to which the copy request is to be sent;

a first acquiring step of acquiring job number information of the copying apparatus selected by said selecting step; and a first determining step of, based on the job number information acquired by said first acquiring step, determining whether the selected copying apparatus can accept the copy request, wherein when said first determining step determines that the copying apparatus selected by said selecting step cannot accept the copy request, the determination result is displayed by said displaying step.

49. A control method for an image outputting apparatus connected to other image outputting apparatuses via a communication medium, comprising:

a receiving step of receiving a job;

an acquiring step of acquiring job information of at least one of said other image outputting apparatuses when the job received by said receiving step is not executable in said image outputting apparatus;

a transferring step of transferring the job to at least one of said other image outputting apparatuses based on the job information acquired by said acquiring step, wherein the transferring step transfers the job to at least one of said other image outputting apparatuses when the job can be transferred to at least one of the other image outputting apparatuses; and a controlling step of storing the job in a storing unit in said image outputting apparatus when there are no other image outputting apparatuses to which the job can be transferred and to execute the job stored in said storing unit by said image outputting apparatus when said image outputting apparatus comes into an executable state.

50. A control method for an image outputting apparatus connected to other image outputting apparatuses via a communication medium, comprising:

an acquiring step of acquiring apparatus information of at least one of said other image outputting apparatuses;

a transferring step of, when a predetermined input image is output in cooperation with at least one of said other image outputting apparatuses, transferring a job held in said image outputting apparatus in accordance with a preset condition, wherein said transferring step transfers the job to at least one of said other image outputting apparatuses based on the apparatus information acquired by said acquiring step; and a controlling step of storing the job in a storing unit in said image outputting apparatus when there are not image outputting apparatuses to which the job can be transferred and to execute the job stored in said storing unit by said image outputting apparatus when said image outputting apparatus comes into an executable state.

51. An image outputting system including a plurality of image outputting apparatuses interconnected via a communication medium, wherein at least one of said plurality of image outputting apparatuses comprises:

a generating unit adapted to generate a job in response to an output request received via said communication medium;

an acquiring unit adapted to acquire job information of at least one of other image outputting apparatuses when the job generated by said generating unit is not executable in said image outputting apparatus;

a transferring unit adapted to transfer the job to at least one of the other image outputting apparatuses based on the job information acquired by said acquiring unit, wherein said transferring unit transfers the job to the at least one of the other image outputting apparatuses when the job can be transferred to at least one of the other image outputting apparatuses; and a controlling unit adapted to store the job in a storing unit in said image outputting apparatus when there are no other image outputting apparatuses to which the job can be transferred and to execute the job stored in said storing unit by said image outputting apparatus when said image outputting apparatus comes into an executable state.

52. An image outputting system including a plurality of image outputting apparatuses interconnected via a communication medium, wherein at least one of said plurality of image outputting apparatuses comprises:

a generating unit adapted to generate a job in response to an output request received via said communication medium;

a first acquiring unit adapted to acquire output function information of at least one of said other image outputting apparatuses when the job generated by said generating unit is not executable in said image outputting apparatus;

a transferring adapted to transfer the job to at least one of the other image outputting apparatuses based on the output function information acquired by said first acquiring unit, wherein the transferring unit transfers the job to at least one of said other image outputting apparatuses when the job can be transferred to at least one of said other image outputting apparatuses; and a controlling unit adapted to store the job in a storing unit in said image outputting apparatus when there are no other image outputting apparatuses to which the job can be transferred and to execute the job stored in said storing unit by said image outputting apparatus when said image outputting apparatus comes into an executable state.

53. An image outputting system including a plurality of image outputting apparatuses interconnected via a communication medium, wherein at least one of said plurality of image outputting apparatuses comprises:

a display unit adapted to display other image outputting apparatuses;

a selecting unit adapted to select, based on a selection input from an operator, at least one of the other image outputting apparatuses displayed by said display unit to which an output request is to be sent;

a first acquiring unit adapted to acquire job information of the image outputting apparatus selected by said selecting unit;

a first determining unit adapted to determine, based on the job information acquired by said first acquiring unit, whether the selected image outputting apparatus can accept the output request; and a notifying adapted to, when said first determining unit determines that the selected image outputting apparatus cannot accept the output request, notify the determination result.

54. A computer-readable storage medium storing program codes for implementing a control method for an image outputting apparatus connected to other image outputting apparatuses via a communication medium, said program codes comprising:

a generating code for generating a job in response to an output request received via said communication medium;

an acquiring code for acquiring job information of at least one of said other image outputting apparatuses when the job generated by said generating code is not executable in said image outputting apparatus;

a transferring code for transferring the job to at least one of said other image outputting apparatuses based on the job information acquired by said acquiring code, wherein the transferring code transfers the job to said at least one of the other image outputting apparatuses when the job can be transferred to at least one of said other image outputting apparatuses; and a controlling code for storing the job in a storing unit in said image outputting apparatus when there are no other image outputting apparatuses to which the job can be transferred and to execute the job stored in said storing unit by said image outputting apparatus when said image outputting apparatus comes into an executable state.

55. A computer-readable storage medium storing program codes for implementing a control method for an image outputting apparatus connected to other image outputting apparatuses via a communication medium, said program codes comprising:

a generating code for generating a job in response to an output request received via said communication medium;

a first acquiring code for acquiring output function information of at least one of said other image outputting apparatuses when the job generated by said generating code is not executable in said image outputting apparatus;

a transferring code for transferring the job to at least one of said other image outputting apparatuses based on the output function information acquired by said first acquiring code, wherein said transferring code transfers the job to at least one of said other image outputting apparatuses when the job can be transferred to at least one of said other image outputting apparatuses; and a controlling code for storing the job in a storing unit in said image outputting apparatus when there are not other image outputting apparatuses to which the job can be transferred and to execute the job stored in the storing unit by said image outputting apparatus when said image outputting apparatus comes into an executable state.

56. A computer-readable storage medium storing program codes for implementing a control method for an image outputting apparatus connected to other image outputting apparatuses via a communication medium, said program codes comprising:

a displaying code for displaying said other image outputting apparatuses on a display unit;

a selecting code for, based on a selection input from an operator, selecting at least one of said other image outputting apparatuses displayed by said displaying code, to which an output request is to be sent;

a first acquiring code for acquiring job information of the image outputting apparatus selected by said selecting code;

a first determining code for, based on the job information acquired by said first acquiring code, determining whether the selected image outputting apparatus can accept the output request; and a notifying code for, when said first determining code determines that the selected image outputting apparatus cannot accept the output request, notifying the determination result.

57. A control method for an image outputting system including a first image outputting apparatus and other image outputting apparatuses connected to the first image outputting apparatus, comprising:

a first executing step of executing a job, which is dispersed to a plurality of image outputting apparatuses to be executed, by said first image outputting apparatus when said first image outputting apparatus can execute the job;

a second executing step of executing the job, which is dispersed to the plurality of image outputting apparatuses to be executed, by at least one of said other image outputting apparatuses instead of said first image outputting apparatus when said first image outputting apparatus can not execute the job but at least one of said other image outputting apparatuses can execute the job; and a third executing step of storing the job, which is dispersed to the plurality of image outputting apparatuses to be executed, in a storing unit when neither said first image outputting apparatus nor at least one of said other image outputting apparatuses can execute the job, and then executing the job stored in said storing unit by said first image outputting apparatus when said first image outputting apparatus comes into an executable state.

58. A control method for a printing system including a plurality of printing apparatuses which include at least a first printing apparatus and a second printing apparatus, comprising:

a first executing step of executing a printing process of a demultiplex job, the printing process of which is executed in parallel with the printing process of said first printing apparatus, by said second printing apparatus when said second printing apparatus can execute the demultiplex job;

a second executing step of executing the printing process of the demultiplex job, the printing process of which is executed in parallel with the printing process of said first printing apparatus, by at least one of a plurality of printing apparatuses other than said second printing apparatus when said second printing apparatus can not execute the job but at least one of said plurality of other printing apparatuses can execute the demultiplex job; and a third executing step of storing the demultiplex job, the printing process of which is executed in parallel with the printing process of said first printing apparatus, in a storing unit when neither said second printing apparatus nor at least one of said plurality of other printing apparatuses can execute the demultiplex job, and then executing the job stored in said storing unit by said second printing apparatus when said second printing apparatus comes into an executable state.

59. A control method for a copying system including a first copying apparatus and other copying apparatuses connected to the first copying apparatus, comprising:

a first executing step of executing a copy job, which is dispersed to a plurality of copying apparatuses to be executed, by said first copying apparatus when said first copying apparatus can execute the job;

a second executing step of executing the copy job, which is dispersed to the plurality of copying apparatuses to be executed, by at least one of said other copying apparatuses instead of said first copying apparatus when said first copying apparatus can not execute the job but at least one of said other copying apparatuses can execute the job; and a third executing step of storing the copy job, which is dispersed to the plurality of copying apparatuses to be executed, in a storing unit when neither said first copying apparatus nor at least one of said other copying apparatuses can execute the job, and then executing the job stored in said storing unit by said first copying apparatus when said first copying apparatus comes into an executable state.

60. An image outputting apparatus connected to other image outputting apparatuses via a communication medium, comprising:

a displaying unit adapted to display said other image outputting apparatuses;

a selecting unit adapted to select, based on a selection input from an operator, at least one of said other image outputting apparatuses displayed by said displaying unit to which an output request is to be sent;

an acquiring unit adapted to acquire information of said other image outputting apparatuses;

a determining unit adapted to determine, based on the information acquired by said acquiring unit, whether said other image outputting apparatuses can accept said output request; and a controlling unit adapted to control the display of said displaying unit for distinguishing the display of the image outputting apparatuses as objects to be selected by said selecting unit according to whether they are the image outputting apparatuses determined to be able to accept said output request or not by said determining unit.

61. A copying apparatus comprising a scanner section for reading an original image and obtaining image data, said copying apparatus being connected to other copying apparatuses via a network, said copying apparatus further comprising:

a displaying unit adapted to display said other copying apparatuses to which a copy request based on the image data obtained by said scanner section can be transferred;

a selecting unit adapted to select, based on a selection input from an operator, at least one of said other copying apparatuses displayed by said displaying unit to which said copy request is to be sent;

an acquiring unit adapted to acquire information of said other copying apparatuses;

a determining unit adapted to determine, based on the information acquired by said acquiring unit, whether said other copying apparatuses can accept said copy request; and a controlling unit adapted to control the display of said displaying unit for distinguishing the display of the copying apparatuses as objects to be selected by said selecting unit according to whether they are the copying apparatuses determined to be able to accept said copy request or not by said determining unit.

62. A computer readable storage medium storing program codes for a control method for an image outputting system including a first image outputting apparatus and other image outputting apparatuses connected to the first image outputting apparatus, comprising:

a first executing step of executing a job, which is dispersed to a plurality of image outputting apparatuses to be executed, by said first image outputting apparatus when said first image outputting apparatus can execute the job;

a second executing step of executing the job, which is dispersed to the plurality of image outputting apparatuses to be executed, by at least one of said other image outputting apparatuses instead of said first image outputting apparatus when said first image outputting apparatus can not execute the job but at least one of said other image outputting apparatuses can execute the job; and a third executing step of storing the job, which is dispersed to the plurality of image outputting apparatuses to be executed, in a storing unit when neither said first image outputting apparatus nor at least one of said other image outputting apparatuses can execute the job, and then executing the job stored in said storing unit by said first image outputting apparatus when said first image outputting apparatus comes into an executable state.

63. A computer readable storage medium storing program codes for a control method for a printing system including a plurality of printing apparatuses which include at least a first printing apparatus and a second printing apparatus, comprising:

a first executing step of executing a printing process of a demultiplex job, the printing process of which is executed in parallel with the printing process of said first printing apparatus, by said second printing apparatus when said second printing apparatus can execute the demultiplex job;

a second executing step of executing the printing process of the demultiplex job, the printing process of which is executed in parallel with the printing process of said first printing apparatus, by at least one of a plurality of printing apparatuses other than said second printing apparatus when said second printing apparatus can not execute the job but at least one of said plurality of other printing apparatuses can execute the demultiplex job; and a third executing step of storing the demultiplex job, the printing process of which is executed in parallel with the printing process of said first printing apparatus, in a storing unit when neither said second printing apparatus nor at least one of said plurality of other printing apparatuses can execute the demultiplex job, and then executing the job stored in said storing unit by said second printing apparatus when said second printing apparatus comes into an executable state.

64. A computer readable storage medium storing program codes for a control method for a copying system including a first copying apparatus and other copying apparatuses connected to the first copying apparatus, comprising:

a first executing step of executing a copy job, which is dispersed to a plurality of copying apparatuses to be executed, by said first copying apparatus when said first copying apparatus can execute the job;

a second executing step of executing the copy job, which is dispersed to the plurality of copying apparatuses to be executed, by at least one of said other copying apparatuses instead of said first copying apparatus when said first copying apparatus can not execute the job but at least one of said other copying apparatuses can execute the job; and a third executing step of storing the copy job, which is dispersed to the plurality of copying apparatuses to be executed, in a storing unit when neither said first copying apparatus nor at least one of said other copying apparatuses can execute the job, and then executing the job stored in said storing unit by said first copying apparatus when said first copying apparatus comes into an executable state.

65. A method for an image outputting apparatus connected to other image outputting apparatuses via a communication medium, comprising:

a displaying step of displaying said other image outputting apparatuses;

a selecting step of selecting, based on a selection input from an operator, at least one of said other image outputting apparatuses displayed by said displaying step to which an output request is to be sent;

an acquiring step of acquiring information of said other image outputting apparatuses;

a determining step of determining, based on the information acquired by said acquiring step, whether said other image outputting apparatuses can accept said output request; and a controlling step of controlling the display of said displaying step for distinguishing the display of the image outputting apparatuses as objects to be selected by said selecting step according to whether they are the image outputting apparatuses determined to be able to accept said output request or not by said determining step.

66. A method for a copying apparatus comprising a scanner section for reading an original image and obtaining image data, said copying apparatus being connected to other copying apparatuses via a network, said method comprising:

a displaying step of displaying said other copying apparatuses to which a copy request based on the image data obtained by said scanner section can be transferred;

a selecting step of selecting, based on a selection input from an operator, at least one of said other copying apparatuses displayed by said displaying step to which said copy request is to be sent;

an acquiring step of acquiring information of said other copying apparatuses;

a determining step of determining, based on the information acquired by said acquiring step, whether said other copying apparatuses can accept said copy request; and a controlling step of controlling the display of said displaying step for distinguishing the display of the copying apparatuses as objects to be selected by said selecting step according to whether they are the copying apparatuses determined to be able to accept said copy request or not by said determining step.

67. An image outputting system including a plurality of image outputting apparatuses interconnected via a communication medium, wherein at least one of said plurality of image outputting apparatuses comprises:

a displaying unit adapted to display said other image outputting apparatuses;

a selecting unit adapted to select, based on a selection input from an operator, at least one of said other image outputting apparatuses displayed by said displaying unit to which an output request is to be sent;

an acquiring unit adapted to acquire information of said other image outputting apparatuses;

a determining unit adapted to determine, based on the information acquired by said acquiring unit, whether said other image outputting apparatuses can accept said output request; and a controlling unit adapted to control the display of said displaying unit for distinguishing the display of the image outputting apparatuses as objects to be selected by said selecting unit according to whether they are the image outputting apparatuses determined to be able to accept said output request or not by said determining unit.

68. A computer readable storage medium storing a program for a method for an image outputting apparatus connected to other image outputting apparatuses via a communication medium, the method comprising:

a displaying step of displaying said other image outputting apparatuses;

a selecting step of selecting, based on a selection input from an operator, at least one of said other image outputting apparatuses displayed by said displaying step to which an output request is to be sent;

an acquiring step of acquiring information of said other image outputting apparatuses;

a determining step of determining, based on the information acquired by said acquiring step, whether said other image outputting apparatuses can accept said output request; and a controlling step of controlling the display of said displaying step for distinguishing the display of the image outputting apparatuses as objects to be selected by said selecting step according to whether they are the image outputting apparatuses determined to be able to accept said output request or not by said determining step.

* * * * *

UNITED STATES PATENT AND TRADEMARK OFFICE
CERTIFICATE OF CORRECTION

| | | |
|---|---|---|
| PATENT NO. | : 7,127,715 B2 | |
| APPLICATION NO. | : 09/949877 | |
| DATED | : October 24, 2006 | |
| INVENTOR(S) | : Inui | |

It is certified that error appears in the above-identified patent and that said Letters Patent is hereby corrected as shown below:

SHEET 6:
FIG. 6, "ATTRIBUTEE" should read -- ATTRIBUTE --.

SHEET 14:
FIG. 15, "MAXIUMU" should read -- MAXIMUM --.

SHEET 17:
FIG. 18, "DODE" should read -- CODE --.

SHEET 30:
FIG. 31, "ROCAL" should read -- LOCAL --.

SHEET 35:
FIG. 36, "ROCAL" should read -- LOCAL --.

COLUMN 18:
Line 53, "IDS" should read -- IDs --.

COLUMN 24:
Line 25, "MFPS," should read -- MFPs, --; and
Line 28, "MFPS," should read -- MFPs, --.

COLUMN 27:
Line 3, "excutable," should read -- executable, --; and
Line 27, "MFPS" should read -- MFPs --.

COLUMN 29:
Line 35, "an" should read -- can --.

COLUMN 30:
Line 13, "other MFPs" should read -- MFPs other --; and
Line 33, "MFPS." should read -- MFPs. --.

COLUMN 31:
Line 7, "responding" should read -- responding to --.

COLUMN 46:
Line 32, "computer readable" should read -- computer-readable --; and
Line 60, "computer readable" should read -- computer-readable --.

UNITED STATES PATENT AND TRADEMARK OFFICE
CERTIFICATE OF CORRECTION

PATENT NO. : 7,127,715 B2
APPLICATION NO. : 09/949877
DATED : October 24, 2006
INVENTOR(S) : Inui It is certified that error appears in the above-identified patent and that said Letters Patent is hereby corrected as shown below:

COLUMN 47:
Line 21, "computer readable" should read -- computer-readable --.

COLUMN 48:
Line 43, "computer readable" should read -- computer-readable --.

Signed and Sealed this

Fourth Day of December, 2007

JON W. DUDAS
*Director of the United States Patent and Trademark Office*